(12) United States Patent  
Matsugu

(10) Patent No.: US 7,054,850 B2
(45) Date of Patent: May 30, 2006

(54) APPARATUS AND METHOD FOR DETECTING OR RECOGNIZING PATTERN BY EMPLOYING A PLURALITY OF FEATURE DETECTING ELEMENTS

(75) Inventor: Masakazu Matsugu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 09/878,296

(22) Filed: Jun. 12, 2001

(65) Prior Publication Data

US 2002/0038294 A1    Mar. 28, 2002

(30) Foreign Application Priority Data

Jun. 16, 2000 (JP) ............................. 2000-181480
Jun. 16, 2000 (JP) ............................. 2000-181487
Jun. 16, 2000 (JP) ............................. 2000-181488

(51) Int. Cl.
*G06F 17/00* (2006.01)
*G06N 5/02* (2006.01)
(52) U.S. Cl. ..................... 706/48; 706/20; 706/31
(58) Field of Classification Search .............. 706/20, 706/31, 48; 382/156, 159, 37
See application file for complete search history.

(56) References Cited

U.S. PATENT DOCUMENTS

| 4,577,344 A | * | 3/1986 | Warren et al. .............. 382/100 |
| 4,876,731 A | * | 10/1989 | Loris et al. ................ 382/229 |
| 5,049,758 A | * | 9/1991 | Mead et al. ............ 365/185.21 |
| 5,058,184 A | * | 10/1991 | Fukushima ................ 382/158 |
| 5,059,814 A | | 10/1991 | Mead et al. ................ 307/201 |
| 5,146,106 A | | 9/1992 | Anderson et al. ........... 307/246 |
| 5,201,029 A | | 4/1993 | Jackson ...................... 395/27 |
| 5,268,684 A | * | 12/1993 | Allen et al. .................. 341/75 |
| 5,594,834 A | * | 1/1997 | Wang ......................... 704/253 |
| 5,631,469 A | * | 5/1997 | Carrieri et al. ........... 250/341.5 |
| 5,664,065 A | * | 9/1997 | Johnson ...................... 706/20 |
| 6,081,660 A | * | 6/2000 | Macleod et al. .............. 703/2 |
| 6,088,490 A | * | 7/2000 | Iwata et al. ................. 382/312 |

(Continued)

FOREIGN PATENT DOCUMENTS

JP         55-124879          9/1980

(Continued)

OTHER PUBLICATIONS

Moore et al; The implementation of a multi-view autostereoscopic display; Stereoscopic Television, IEE Colloquium on; Oct. 15, 1992; pp. 4/1-416.*

(Continued)

*Primary Examiner*—Joseph P. Hirl
(74) *Attorney, Agent, or Firm*—Fitzpatrick, Cella, Harper & Scinto

(57) ABSTRACT

A pattern detecting apparatus has a plurality of hierarchized neuron elements to detect a predetermined pattern included in input patterns. Pulse signals output from the plurality of neuron elements are given specific delays by synapse circuits associated with the individual elements. This makes it possible to transmit the pulse signals to the neuron elements of the succeeding layer through a common bus line so that they can be identified on a time base. The neuron elements of the succeeding layer output the pulse signals at output levels based on a arrival time pattern of the plurality of pulse signals received from the plurality of neuron elements of the preceding layer within a predetermined time window. Thus, the reliability of pattern detection can be improved, and the number of wires interconnecting the elements can be reduced by the use of the common bus line, leading to a small scale of circuit and reduced power consumption.

66 Claims, 38 Drawing Sheets

U.S. PATENT DOCUMENTS

| | | | |
|---|---|---|---|
| 6,178,207 B1 * | 1/2001 | Richards et al. | 375/259 |
| 6,373,859 B1 * | 4/2002 | Jedwab et al. | 370/479 |
| 6,654,497 B1 * | 11/2003 | Kondo et al. | 382/199 |
| 6,678,389 B1 * | 1/2004 | Sun et al. | 382/100 |
| 2003/0044073 A1 * | 3/2003 | Matsugu et al. | 382/195 |

FOREIGN PATENT DOCUMENTS

| | | | |
|---|---|---|---|
| JP | 5-37317 | | 2/1993 |
| JP | 5-108804 | | 4/1993 |
| JP | 5-242069 | | 9/1993 |
| JP | 6-34236 | | 5/1994 |
| JP | 7-262157 | | 10/1995 |
| JP | 7-334478 | | 12/1995 |
| JP | 8-153148 | | 6/1996 |
| JP | 8-153198 | | 6/1996 |
| JP | 8-315141 | | 11/1996 |
| JP | 8-321747 | | 12/1996 |
| JP | 10269345 | A * | 10/1998 |
| JP | 2856702 | | 11/1998 |
| JP | 10-327054 | | 12/1998 |

OTHER PUBLICATIONS

Yonemoto et al; A 2 million pixel FIT-CCD image sensor for HDTV camera system; Solid-State Circuits Conference. Digest of Technical Papers. 37th ISSCC.; 1990 IEEE International; Feb. 14-16, 1990; pp. 214-215, 299.*

Matsugu et al; Estimation Of Information Capacity In Oscillatory Neural Networks; Neural Networks, Proceedings of 1993 International Joint Conference on; vol. 1; Oct. 25-29, 1993; pp. 425-428.*

Schneider et al; Parallel pattern recognition using fuzzy cooperative expert systems; Proceedings of the 1992 ACM/SIGAPP Symposium on Applied computing: technological challenges of the 1990's; Apr. 1992.*

"An Attention Prototype For Early Vision", by Sean M Culhane, et al., Dept. of Computer Science, University of Toronto, Canada, pp. 551-560.

"A Multiscale Dynamic Routing Circuit For Forming Size- And Position-Invariant Object Representations", by Bruno A. Olhausen, Journal Of Computational Neuroscience, vol. 2, No. 1, Mar. 1995, pp. 45-62.

"Detection Of 3D Objects In Cluttered Scenes Using Hierarchical Eigenspace", by Hiroshi Murase, et al., Pattern Recognition Letters, IAPR, vol. 18, No. 4, Apr. 1997, pp. 375-384.

"Coarse-Fine Template Matching", by Azriel Rosenfeld, et al., IEEE Transactions On Systems, Man And Cybernetics, Feb. 1977, pp. 104-107.

"Multiscale And Distributed Visual Representations And Mappings For Invariant Low-Level Perception", by Harry Wechsler, Neural Networks For Perception, vol. 1, Human And Machine Perception, 1992, pp. 462-476.

"Physiologically Motivated Image Fusion For Object Detection Using A Pulse Coupled Neural Network", by Randy P. Broussard, et al., IEEE Transactions On Neural Networks, vol. 10, No. 3, May 1999, pp. 554-563.

"Feature Linking Via Synchronization Among Distributed Assemblies: Simulations Of Results From Cat Visual Cortex", by R. Eckhorn, et al., Neural Computation, vol. 2, No. 3, 1990, pp. 293-307.

"Silicon Auditory Processors As Computer Peripherals", by John Lazzaro, et al., Advances In Neural Information Processing Systems 5, 1993, pp. 820-827.

"Routing Networks In Visual Cortex", by Charles H. Anderson, et al., The Handbook Of Brain Theory And Neural Networks, 1995, pp. 823-826.

"Neocognitron: A New Algorithm For Pattern Recognition Tolerant Of Deformations And Shifts In Position", by Kunihiko Fukushima, et al., Pattern Recognition, vol. 15, No. 6, 1982, pp. 455-469.

"Learning And Recognizing 3D Objects From Multiple Views In A Neural System", by Michael Seibert, et al., Neural Networks For Perception, vol. 1, 1992, pp. 426-444.

"Distortion Invariant Object Recognition In The Dynamic Link Architecture", by Martin Lades, et al., IEEE Transactions On Computers, vol. 42, No. 3, Mar. 1993, pp. 300-311.

"Low-Dimensional Procedure For The Characterization Of Human Faces", by L. Sirovich, et al., J. Optical Society Of America, vol. 4, No. 3, Mar. 1987, pp. 519-524.

"Shifts In Selective Visual Attention: Towards The Underlying Neural Circuitry", by C. Koch et al., Human Neurobiology, vol. 4, No. 4, 1985, pp. 219-227.

"Pulse-Stream VLSI Neural Networks Mixing Analog And Digital Techniques", by Alan Murray, et al., IEEE Transactions On Neural Networks, vol. 2, No. 2, Mar. 1991, pp. 193-204.

Culhane, S.M. et al., "An Attentional Prototype for Early Vision", Dept. Computer Science, Univ. Toronto (1992), pp. 551-560.

LeCun, Y. and Bengio, Y., "Convolutional Networks for Images Speech, and Time Series", Handbook of Brain Theory and Neural Networks (M. Arbib, Ed.), MIT Press (1995) pp. 255-258.

IEEE Trans. on Neural Networks vol. 10, pp. 540.

Daugman, J.G., "Uncertainty relation for resolution in space, spatial frequency, and orientation optimized by two-dimensional visual cortical filters", J. Optical Soc. America A, vol. 2 (1985) pp. 1160-1169.

Izhikevich, E.M., "Weakly Pulse-Coupled Oscillation, FM Interactions, Synchronization, and Oscillatory Associative Memory", IEEE Trans. on Neural Networks, vol. 10 (1999) pp. 508-526.

Eckmiller, R. et al., "Information Processing in Biology-Inspired Pulse Coded Neural Networks", Proceedings 1993 Int'l. Joint Conf. Neural Networks, vol. 1 (1993) pp. 643-648.

Murray, A., "Pulse Techniques in Neural VLSI: A Review", IEEE Int'l. Symposium on Circuits and Systems, vol. 5 (1992) pp. 2204-2207.

Search Report, dated Aug. 13, 2004, in EP 01 30 5231.

* cited by examiner

WEIGHTING FUNCTION

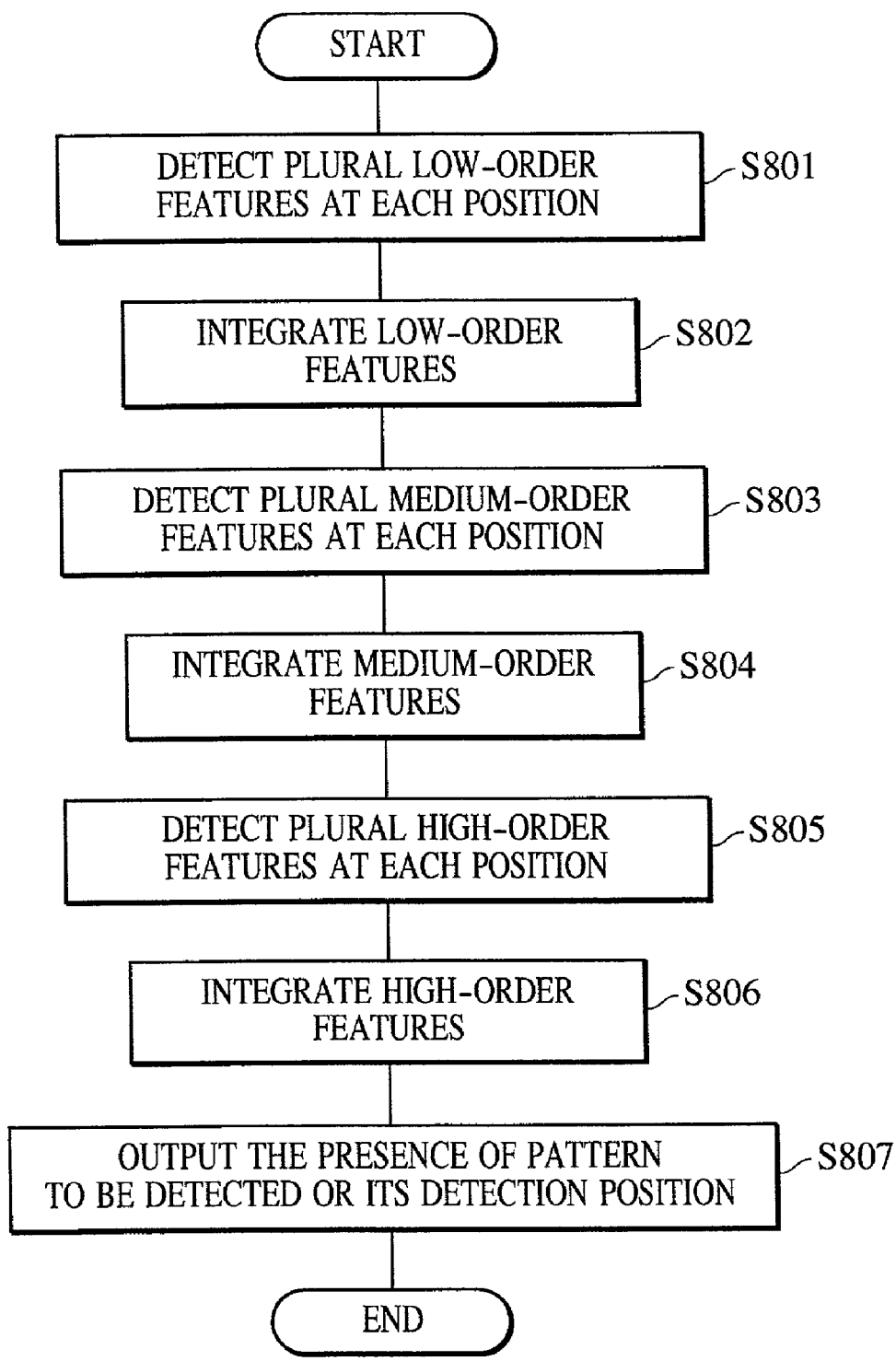

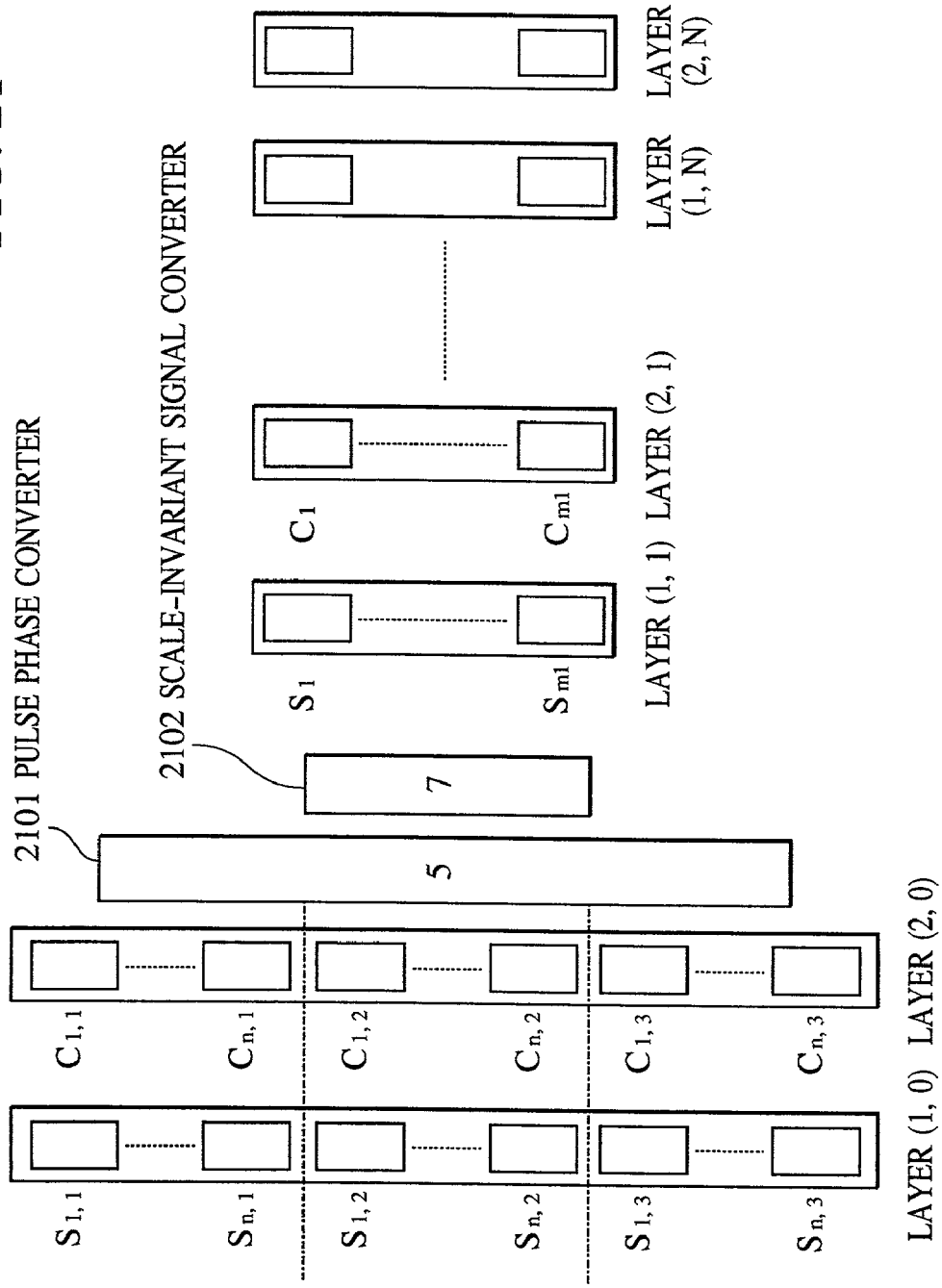

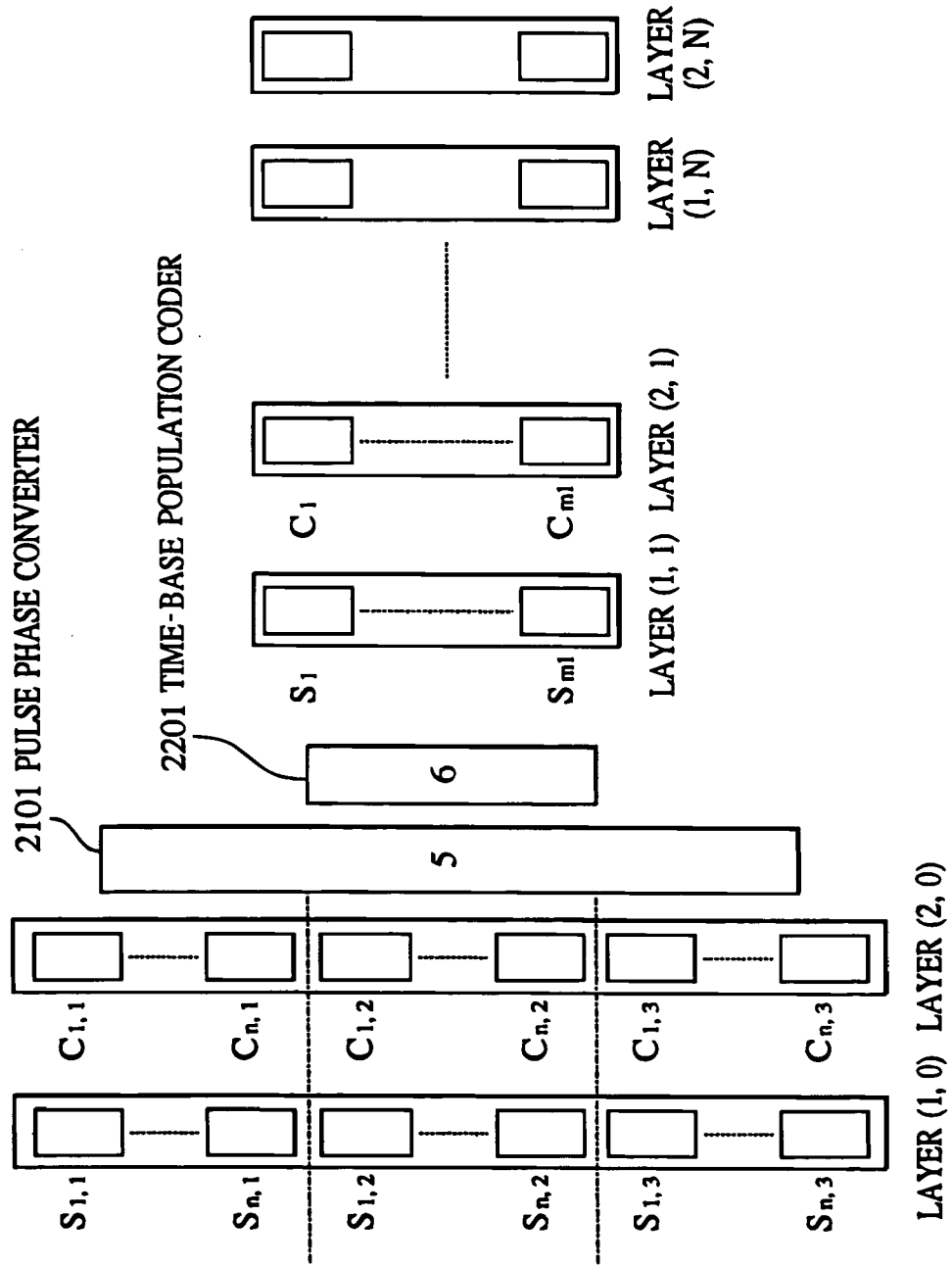

FIG. 23A

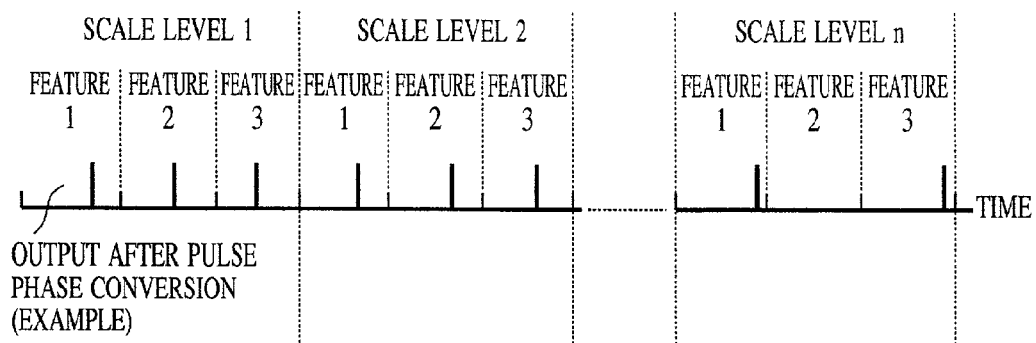

OUTPUT AFTER PULSE
PHASE CONVERSION
(EXAMPLE)

FIG. 23B

TIME WINDOW WEIGHTING FUNCTION FOR
FEATURE DETECTION CELL OUTPUT
OF POPULATION CODING CELL OF
FEATURE INTEGRATION LAYER AFTER
CHANNEL 1 (SCALE LEVEL 1) IS SELECTED BY
GATING CIRCUIT

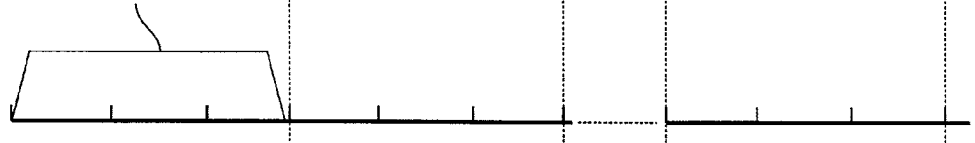

FIG. 23C

SCALE-INVARIANT SIGNAL OBTAINED AS A RESULT
OF POPULATION CODING CELL OUTPUT OF
CHARACTERISTIC INTEGRATION LAYER

FIG. 23D

PULSE TRAIN AFTER SCALE-INVARIANT SIGNAL IS
DISTRIBUTED AND COPIED TO CHANNEL ADJACENT
TO CHANNEL 1 IN LEARNING MODE

FEATURE DETECTION
CELL OUTPUT

TIME WINDOW WEIGHTING FUNCTION OF SUB-SAMPLING
CELL OF FEATURE INTEGRATION LAYER

SUB-SAMPLING CELL OUTPUT OF
FEATURE INTEGRATION LAYER

TIME WINDOW WEIGHTING FUNCTION
FOR FEATURE DETECTION CELL OUTPUT
OF POPULATION ENCODING CELL OF
FEATURE INTEGRATION LAYER

POPULATION CODING CELL OUTPUT
OF FEATURE INTEGRATION LAYER

FIG. 25
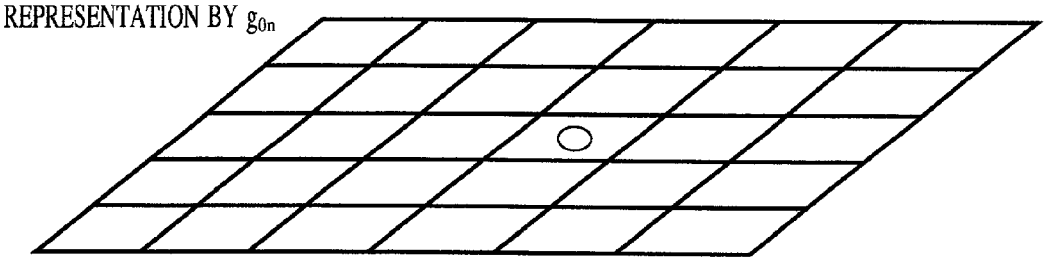
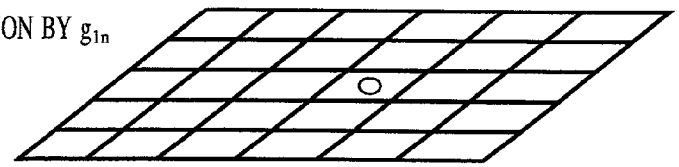
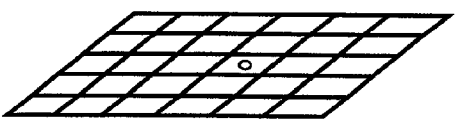

APPARATUS AND METHOD FOR DETECTING OR RECOGNIZING PATTERN BY EMPLOYING A PLURALITY OF FEATURE DETECTING ELEMENTS

BACKGROUND OF THE INVENTION

1. Field of the Invention

The present invention relates to an apparatus and a method mainly designed for recognizing a pattern or detecting a particular subject by using a parallel arithmetic device, such as a neural network.

2. Description of the Related Art

Hitherto, in the field of image recognition or speech recognition, the methods available for implementing such recognition have been roughly classified into two types. In one type, such recognition is implemented by performing serial arithmetic operation by employing, as a computer software program, a recognition processing algorithm tailored to a specific object to be recognized. In the other type, such recognition is implemented using a dedicated parallel image processor, such as a single instruction multiple data stream (SIMD) machine or a multiple instruction multiple data stream (MIMD) machine.

The following will describe typical examples of image recognition algorithms. First, examples wherein a feature quantity regarding the similarity to a model to be recognized is calculated include a method in which the data regarding the model to be recognized is represented in the form of a template model, and the similarity is calculated on the basis of matching or the like between an input image (or the feature vector thereof) and the template, or a high order correlation coefficient is calculated, a method in which an input pattern is mapped into an eigen-image function space obtained by performing the principal component analysis of a model image of an object so as to calculate the distance to the model in a feature space (Sirovich, et al., 1987, Low-dimensional procedure for the characterization of human faces, J.Opt.Soc.Am.[A], vol. 3, pp. 519–524), a method in which the relationship between a plurality of feature extraction results (feature vectors) and the spatial dispositions thereof is shown on a graph so as to calculate the similarity based on elastic graph matching (Lades et. al. 1993, Distortion Invariant Object Recognition in the Dynamic Link Architecture, IEEE Trans. On Computers, vol. 42, pp. 300–311), and a method in which an input image is subjected to predetermined conversion to obtain an expression with position, rotation, and scale invariance, then checked against a model (Seibert, et al. 1992, Learning and recognizing 3D objects from multiple views in a neural system, in Neural Networks for Perception, vol. 1 Human and Machine Perception (H. Wechsler Ed.) Academic Press, pp. 427–444).

Methods for recognizing a pattern based on a neural network model obtained from a clue based on an information processing mechanism of a living organism include a method based on a hierarchical template matching (Japanese Examined Patent Publication No. 60-712, Fukushima & Miyake, 1982 Neocognitron: A new algorithm for pattern recognition tolerant of deformation and shifts in position, Pattern Recognition, vol. 15, pp. 455–469), a method in which an object-centered expression with scale and position invariance is obtained by a dynamic routing neural network (Anderson, et al. 1995, Routing Networks in Visual Cortex, in Handbook of Brain Theory and Neural Networks (M. Arbib, Ed.), MIT Press, pp. 823–826), and a method based on a multilayer perceptron and a radial basis function network.

As an attempt to faithfully model the information processing mechanism based on the neural network of a living organism, there have been proposed neural network model circuits for performing transmission representation using a train of pulses corresponding to action potentials (Murray et al., 1991 Pulse-Stream VLSI Neural Networks Mixing Analog and Digital Techniques, IEEE Trans. On Neural Networks, vol. 2, ppl 93–204; Japanese Patent Laid-Open No. 7-262157, Japanese Patent Laid-Open No. 7-334478, Japanese Patent Laid-Open No. 8-153148, the gazette of Patent No. 2879670, etc.).

In implementing the prior arts mentioned above by using circuitry or the like, especially concerning the application to image recognition, there have been no methods available for representing information regarding a two-dimensional pattern by utilizing dynamic characteristic on a time base, and using the represented information for recognition or the like at any level of an a processing device, a module, or a system, which makes up a function of each processing unit (e.g. the extraction of a feature).

More specifically, in many cases, it has been assumed that the processing is progressed on the basis of a transition pattern formed of a finite number of states (typically composed of fire and non-fire) at a certain time of a processing element or module in which spatial pattern information has been spatially disposed. In addition, the application has been limited to the processing in a domain of digital representation of information.

For the reason described above, the information processing capability has been limited, and the implementation in the form of circuitry tends to inevitably involve an unduly large scale and high cost. In particular, the proportion of a large number of wiring for the connection among neurons has been considerably high in the entire area, and this has been posing a problem.

Therefore, as a solution to the wiring problem in neural networks, there has been proposed a method in which the addresses of pulse output neurons are encoded in an event driven manner known as an address event representation (hereinafter referred to "AER") (Lazzaro, et al. 1993, Silicon Auditory Processors as Computer Peripherals, In Tourestzky, D.(ed), Advances in Neural Information Processing Systems 5. San Mateo, Calif.:Morgan Kaufmann Publishers). According to this method, the IDs of the neurons outputting trains of pulses are encoded in a binary mode as addresses so as to allow the neurons that receive the addresses to automatically decode the addresses of the originating neurons even if the output signals from different neurons are temporally arranged on the same bus.

The AER, however, has been presenting a problem in that a device for sequentially coding and decoding the addresses of neurons is required, making a circuit configuration complicated.

There is another method available for recognizing or detecting a specific object by a neural network formed of neurons generating trains of pulses. This method employs a model of a high order (a second order or higher) by Eckhorn, et al. that is based on linking inputs and feeding inputs (Eckhorn, et al. 1990, Feature linking via synchronization among distributed assemblies: Simulation of results from cat cortex, Neural Computation, Vol. 2, pp. 293–307), i.e., a pulse coupled neural network (hereinafter referred to as "PCNN")(U.S. Pat. No. 5,664,065 and Broussard, et al. 1999, Physiologically Motivated Image Fusion for Object Detection using a Pulse Coupled Neural Network, IEEE Trans. On Neural Networks, vol. 10, pp. 554–563, etc.).

However, no literature, including the literature concerning PCNN mentioned above, has disclosed any specific configurations based on a neural network in a method for implementing a recognition function by utilizing analog information, such as the interval between spikes, of a train of spikes in a time base domain for the coding or the like of image information in a neural network model for carrying out predetermined processing by inputting, outputting, or transmitting trains of spikes.

Regarding an image recognition algorithm, a system has been sought after, whose performance, in particular, is independent of the position, size, etc. of an object to be recognized on a screen. Many systems have been proposed in the past to respond to such needs. For example, recognition invariant against changes in scale or rotation can be achieved by carrying out "conformal mapping conversion" as preprocessing.

To be more specific, the Log-Polar coordinate transform is carried out on a logarithm of the distance from the central point of an object to be recognized in an image and the rotational angle thereof. This causes a change in size or rotation of the same object to be converted into a parallel movement on a coordinate system after the conversion. Thereafter, when a feature quantity (e.g. a correlation coefficient) is calculated, the object to recognize will be detected in terms of the same feature quantity. The invariance of detection performance against positional changes can be obtained by sequentially shifting the central point of the conversion so as to perform detection at each position.

Furthermore, there has been pointed out the possibility of performing similar size-invariant detection by obtaining multi-scale representation for each local region on a given image and further carrying out the conformal mapping conversion mentioned above (Wechsler, H. 1992, "Multiscale and Distributed Visual Representations and Mappings for Invariant-Low-Level Perception" in Neural Networks for Perception, Vol. 1, Wechssler H. Ed. pp. 462–476., Academic Press, Boston).

Thus, a method in which the conventional predetermined mapping conversion (conformal mapping conversion, etc.) is performed to implement pattern recognition wherein recognition performance is invariant on objects to be recognized that have different scales has been posing a problem in that it is difficult to obtain scale-invariant features unless the central point of conversion is properly set.

The following will describe the examples using another type wherein the feature quantity regarding the similarity to the model of an object to be recognized is calculated, and the recognition can be achieved without relying on size. One of such examples is a method in which the model data of an object to be recognized is represented in varying scales as template models beforehand, and template matching with an input image or its feature vectors is carried out from coarse to fine (Rosenfeld and Vanderburg, 1977, Coarse to fine template matching, IEEE Trans. Systems, Man, and Cybernetics, vol. 2, pp. 104–107). In another method, an input pattern is mapped onto an eigen-image function space obtained by performing the principal component analysis of model images of objects in varying sizes, and the distance from models in a feature space is calculated (Japanese Patent Laid-Open No. 8-153198, Murase, Nayar, 1995, Image spotting of 3D object by multiple resolution and eigenspace representation, Information Processing Academy Proceedings, vol. 36, pp. 2234–2243; Murase and Nayar, 1997, Detection of 3D objects in cluttered scenes using hierarchical eigenspace, Pattern Recognition Letters, pp. 375–384). In yet another method, the position and size of a corresponding region are calculated and normalized on the basis of the distance image data on an object to be recognized, then matching is performed (Japanese Patent Laid-Open No. 5-108804). In still another method, the multiple resolution data regarding an object to be recognized is shifted in the order from a low resolution level to a high resolution level thereby to perform recognition, including matching (Japanese Patent Laid-Open No. 8-315141).

The method based on the template matching has been presenting a problem in terms of practicality in that, when performing matching with the template models in different scales that have been represented beforehand, high recognition performance cannot be achieved unless an object in an input image substantially matches with one of the scales, meaning that numerous different template models are required.

In the method disclosed in Japanese Patent Laid-Open No. 8-153198 wherein the parametric eigenspace obtained by performing the principal component analysis of model images of an object on a finite number of different sizes, the changes in size are represented by manifolds on a parametric eigenspace, so that objects in different sizes can be successively recognized. This method, however, has been presenting a problem in that the dimension of covariance matrix is large (e.g., 16,384 dimensions in the case presented by Murase and Nayar in 1995), inevitably requiring enormously high cost for calculating eigenvectors. In order to obtain adequate accuracy to successfully deal with the changes in size, reference images having different sizes of about five steps of 1.1-fold, 1.2-fold, 1.3-fold, 1.4-fold, and 1.5-fold ($=\alpha$) of a reference size must be prepared to calculate eigenvectors, then an input image must be converted into sizes of $\alpha^{-1}$-fold, $\alpha^{-2}$-fold, $\alpha^{-3}$-fold, etc. This has been requiring an extremely large memory space and an enormously long time for computation to complete the processing.

According to the method disclosed in Japanese Patent Laid-Open No. 8-315141, the matching is performed from low resolution to high resolution in sequence on multi-resolution representation data regarding an object that has been prepared in advance. Therefore, to perform scale-invariant recognition, it is necessary to provide a sufficiently high multiplexing level of resolutions to be prepared beforehand, leading to poor processing efficiency. For this reason, the method may be suited for acquiring rough information by using less memories, but unsuited for recognition or detection requiring high accuracy.

As a method employing time-series input images, there is one in which a plurality of hypotheses regarding an object to be recognized that compete with each other are generated from an image, the hypotheses are temporally accumulated, then input to a category classifier, such as ART2 by Carpenter et al. (Seibert, et al. 1992, Learning and recognizing 3D objects from multiple views in a neural system, in Neural Networks for Perception, vol. 1 Human and Machine Perception (H. Wechsler Ed.) Academic Press, pp. 427–444).

As a pattern recognizing method based on a neural network model obtained from a clue based on an information processing mechanism of a living organism, there is one in which a dynamic routing network is used to obtain scale- and position-invariant representation centering around an object (Anderson, et al. 1995, Routing Networks in Visual Cortex, in Handbook of Brain Theory and Neural Networks (M. Arbib, Ed.), MIT Press, pp. 823–826, Olhausen et al. 1995, A Multiscale Dynamic Routing Circuit for Forming Size- and Position-Invariant Object Representations, J. Computational Neuroscience, vol. 2 pp. 45–62). According to this technique, a hierarchical representation (multi-resolution representation) based on a plurality of different resolutions is made in advance on image data, and information routing is performed through the intermediary of a control neuron that has a function for dynamically setting connection weight, thereby mapping the information at different resolutions onto a representation centering around an object.

The method based on the dynamic routing network (Anderson et al., 1995; Olshausen et al., 1995) requires a mechanism for dynamically setting the connection between nerve cell elements between predetermined scale levels by a local competing process among control neurons, thus presenting a problem in that the circuit configuration inevitably becomes complicated.

The method in which competing hypotheses are generated and input to a category classifier (Seibert et al. 1992) is based on time-series images, making it inherently difficult to accomplish scale-independent recognition from a single still picture.

In an image recognition algorithm, it is considered important to reduce the computation cost or weight required for recognition processing by accomplishing recognition typically by selectively shifting attended region from analogy with a biological system processing.

For instance, according to the hierarchical information processing method disclosed in Japanese Examined Patent Publication No. 6-34236, a plurality of descending signal pathways that are directed from an upper layer to a lower layer to match a plurality of ascending signal pathways directed from a lower layer to an upper layer are provided among a plurality of hierarchies that have feature extracting element layers and feature integration layers that provide outputs based on the outputs from feature extracting elements associated with the same feature. The transmission of ascending signals is controlled in response to the descending signals from an uppermost layer so as to perform segmentation by selectively extracting self-recollecting associative capability and a specific pattern, thereby setting a processing region or a fixation region for recognition.

First, the method disclosed in Japanese Examined Patent Publication No. 6-34236 is based on an assumption that there is a descending signal pathway paired with an ascending signal pathway in a hierarchical neural circuit configuration. Hence, a neural circuit of approximately as large as the neural circuit corresponding to the ascending signal pathway is required as a circuit that forms the descending signal pathway, disadvantageously resulting in an extremely large circuit scale.

In addition, this method is provided with no mechanism for controlling the sequential change of fixation positions, posing a problem in that the operation is unstable when setting or changing an attended region due to the influences of noises or other factors. More specifically, interactions exist throughout all hierarchies between the elements of an intermediate layer of the ascending pathway and the elements of an intermediate layer of the descending pathway, and a fixation position is finally determined through all the interactions. This has been presenting a problem in that, if there are a plurality of objects that fall within the same category, then the positions of fixation points are not controlled to sequentially shift among the objects in a stable manner, causing a fixation position to librate only between particular objects or in the vicinity thereof.

There has been another problem in that, if there are a plurality of objects that fall within the same category as that of an object to be detected or recognized in input data, then subtle adjustment of network parameters must be made whenever processing for a plurality of objects (substantially non-attention processing) simultaneously occurs or whenever attention position updating is performed.

According to U.S. Pat. No. 4,876,731, the aforesaid ascending signal pathway and the descending signal pathway are controlled on the basis of contextual information (rule data base, probabilistic weighting) from an output layer, i.e., an uppermost layer.

According to U.S. Pat. No. 2,856,702, modifying recognition refers to attention. A pattern recognizing apparatus is provided with an attention degree determiner for selecting an attention degree for each part region in order to accomplish accurate recognition if a pattern cannot be identified, and an attention degree controller for performing recognition in which the selected attention degree has been reflected.

A system for controlling the setting of an attention region by selective routing, which has been proposed by Koch and Ullman in 1985 (Human Neurobiology, vol. 4, pp. 219–227), is provided with a salience level map extracting mechanism combining feature extraction and a selective mapping mechanism, an attention position selecting mechanism employing a "winner-take-all" (hereinafter referred to "WTA") neural network (refer to Japanese Patent Laid-Open No. 5-242069, U.S. Pat. No. 5,049,758, U.S. Pat. No. 5,059,814, U.S. Pat. No. 5,146,106, etc.), and a mechanism for inhibiting neural elements at a selected position.

In the system based on the selective routing described above, in the control of attended positions, it is not easy to efficiently control the attended position because the system is equipped only with a mechanism for inhibiting a selected region. Hence, there have been some cases where the control of the positions of attended points is focused on a particular object or a particular portion.

According to the method based on the aforesaid dynamic routing network, information routing is performed through the intermediary of a control neuron that has a function for dynamically setting connection weight thereby to control attended regions and convert a feature representation of an object to be recognized that is centered on an observer into a representation centered on the object.

However, the system using the dynamic routing network reconfigures interlayer connection through the intermediary of many control neurons for which synaptic connection weight can be dynamically changed, so that the circuit configuration inevitably becomes complicated. In addition, the control neurons involve bottom-up processing based on the feature salience level of a lower layer, so that it has been difficult to achieve efficient control of attended positions if a plurality of objects of the same category are present.

In the method based on selective tuning (Culhane & Tsotsos, 1992, An Attentional Prototype for Early Vision. Proceedings of Second European Conference on Computer Vision, (G. Sadini Ed.), Springer-Verlag, pp. 551–560), search is carried out by a mechanism that activates only winners from a WTA circuit of an uppermost layer to a WTA circuit of a lower layer so as to decide the position of an overall winner of the uppermost layer, in a lowermost layer, which is the layer directly receiving input data. The selection of a position and the selection of a feature that are made in attention control are implemented by inhibiting a connection irrelevant to the position of an object and by inhibiting an element that detects a feature irrelevant to the object.

The system based on selective tuning hierarchically and dynamically performs pruning-like selection in which a connection not related to a selected object is merely pruned. This has been posing a problem in that, if a plurality of objects are present, then it is not easy to efficiently control the positions of fixation points.

Furthermore, the prior arts described above have the following disadvantages in common.

Firstly, none of the systems described above are provided with mechanisms capable of dealing with different sizes of objects to be recognized. Therefore, if objects in different sizes simultaneously exist at a plurality of positions, then it has been required to tune network parameters to each of a plurality of scenes wherein the sizes of the objects to be recognized are different.

Secondly, if there are a plurality of objects that belong to the same category at a plurality of positions in input data, it has been impossible to evenly and efficiently shift or update attended positions across the objects.

Incidentally, it has been generally known that using analog circuit elements makes it possible to achieve a simplified circuit configuration, which means less elements, higher speed, and lower power consumption, as compared with a digital system. On the other hand, however, the circuit configurations using analog circuit elements have been presenting problems with immunity to noises, and reliability of input/output features attributable to variations in the characteristic of individual elements.

SUMMARY OF THE INVENTION

Accordingly, it is an object of the present invention to provide a pattern detecting apparatus that enables highly accurate detection of a predetermined pattern by using a smaller circuit, by dramatically improving an information processing capability for detecting patterns.

It is another object of the present invention to provide an apparatus and a method for detecting patterns, whereby representation of information regarding a two-dimensional pattern can be performed by utilizing dynamic features on a time base, and the representation can be used for recognition or the like.

It is yet another object of the present invention to achieve a low-cost neural network with a simple construction by reducing the number of wiring involved in connection between neurons.

It is still another object of the present invention to provide an apparatus and a method for detecting patterns that are capable of successfully dealing with different sizes of objects to be recognized.

It is a further object of the present invention to provide an apparatus and a method for detecting patterns that are capable of efficiently shifting attended positions when a plurality of objects that belong to the same category exist at a plurality of positions in input data.

According to one aspect, the present invention which achieves these objectives relates to a pattern detecting apparatus having input means for inputting a pattern, and pattern detecting means that has a plurality of signal processing elements and performs detection related to a plurality of predetermined features on a pattern input by the input means so as to detect a predetermined pattern included in the pattern, wherein each of the plurality of signal processing elements outputs a pulse signal to another signal processing element or outside in response to an input from the input means or another signal processing element, and predetermined ones among the plurality of signal processing elements output pulse signals at output levels based on arrival time patterns of a plurality of pulse signals input within a predetermined time range.

According to another aspect, the present invention which achieves these objectives relates to a pattern detecting method including the steps of receiving a pattern from an input section, and subjecting the received pattern to detection on a predetermined plurality of features thereby to detect a predetermined pattern included in the pattern by employing a plurality of signal processing elements, wherein the step of subjecting the received pattern to detection includes the steps of outputting a pulse signal to another signal processing element or outside in response to an input from the input section or another signal processing element from each of the plurality of signal processing elements, and outputting pulse signals, from predetermined ones among the plurality of signal processing elements, at output levels based on arrival time patterns of a plurality of pulse signals input within a predetermined time range.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 is a flowchart showing a processing procedure of each layer;

FIG. 21 shows a network configuration used in a fifth embodiment;

FIG. 22 shows a network configuration used in a sixth embodiment;

FIG. 23 shows the transition of a signal train of the fifth embodiment;

FIG. 25 schematically illustrates a hierarchical representation involving different scale levels or resolutions;

DESCRIPTION OF THE PREFERRED EMBODIMENTS

Referring now to the accompanying drawings, a preferred embodiment according to the present invention will be described in detail.

First Embodiment

A first embodiment in accordance with the present invention will now be described in detail with reference to the accompanying drawings.

According to the embodiment, to accomplish pattern recognition by using a neural network, spatial pattern information is represented by using dynamic neural features (e.g., the spatiotemporal firing feature of a spike train, the input feature obtained by spatiotemporal integration by a neuron, and spike intervals of a spike train) in the time domain. Thus, the information processing capability for recognizing spatial patterns is dramatically improved, making it possible to provide a pattern detecting apparatus capable of achieving highly accurate detection by using a smaller circuit scale.

Overview of General Configuration

Figure 1:
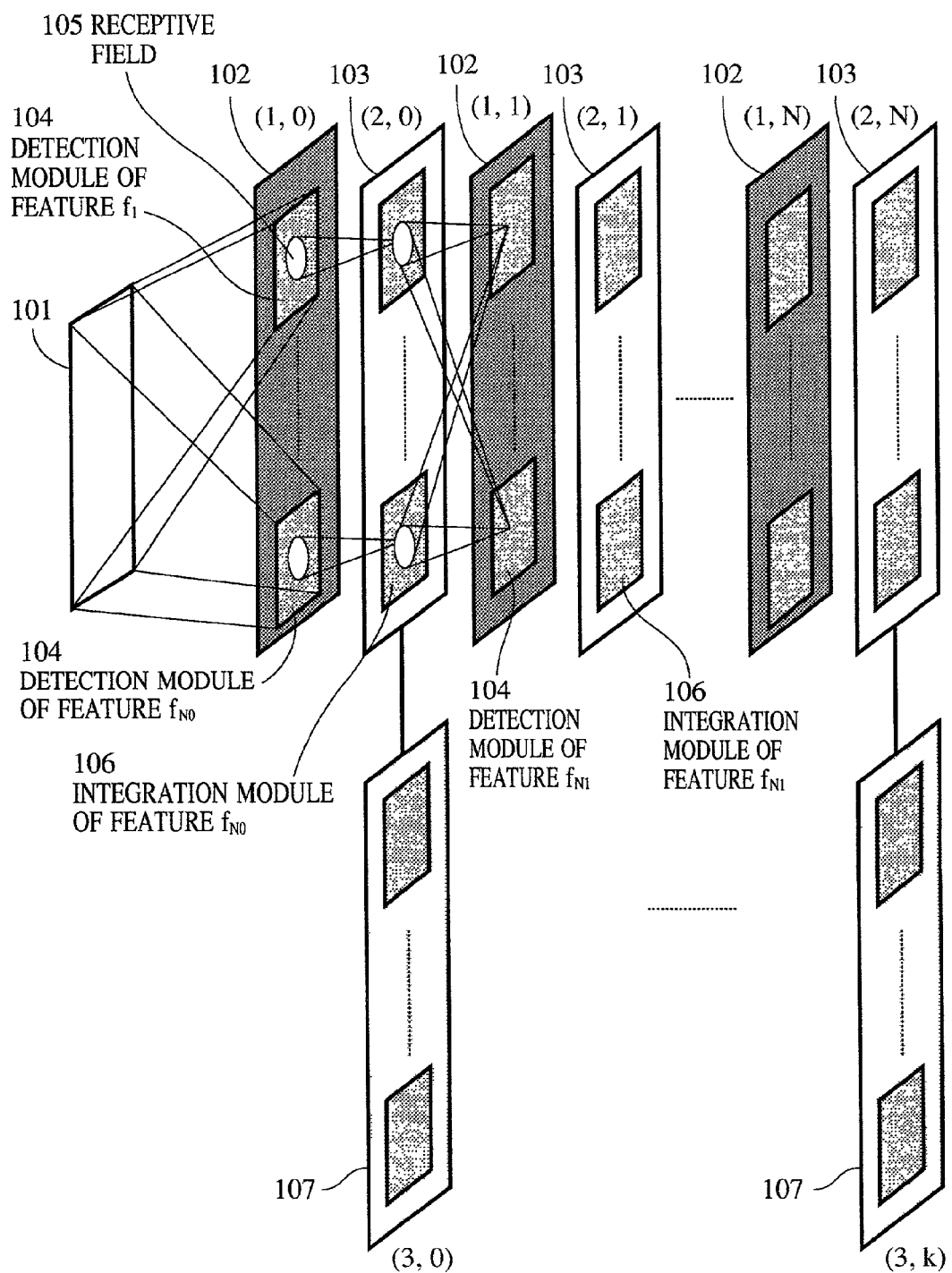
FIG. 1 is a block diagram showing a network configuration according to an embodiment of the present invention.

FIG. 1 shows a general construction of a pattern detecting or recognizing apparatus according to the embodiment. In this apparatus, pattern information is processed by a What pathway and a Where pathway. The What pathway mainly handles information related to the recognition or detection of an object or a geometric feature, whereas the Where pathway mainly handles information related to the position or disposition of an object or a feature.

The What pathway has a "convolutional network structure" (refer to LeCun, Y. and Bengio, Y., 1995, "Convolutional Networks for Images Speech, and Time Series" in Handbook of Brain Theory and Neural Networks (M. Arbib, Ed.), MIT Press, pp. 255–258). The What pathway, however, differs from a prior art in that interlayer connection in the same pathway may make mutual connection, which will be discussed hereinafter. A final output of the What pathway corresponds to a recognition result, i.e., the category of a recognized object. The final output of the Where pathway represents a position associated with a recognition result.

A data input layer 101 is constituted by a photoelectric transducer, such as a CMOS sensor or a CCD, in an apparatus for detecting and recognizing images, or by a voice input sensor in an apparatus for detecting and recognizing voice. Alternatively, the data input layer 101 may receive higher-order data obtained from an analysis result of a predetermined data analyzer (e.g., the principal component analysis and vector quantization). The data input layer 101 supplies the same data to the foregoing two pathways.

The descriptions will now be given of a case where an image is input. The What pathway includes feature detection layers 102 ((1,0), (1,1), . . . , (1,N)) and feature integration layers 103 ((2,0), (2,1), . . . , (2,N)).

The first feature detection layer (1,0) carries out Gabor wavelet transform or the like to detect a plurality of local low-order features or types thereof of an image pattern received from the data input layer 101 at individual positions on the entire screen or at predetermined sampling points throughout the entire screen. In this case, the local low-order features may include geometric features and color component features. For this purpose, each layer has receptive fields 105 and a plurality of detection modules 104 for detecting different features. The respective detection modules 104 have receptive field structures for different types of feature quantities, and are composed of neurons that produce pulse trains accordingly. For example, to extract a line segment in a predetermined direction as a geometric feature, the detection module 104 has a receptive field structure adapted for the inclination of the line segment, which is a geometric structure thereof.

The feature integration layer 103 (2,0) has a plurality of feature integration modules 106. Each of the feature integration modules 106 has a predetermined receptive field structure, and is composed of neuron elements producing pulse trains. By performing sub-sampling computation, such as local averaging or detection of maximum output in the receptive field, each of the feature integration modules 106 integrates a plurality of neuron element outputs in the same receptive field that are received from the feature detection layer 102 (1,0). The receptive fields share the same structure among the neurons in the same layer.

Subsequent layers, namely, the feature detection layers 102 ((1,1), (1,2), . . . , (1,N)) and the feature integration layers 103 ((2,1), (2,2), . . . , (2,N)) have predetermined receptive field structures acquired by learning. As in the case of the aforesaid layers, the former layers ((1,1), . . . ) detect a plurality of different features in the feature detection modules 104, whereas the latter layers ((2,1), . . . ) integrate detection results regarding a plurality of features received from the feature detection layer 102 in a preceding stage, and have the similar function and structure as those of the feature integration layer 103 (2,0).

The Where pathway having feature position detection layers 107 ((3,0), . . . , (3,k)) receives the outputs of predetermined (not necessarily all) feature integration layers 103 on the What pathway, and are involved in the outputs of the positions of low-order, medium-order, and high-order features. In the following descriptions, no further detailed explanation will be given to each layer of the Where pathway.

Figure 2A:
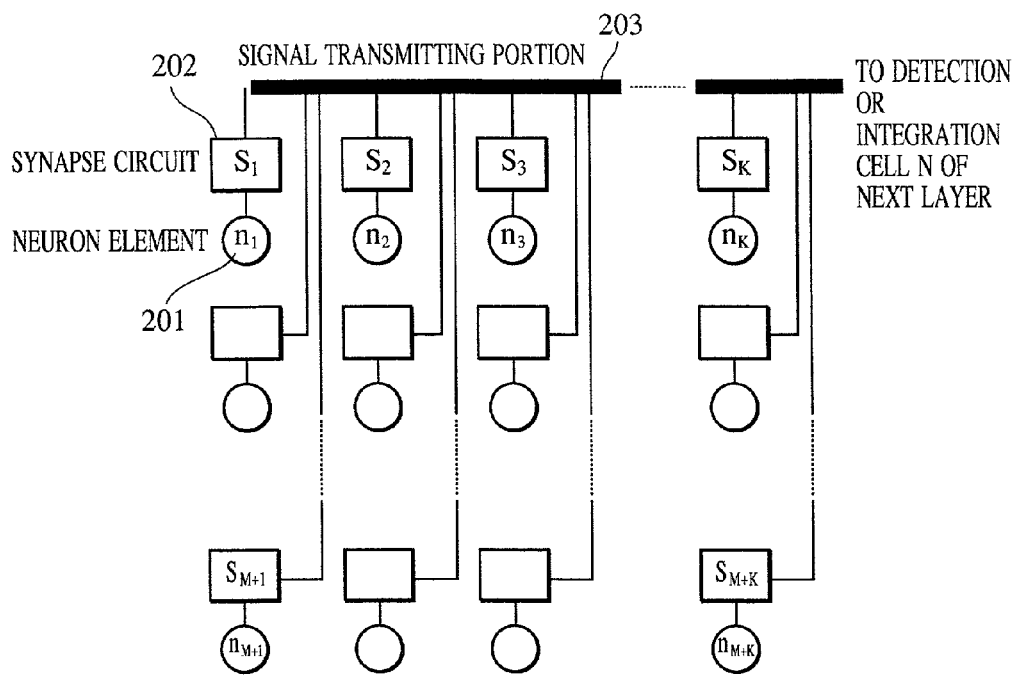
FIG. 2 shows the configurations of a synapse unit and a neuron element unit.

As shown in FIG. 2A, a structure for connecting neuron elements 201 between layers includes a signal transmitting portion 203 (wire or a delay line) corresponding to an axial fiber or dendrite of a nerve cell, and a synapse circuit S 202. FIG. 2A shows a configuration of connection related to an output from a neuron group $(n_i)$ of a feature integration or detection cell that forms a receptive field for a certain feature detection or integration cell N (the output in this case is the input as observed from the cell N). The signal transmitting portion 203 indicated by a bold line constitutes a common bus line, and pulse signals from a plurality of neurons are arranged in time series on the signal transmission line and transmitted. The same configuration is used for receiving an input from a destination cell N. In this case, input signals and output signals may be divided and processed on a time base in the exactly the same configuration, or they may be processed by forming the similar configuration to that shown in FIG. 2A by using two systems, one for input (the dendrite end) and the other for output (the axial fiber end).

The synapse circuits, $S_1$ to $S_k$, such as synapse circuit $S_1$ 202, come in two types. One type is adapted for interlayer connection, which is the connection between a neuron on the feature detection layer 102 and a neuron on the feature integration layer 103, and each layer may have connection with its subsequent layer or preceding layer. The other type is adapted for connection between neurons in the same layer. The latter type is used, as necessary, for connection between a pacemaker neuron, which will be discussed hereinafter, and a feature detection or integration neuron.

In the synapse circuit S 202, "excitatory connection" amplifies a pulse signal, while inhibitory connection attenuates a pulse signal. When information is transmitted by pulse signals, the pulse signals can be amplified or attenuated by any one of amplitude modulation, pulse width modulation, phase modulation, or frequency modulation.

In this embodiment, the synapse circuit S 202 primarily functions as a pulse phase modulation device, and the amplification of a signal is handled as a substantial advance of a pulse arrival time as an amount intrinsic to the feature, while the attenuation is converted as a substantial delay. More specifically, as it will be discussed hereinafter, synaptic connection provides an arrival time or phase intrinsic to a feature at a destination neuron. Qualitatively, excitatory connection provides a phase advance of an arrival pulse in relation to a certain reference phase. Inhibitory connection also provides a delay.

Referring to FIG. 2A, each neuron element $n_j$ outputs a pulse signal or a spike train, and is an "integrate-and-fire type", which will be discussed hereinafter. As shown in FIG. 2C, the synapse circuit and the neuron elements may be combined into a circuit block.

The feature position detection layers 107 in the Where pathway shown in FIG. 1 receive the outputs of the feature integration layers 103 or the like of the What pathway. At lattice points that have been coarsely sampled while maintaining a positional relationship on the data input layer 101, only those neurons that are associated with the components useful for recognition (i.e., the components that have been registered beforehand from a pattern of a recognition category) in a feature extraction result on the What pathway will respond by means of filtering or the like.

For instance, in the uppermost layer in the Where pathway, the neurons associated with the category of an object to be recognized are arranged on a lattice to indicate the position where the object is present. The neurons in an intermediate layer in the Where pathway may be adapted to permit sensitivity adjustment or the like so that they respond only if a feature is detected that can be disposed, centering around the position where the object to be recognized exists, upon the receipt of a top-down input from an upper layer in the Where pathway, or an input supplied through a route formed of an upper layer of the What pathway→an upper layer of the Where pathway→an intermediate layer of the Where pathway.

When the Where pathway is used to perform detection of hierarchical features in which the positional relationship among detected features (the positional information) is maintained, the receptive field structure should be made so that it is local (e.g., elliptical) and gradually grows larger toward an upper layer, or stays at a constant size, which is larger than one pixel on a sensor surface, from an intermediate layer to an upper layer. This makes it possible to detect feature elements (graphic elements) in respective layers, while maintaining the positional relationship between feature elements, such as geometric structural elements and figural or graphic patterns, on a sensor surface to a certain extent.

As another mode of the Where pathway, a neural network may be applied wherein the receptive field hierarchically grows larger toward an upper layer, and in the uppermost layer, only the neuron that outputs a maximum value fires among the neurons associated with the category of a detected object. In such a system, the information regarding the dispositional relation or a spatial arrangement represented by phase in a data input layer is stored to a certain extent also in the uppermost layer and intermediate layers.

As another output mode of the Where pathway, an attended region of a predetermined size may be set on a data input layer from the feature salience map obtained from the output results of a feature detection layer 102 (1,0), and the position and size of the set region and the presence of the category of the object to be recognized therein may be output. As still another mode, a neural network may be applied wherein the receptive field hierarchically grows larger toward an upper layer, and in the uppermost layer, only the neuron that outputs a maximum value fires among the neurons associated with the category of a detected object. In such a system, the information regarding the dispositional relation or a spatial arrangement in a data input layer is stored to a certain extent also in the uppermost layer and intermediate layers.

Neuron Element

The neurons constituting each layer will now be described. Each neuron element is an extended model based on an "integrate-and-fire neuron", and is similar to the integrate-and-fire neuron in that it fires and outputs a pulse signal if a result obtained when input signals (pulse trains equivalent to action potentials) are linearly added in a spatiotemporally fashion exceeds a threshold value.

Figure 2B:
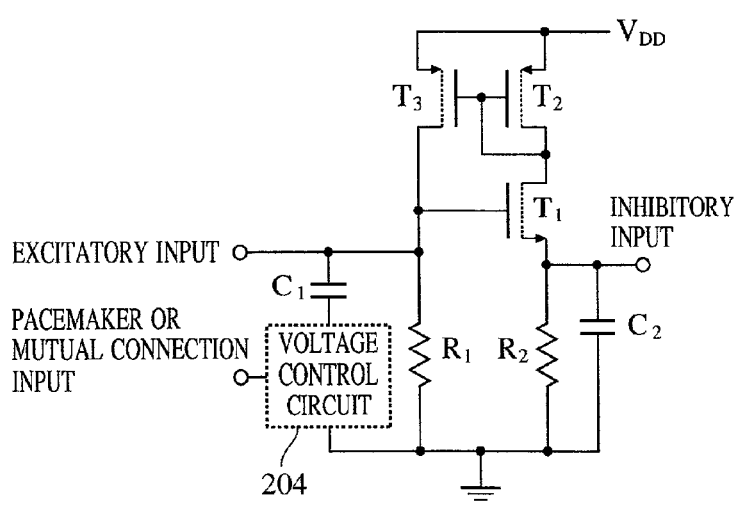
Figure 2C:
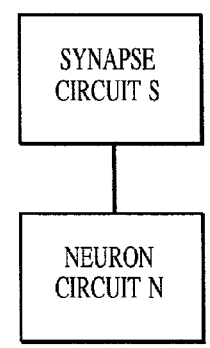

FIG. 2B shows an example of a basic configuration illustrating the principle of operation of a pulse generating circuit (CMOS circuit) acting as a neuron element. This has been obtained by extending a known circuit (refer to IEEE Trans. On Neural Networks Vol. 10, pp. 540). The example is configured to receive excitatory and inhibitory inputs.

The principle of operation of the pulse generating circuit will now be described. The time constant of a capacitor $C_1$ and resistor $R_1$ circuit connected to an excitatory input end is smaller than the time constant of a capacitor $C_2$ and resistor $R_2$ circuit, and transistors $T_1$, $T_2$, and $T_3$ are turned OFF in a steady state. The resistors are actually constructed by transistors coupled in a diode mode.

When the potential of the capacitor $C_1$ increases and exceeds the potential of the capacitor $C_2$ by the threshold value of the transistor $T_1$, the transistor $T_1$ is actuated, causing the transistors $T_2$ and $T_3$ to be active. The transistors $T_2$ and $T_3$ make up a current mirror circuit, and the output of the circuit shown in FIG. 2B is output at the end of the capacitor $C_1$ by an output circuit (not shown). When a charge storage amount of the capacitor $C_2$ reaches a maximum level, the transistor $T_1$ is turned OFF, causing the transistors $T_2$ and $T_3$ to be turned OFF also, and a positive feedback becomes zero.

During a "refractory period", the capacitor $C_2$ discharges, and the neurons do not respond unless the potential of the capacitor $C_1$ is larger than the potential of the capacitor $C_2$ and the difference therebetween exceeds by the threshold value of the transistor $T_1$. The repetition of alternate charging and discharging of the capacitors $C_1$ and $C_2$ causes periodical pulses to be output, the frequencies thereof being generally decided on the basis of the level of an excitatory input. However, the presence of the refractory period makes it possible to limit the maximal frequency, or to output a constant frequency.

The potentials, i.e., the charge storage amounts, of the capacitors are temporally controlled by a reference voltage control circuit (a time window weighting function generating circuit) 204. The control characteristic is reflected in the weighted addition of input pulses in a time window (refer to FIG. 7). The reference voltage control circuit 204 generates a reference voltage signal, which corresponds to the weighting function shown in FIG. 7B, at an input timing from a pacemaker neuron (which will be discussed hereinafter), or on the basis of an input via mutual connection with a neuron of a succeeding layer.

In this embodiment, there are cases where the inhibitory inputs are dispensable; however, setting the inputs from a pacemaker neuron (which will be discussed later) to a neuron of a feature detection layer to inhibitory inputs makes it possible to prevent outputs from being diverged or saturated.

In general, the relationship between the total sum of input signals and an output level (pulse phase, pulse frequency, pulse width, etc.) depends on the sensitivity of each neuron. The sensitivity can be changed by supplying a top-down input from an upper layer. In the following descriptions, for the convenience of explanation, it will be assumed that circuit parameters have been set so that the frequencies of pulse outputs based on total sum values of input signals steeply rise (substantially binary in a frequency domain accordingly). It is also assumed that output levels, including timings subjected to phase modulation, vary according to pulse phase modulation.

For a pulse phase modulator, the circuit shown in FIG. 5, which will be described hereinafter, may be added. This causes the weighting function in a time window to be controlled by the foregoing reference voltage so as to change the phase of a pulse output from the neuron, and the updated phase can be referred to the output level of the neuron.

Figure 7A:
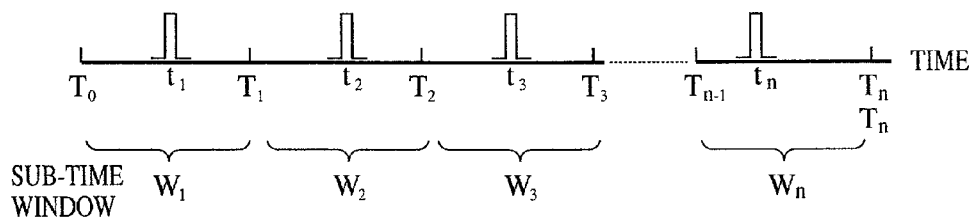
FIG. 7 shows the configuration of a time window, an example of the distributed weighting functions, and an example of feature elements, which are applied to process a plurality of pulses for different feature elements supplied to feature detection neurons.
Figure 7B:
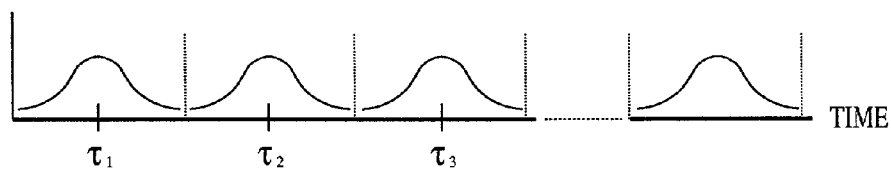

Time $\tau_{w1}$ is equivalent to a maximal value of the weighting function shown in FIG. 7B that characterizes the temporal integration or a receiving sensitivity on a pulse subjected to pulse phase modulation by synaptic connection is generally set to be temporally earlier than an expected pulse arrival time $\tau_{s1}$ intrinsic to a feature imparted by synaptic connection. As a result, for pulses that arrive earlier than the expected arrival time by a predetermined range, the neuron receiving these pulses temporally integrates them as a pulse signal having a high output level. In the example shown in FIG. 7B, pulses that arrive too early are attenuated. The shapes of the weighting functions are not limited to symmetrical shapes, such as Gaussian; instead, the weighting function may take an asymmetrical shape. It should be noted that the center of each weighting function shown in FIG. 7B is not an expected pulse arrival time.

The start of a time window provides the reference for the phase of a neuron output (before synapse), as it will be discussed hereinafter, and a delay in phase from the reference is determined by a charge storage amount when a reference pulse based on a pacemaker output, etc. is received. A detailed explanation of a circuit configuration for imparting such an output characteristic will be omitted, because it is not related to the main topic of the present invention. A post-synaptic pulse phase is obtained by adding the pre-synaptic phase to a specific phase modulation amount supplied by the synapse.

As an alternative, a known circuit configuration may be used that is adapted to supply an oscillation output with a predetermined delay in timing when a total sum value of inputs obtained by using a window function or the like exceeds a threshold value.

The neuron element is a neuron that belongs to the feature detection layer 102 or the feature integration layer 103, and has a circuit configuration in which the neuron outputs a pulse with a phase delay based on the input level (given by a simple sum or weighted total sum value of the aforesaid inputs) received from the receptive field of the layer in the preceding stage after it receives a pulse output from a pacemaker neuron when a fire pattern is controlled on the basis of the output timings of the pacemaker neuron, which will be discussed hereinafter. In this case, before a pulse signal is received from the pacemaker neuron, a transient transitional state exists wherein neurons output pulses in random phases to each other according to input levels.

As it will be described hereinafter, if no pacemaker neuron is used, then a circuit configuration may be used in which a synchronous firing signal obtained by the mutual connection of neurons between the feature detection layer 102 and the feature integration layer 103 and network dynamics is used as the reference, and the fire timings for output pulses of feature detection neurons are controlled according to the aforesaid input levels.

The neuron of the feature detection layer 102 has a receptive field structure based on its feature category, as described above. When the total weighted sum value (which will be discussed hereinafter) obtained by the time window function of an input pulse signal in a current value or potential from a neuron of a layer (the input layer 101 or the feature integration layer 103) in the preceding stage exceeds the threshold value, a pulse is output at an output level that takes a nondecreasing and nonlinear function that is asymptotically saturated to a predetermined level, such as a sigmoid function, namely, "a squashing function value", given by the total sum value. In this case, the output levels depend on the changes in phase; however, they may alternatively depend on the changes in frequency, amplitude, or pulse width reference.

In the feature detection layer 102 (1,0), when it is assumed that there is a neuron N1 for detecting a structure (low-order feature) of a pattern that has a predetermined spatial frequency in a local region of a certain size and a predetermined directional component, if a corresponding structure exists in the receptive field of the neuron N1 on the data input layer 101, then the neuron N1 outputs a pulse in the phase based on the salience or contrast thereof. Such a function can be implemented by a Gabor filter. The following will describe a feature detection filtering function implemented by each neuron of the feature detection layer 102 (1,0).

Processing at Feature Integration Layers (Extraction of Low-Order Feature)

In the feature detection layer (1,0), Gabor wavelet transform represented by a filter set of multi-scale and multi-directional component is carried out. Each neuron or each group composed of a plurality of neurons in the layer has a predetermined Gabor filtering function.

The Gabor wavelet is obtained by modulating a sinusoidal wave having a predetermined directional component and spatial frequency by the Gaussian function, and is specified by an index m of a scaling level and an index n of the directional component, as given by expression (1) shown below. The filter set as the wavelet have functional shapes similar to each other, but have different main directions and sizes from each other. It has been known that the wavelets are localized in the spatial frequency domain and real-space domain, the simultaneous uncertainty regarding space and spatial frequency is minimized, and the wavelet is the most localized function in both real space and frequency space (J, G. Daugman (1985), Uncertainty relation for resolution in space, spatial frequency, and orientation optimized by two-dimensional visual cortical filters, Journal of Optical Society of America A, vol. 2, pp. 1160–1169).

$$g_{mn}(x, y) = \frac{a^{-m}}{2\pi\sigma_x\sigma_y}\exp[h_{mn}(x, y)] \quad (1)$$

$$h_{mn}(x, y) = -\frac{1}{2}\left\{\frac{(x\cos\theta_n + y\sin\theta_n)^2}{a^{2m}\sigma_x^2} + \frac{(-x\sin\theta_n + y\cos\theta_n)^2}{a^{2m}\sigma_y^2}\right\} - \frac{i2\pi W(x\cos\theta_n + y\sin\theta_n)}{a^m}$$

where (x,y) denotes a position in an image, "a" denotes a scaling factor, $\theta_n$ denotes the directional component of a filter, W denotes a fundamental spatial frequency, and $\sigma_x$ and $\sigma_y$ denote parameters that give the width in a direction "x" and a direction "y", respectively, of a filter function. In this embodiment, $\theta_n$ takes the values of six directions, namely, 0 degree, 30 degrees, 60 degrees, 90 degrees, 120 degrees, and 150 degrees. Reference character "a" is set to 2, and "m" takes an integer value from 1 to 4.

The parameters $\sigma_x$ and $\sigma_y$ and "a" that determine the characteristic of a filter are preferably set such that they properly overlap each other evenly in a Fourier domain so as not to cause biased sensitivity in any particular spatial frequency or direction. For this purpose, the parameters are designed such that, for example, the mesial magnitude levels of maximum amplitude values after Fourier conversion mutually contact one another in the Fourier domain, as shown below:

$$\sigma_u = \frac{\{-(a-1)U_H\}}{\{(a+1)\sqrt{2\ln 2}\}} \quad (2a)$$

$$\sigma_v = \tan\left(\frac{\pi}{2N}\right)\frac{(U_H^2 - (2\ln 2)\sigma_u^2)}{\sqrt{(2\ln 2)U_H^2 - (2\ln 2)^2\sigma_u^2}} \quad (2b)$$

$$a = \left(\frac{U_H}{U_L}\right)^{\frac{-1}{M-1}} \quad (3)$$

where $U_H$ and $U_L$ denote the maximum value and the minimum value, respectively, in a spatial frequency band covered by the wavelet transform, and M denotes a scaling level index within the covered range.

Two-dimensional convolutional computation of the respective filters $g_{mn}(x,y)$ and an input variable-density image is carried out to perform the Gabor wavelet transform, as shown below:

$$W_{mn}(x, y) = \int I(x_1, y_1)g_{mn}^*(x - y_1, y - y_1)dx_1dy_1 \quad (4)$$
$$= A_{mn}(x, y)\exp\{iP_{mn}(x, y)\}$$

where I denotes an input image, and $W_{mn}$ denotes a Gabor wavelet transform coefficient. The set of $W_{mn}$ (m=1, . . . , 4; n=1, . . . , 6) is taken as a feature vector applied at each point. The asterisk "*" indicates that a complex conjugate is taken. Thus, each neuron of the feature detection layer (1,0) has a receptive field structure based on $g_{mn}$, and outputs pulses at an output level which takes a nonlinear squashing function of a wavelet transform coefficient value obtained by inputting the sum of products of a distribution weighting factor and image data. In this embodiment, a phase-based representation is used, however, a frequency, amplitude, or pulse width may alternatively be used. Thus, the Gabor wavelet transform according to expression (4) has been performed to obtain the output of the entire layer (1,0).

Processing by Feature Integration Layers (Extraction of Medium- and High-order Features Unlike the neurons of the preceding detection layer, the neurons of the succeeding feature detection layers ((1,1), (1,2), . . . , (1,n)) are subject to "Hebb learning rule" or the like to form the receptive field structures for detecting features in the pattern to be recognized. In a latter layer, the size of a local region for detecting a feature gradually approaches the size of the entire object to be recognized. Latter layers detect geometrically medium- or high-order features. For instance, in detecting and recognizing a face, the medium- or high-order features refer to the feature at the level of graphic elements, such as eyes, nose, and mouth, making up the face. The neurons of the feature detection layer may have a mechanism for receiving inhibitory (shunting inhibition type) input determined by the output of a layer in the preceding stage to ensure stable outputs.

Processing at Feature Integration Layers

The neurons of the feature integration layers 103 ((2,0), (2,1), . . . ) will now be described.

As shown in FIG. 1, the connection from the feature detection layer 102 (e.g., (1,0)) to the feature integration layer 103 (e.g., (2,0)) is configured so as to receive inputs through the excitatory connection from neurons in the receptive field of the feature integration neuron of the same feature class or type in the preceding feature detection layer. Each neuron of the feature integration layer carries out sub-sampling by local averaging, such as calculating a mean value of inputs from neurons belonging to the receptive field of the feature detection neuron, for each feature category.

More specifically, in the operation of feature integration, a plurality of pulses of the same type of feature are input, and the pulses are integrated in a local region or receptive field, then subjected to averaging or the like. This allows reliable detection even if the position of the feature fluctuates or the feature deforms. Hence, the structure of receptive field of neurons in the feature integration layer may be configured to be uniform, independent of feature category. For example, every receptive field of neurons in the feature integration layer may be formed of rectangular regions of a predetermined size, and the sensitivity or weighting may be uniformly distributed therein.

Operation Principle of Pattern Detection

Figure 3A:
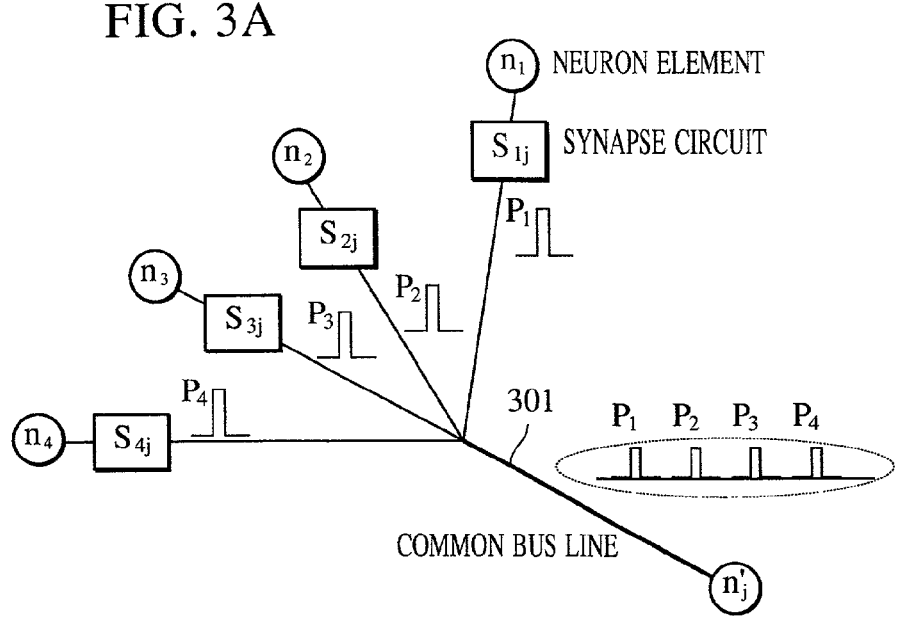
FIG. 3 shows how a plurality of pulses are propagated from a feature integration layer or an input layer to the neurons of a feature detection layer in the first embodiment.

The descriptions will now be given of the pulse coding and the detection method of two-dimensional graphic patterns. FIG. 3 schematically shows how pulse signals are propagated from the feature integration layer 103 to the feature detection layer 102 (e.g., from the layer (2,0) to the layer (1,1) shown in FIG. 1).

Neurons $n_i$ ($n_1$ through $n_4$) in the feature integration layer 103 are in charge of different feature quantities or feature elements. A neuron $n'_j$ of the feature detection layer 102 is related to the detection of a higher-order feature (graphic element) obtained by combining the features in the same receptive field.

Inter-neuron connection incurs a feature-specific delay attributable to a pulse propagation time and a time lag or the like in the synaptic connection ($S_{ij}$) from the neuron $n_j$ to the neuron $n'_j$. As a result, the pulses in a pulse train $P_i$ reaching at the neuron $n'_j$ via a common bus line 301 arrive in a predetermined order with predetermined intervals due to the delay amount in the synaptic connection determined by learning as long as pulses are output from the neurons of the feature integration layer 103. In the example shown in FIG. 3A, the pulses arrive in the order of $P_4$, $P_3$, $P_2$, and $P_1$.

Figure 3B:
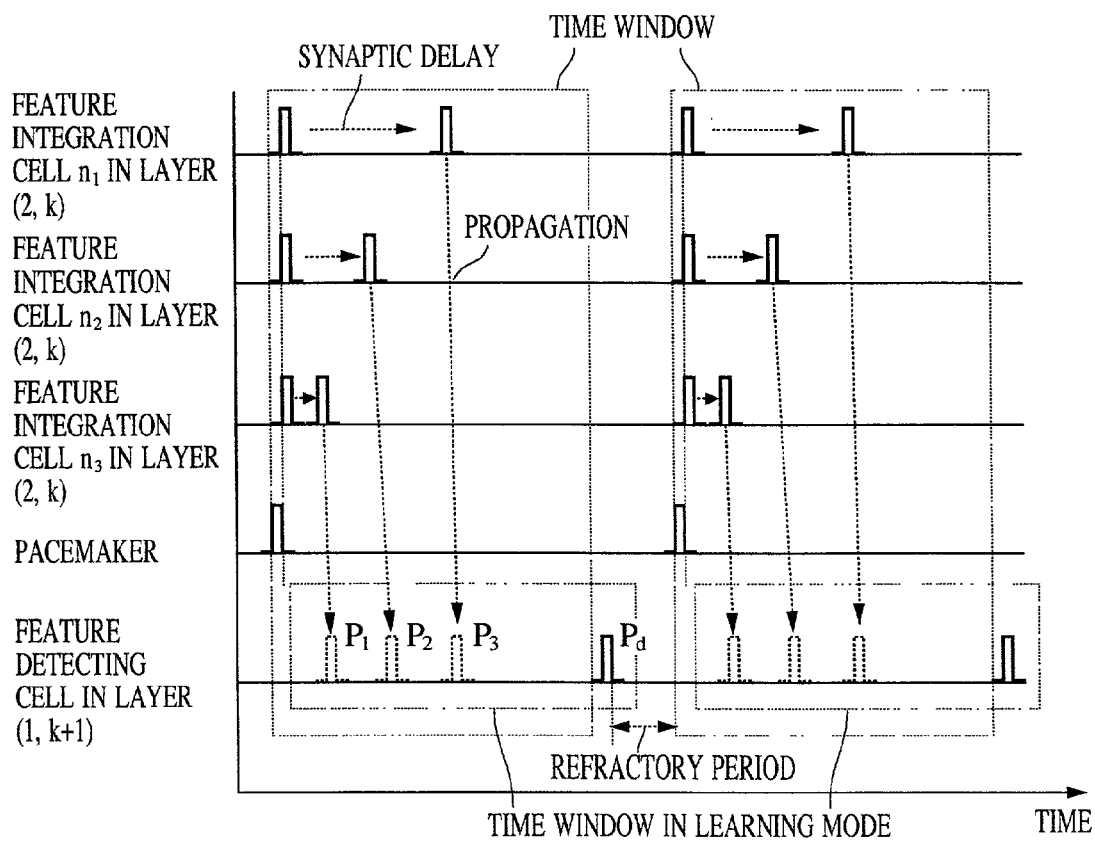

FIG. 3B mainly illustrates the timings at which pulses are propagated from feature integration cells $n_1$, $n_2$, and $n_3$, each representing a different type of feature, on a layer numbered (2,k) to a feature detection cell ($n'_j$), which detects a higher-order feature, on a layer numbered (1, k+1) when the synchronization control of the time window is performed by using the timing signals from a pacemaker neuron.

Figure 6:
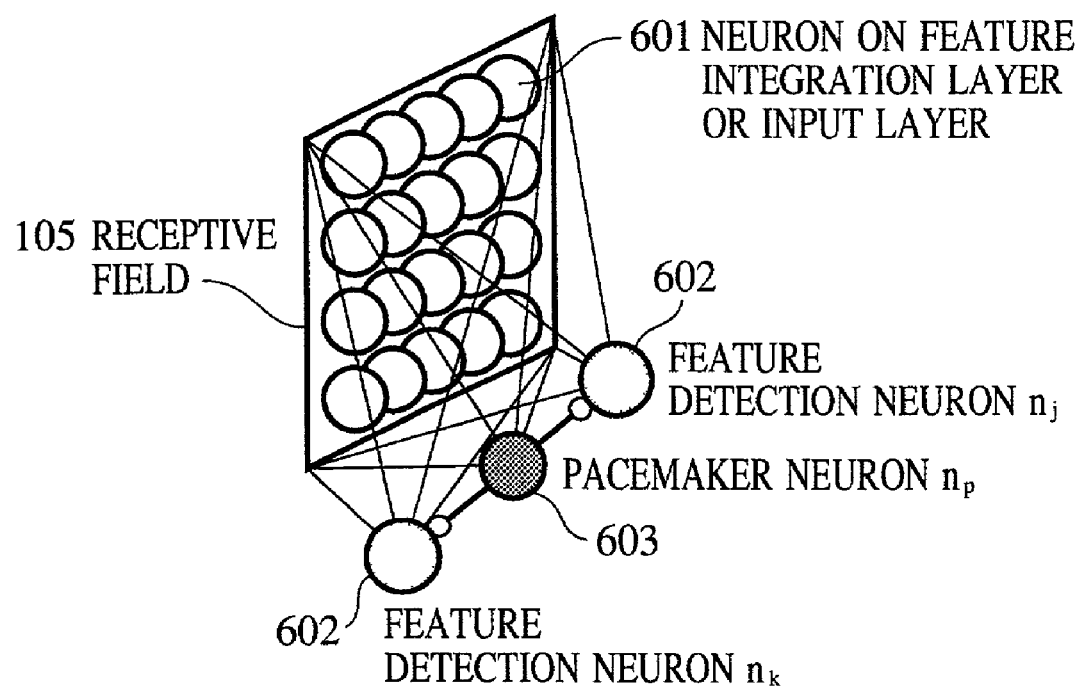
FIG. 6 shows a network configuration in a case where inputs from a pacemaker neuron are supplied to the neurons of a feature detection layer.

FIG. 6 shows a network configuration when inputs are received from a pacemaker neuron to feature detection layer neurons. Referring to FIG. 6, each pacemaker neuron 603 ($n_p$) is accompanied by feature detection neurons 602 ($n_j$, $n_k$, and so on) that form receptive field with the same shape as that of feature detection neuron and detect different types of features, and receives excitatory connection from neurons 601 on the feature integration layer or an input layer. Furthermore, the pacemaker neuron 603 ($n_p$) outputs pulses to the feature detection neurons 602 and the feature integration neurons at predetermined timings or frequencies that are dependent on total sum values of the inputs or mean values of activity levels of neurons in the receptive fields, which represent the activity characteristic to the receptive field.

The feature detection neurons 602 are configured so that time windows are mutually phase-locked, using the inputs from the pacemaker neuron 603 as trigger signals. As previously mentioned, however, before they receive an input from the pacemaker neuron, the feature detection neurons 602 are not phase-locked, so that the neurons output pulses in random phases. Moreover, the feature detection neurons 602 do not perform time window integration, which will be described hereinafter, before they receive inputs from the pacemaker neuron 603. The integration is triggered by a pulse received from the pacemaker neuron 603.

In this case, the time window is defined for each feature detection cell ($n'_j$), which is commonly shared by the neurons in a feature integration layer that forms the same receptive field for the cell, and the pacemaker neuron 603. The time window defines the time range of the time window integration.

The pacemaker neuron 603 in a layer numbered (1,k)("k" is an integer of 0 or more) outputs pulses to the feature integration cells of a layer numbered (2,k−1) and a feature detection cell of the layer numbered (1,k) to which the pacemaker neuron 603 belongs, thereby supplying timing signals for generating time windows when the feature detection cells temporally add inputs. The starting time of the time window provides the reference time for measuring the arrival time of a pulse output from each feature integration cell. More specifically, the pacemaker neuron 603 supplies the reference pulses for the output time of the pulses from the feature integration cells and for the time window integration in the feature detection cells.

If the feature integration cells ($n_1$, $n_2$, and $n_3$) of a layer numbered (2,k) have received pulse inputs from the pacemaker neuron of the feature detection layer numbered (1,k+1), and the activity potentials thereof have been increased to sufficiently high levels by the inputs from a feature detection layer or a sensor input layer (layer numbered (1,k)) in the preceding stage (e.g., if the average input pulse number in a certain time range or a time window has exceeded a threshold value), then the feature integration cells provide outputs at the falls of the pulses from the pacemaker neuron.

In this embodiment, the feature integration cells are not configured to receive the timing control by a pacemaker neuron on the preceding feature detection layer numbered (1,k). This is because the feature integration cells output pulses on the basis of a phase determined by an input level, such as a temporal total sum value of an input pulse, in a predetermined time range rather than on the basis of an input pulse arrival time pattern; therefore, the time window generating timing is not very important. Incidentally, the above phase may be replaced by frequency, pulse width, or amplitude, although the present embodiment uses phase. Obviously, the main point here is not to exclude the configuration in which the feature integration cells receive the timing control from the pacemaker neurons of a feature detection layer in the preceding layer. The point is to suggest the possibility of such a configuration.

Each pulse passes through a synapse circuit wherein it is provided with a predetermined amount of a phase delay, and further passes through a signal transmission line, such as a common bus line, before it finally reaches a feature detection cell. The pulses arranged on time bases at that time are illustrated by pulses $P_1$, $P_2$, and $P_3$ denoted by dotted lines on the time bases of the feature detection cell.

If the time window integration of the pulses $P_1$, $P_2$, and $P_3$ in the feature detection cell results in a value that exceeds the threshold value, then a pulse $P_d$ is output, using the time when the time window ends, as the reference. Normally, the time window integration is performed once; alternatively, however, the stored charges obtained from the time window integration implemented by multiple times, or the time window integrations implemented by multiple times may be averaged. The time window in a learning mode shown in FIG. 3B is used when implementing a learning rule, which will be described hereinafter.

Synapse Circuit

Figure 4A:
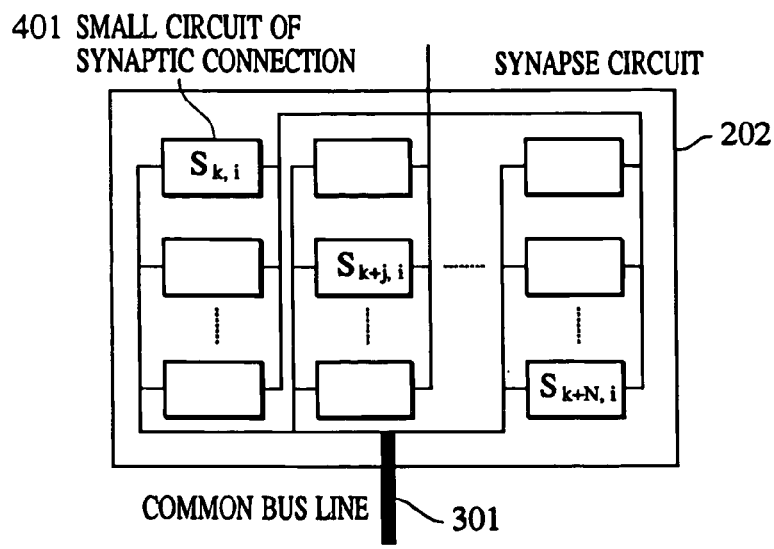
FIG. 4 shows the configurations of synapse circuits.
Figure 4B:
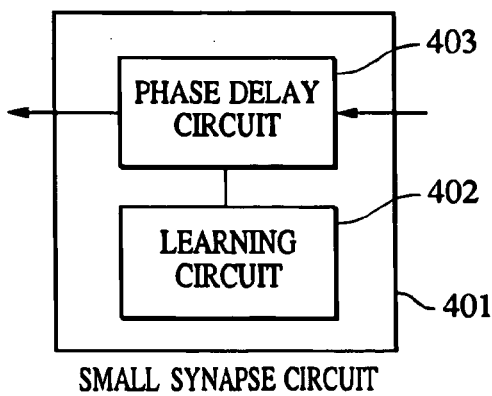
Figure 4C:
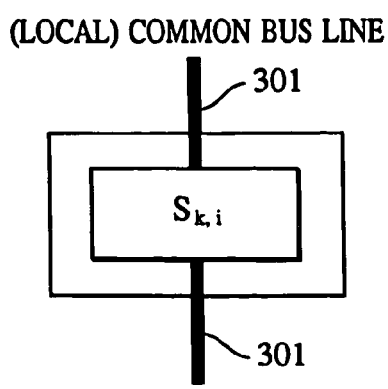

FIG. 4 shows the configuration of a synapse circuit $S_i$. FIG. 4A illustrates small synapse circuits 401 arranged in a matrix pattern to impart synaptic connection strength or phase delay to each neuron $n'_j$ to which the neuron $n_i$ is connected in a synapse circuit 202 ($S_i$). This arrangement allows the wiring from the synapse circuit to a target neuron to be accomplished on the same line, namely, a local common bus 301. In other words, the wiring between neurons can be virtually accomplished, thus improving or solving the wiring problem in prior arts.

Moreover, when a target neuron receives a plurality of pulse inputs from the same receptive field, it can identify the neurons that have supplied the respective pulse inputs on the time base by the arrival time of each pulse according to the time window reference. The arrival time mentioned above corresponds to a feature detected by a feature detection cell, and refers to a phase delay unique to a low-order feature constituting the feature.

As shown in FIG. 4B, each small synapse circuit 401 is composed of a learning circuit 402 and a phase delay circuit 403. The learning circuit 402 changes the characteristic of the phase delay circuit 403 to adjust the above delay amount, and stores the feature values or the control values thereof on a floating gate element or a capacitor coupled to a floating gate element.

Figure 5A:
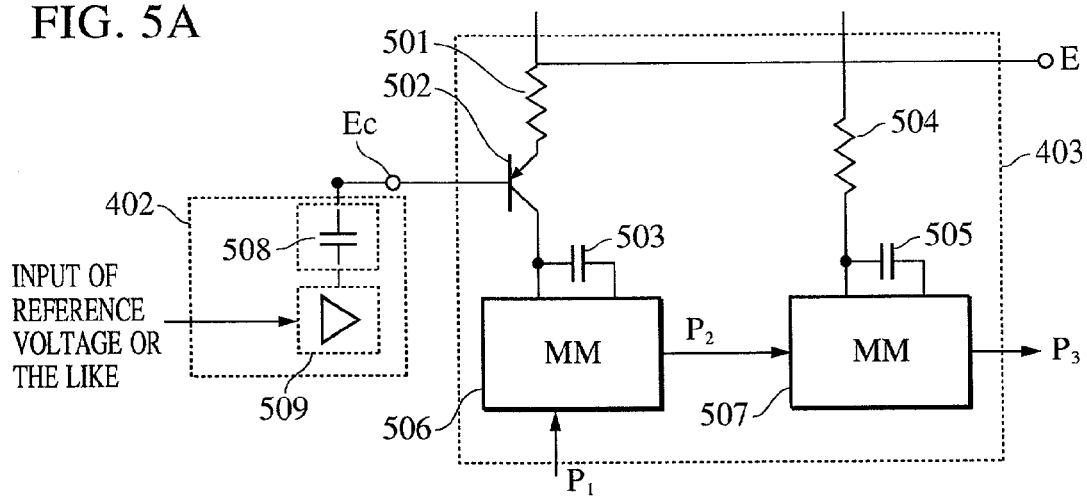
FIG. 5 shows the configuration of a small synapse coupling circuit, and the configuration of a pulse phase retardation circuit employed in the first embodiment.
Figure 5B:
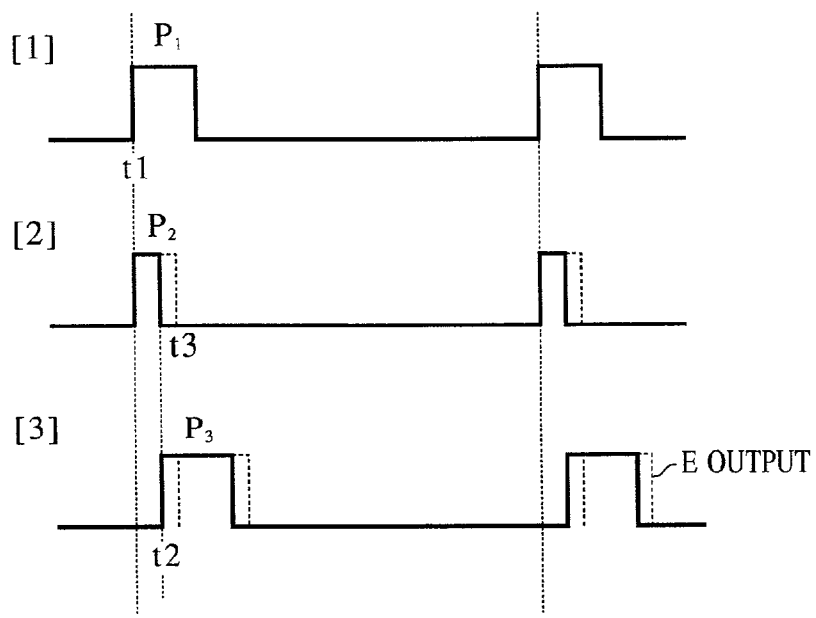

FIG. 5 shows the detailed configuration of the small synaptic connection circuit. The phase delay circuit 403 is a pulse phase modulating circuit which can be formed by, for example, monostable multivibrators 506 and 507, resistors 501 and 504, capacitors 503 and 505, and a transistor 502, as shown in FIG. 5A. FIG. 5B shows the timings of a square wave P1 ([1] of FIG. 5B) supplied to the monostable multivibrator 506, a square wave P2 ([2] of FIG. 5B) output from the monostable multivibrator 506, and a square wave P3 ([3] of FIG. 5B) output from the monostable multivibrator 507.

The detailed descriptions of the operating mechanism of the phase delay circuit 403 will be omitted. The pulse width of P1 depends on the time required for the voltage of the capacitor 503 by charging current to reach a preset threshold value, while the pulse width of P2 depends on the time constant given by the resistor 504 and the capacitor 505. If the pulse width of P2 extends as shown by the square wave indicated by the dotted line in FIG. 5B, and the fall point thereof shifts backward, then the rise point of P3 shifts accordingly; however, the pulse width of P3 remains unchanged. As a result, only the phases of the input pulses are modulated when the pulses are output.

The pulse phase or the delay amount can be controlled by changing a control voltage Ec by a refreshing circuit 509 supplying a reference voltage, and the learning circuit 402 that controls the amount of charges stored in the capacitor 508 that provides a connection weight. To retain the connection weight for an extended period of time, the connection weight may be stored as the charge of a floating gate element (not shown) externally added to the circuit shown in FIG. 5A after a learning operation, or stored by writing or the like to a digital memory. In addition, a configuration designed to reduce a circuit scale (refer to, for example, Japanese Patent Laid-Open No. 5-37317 and Japanese Patent Laid-Open No. 10-327054) or other well-known circuit configurations may be employed.

If the network involves shared connection weight, in which synaptic connection is represented by common weighting factors, then the delay amount $P_{ij}$ of expression (5) given below at each synapse can be made the same among receptive fields. In particular, the connection from the feature detection layer 102 to the feature integration layer 103 can be configured as mentioned above regardless of an object to be detected or a subject because the feature integration layer 103 is involved in the sub-sampling or other which is generally independent of the object class performed by the local averaging of the outputs of the feature detection layer 102, which is the layer preceding the feature integration layer 103.

In this case, each small circuit shown in FIG. 4A can be a single circuit $S_{k,1}$ connected by the local common bus line 301, as shown in FIG. 4B, thus achieving an especially economical circuit configuration. If the connection from the feature integration layer 103 or the sensor input layer 101 to the feature detection layer 102 is realized as described above, then the feature detection neurons detect an event in which a plurality of pulses representing different feature elements simultaneously arrive or substantially arrive at the same time.

If connections are symmetric, then the connections for supplying the same weight or phase delay amount may be representatively given by the same small circuit for synaptic connection. With this arrangement, a considerable number of synaptic connections can be given by a smaller number of circuits. Especially for detecting geometric features, there are many cases where connection weights are symmetrically distributed in a receptive field; therefore, the number of the synaptic connection circuits can be reduced to significantly reduce the circuit scale.

Figure 5C:
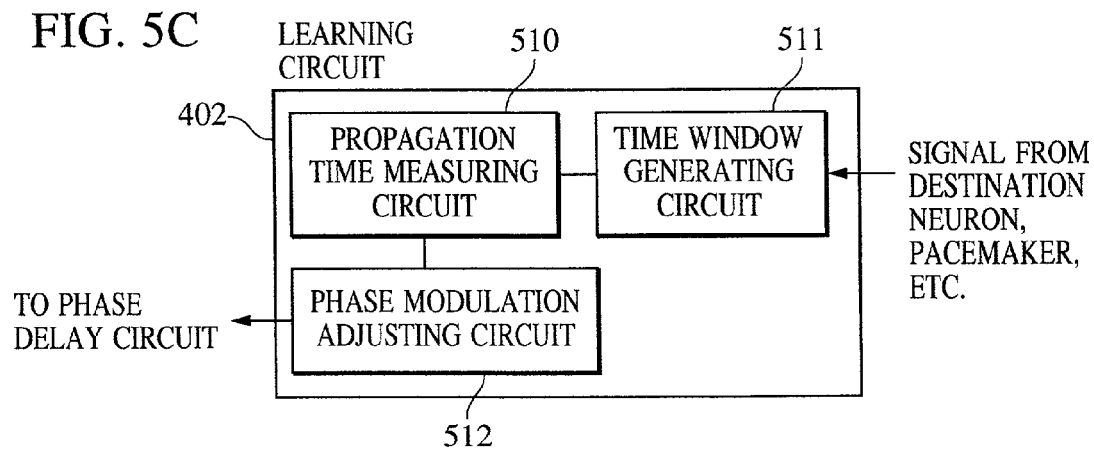

An example of the learning circuit at a synapse for implementing the simultaneous arrival of pulses or a predetermined phase modulation amount may include the circuit elements as shown in FIG. 5C. More specifically, the learning circuit 402 may be composed of a pulse propagation time measuring circuit 510, a time window generating circuit 511, and a pulse phase modulation adjusting circuit 512 for adjusting the pulse phase modulation amount at a synapse so as to set the propagation time at a predetermined value. The propagation time in this case refers to the difference between the time when a pulse was output at a preceding synapse of a neuron of a certain layer and the time when the pulse arrives at a destination neuron of the succeeding layer.

The propagation time measuring circuit 510 is primarily configured such that it receives clock pulses from a pacemaker neuron, as will be discussed hereinafter, and determines the propagation time on the basis of the outputs from a counter circuit for the clock pulses in a predetermined time width or time window shown in FIG. 3B. The time window is set, taking the firing time of a destination neuron as the reference, so that the extended Hebb learning rule described below applies.

Learning Rule

For the learning circuit 402, the width of the time window may be reduced as the frequency at which objects of the same category are presented increases. This enables the learning circuit 402 to perform an operation closer to a coincidence detection mode (a plurality of pulses simultaneously arrive) as a pattern belongs to a more familiar category, meaning that there are a greater number of presentations or learning chances. This arrangement makes it possible to reduce the time required for detecting features or to perform instant detection, whereas it is not suited for making detailed comparative analyses of the spatial dispositions of feature elements, identifying similar patterns, or the like.

In the process of learning a delay amount, by, for example, the extension to a complex number domain, a complex connection weight $C_{ij}$ between a neuron $n_i$ of a feature detection layer and a neuron $n_j$ of a feature integration layer is given by:

$$C_{ij}=S_{ij}\exp(iP_{ij}) \quad (5)$$

where the first i in a function exp denotes an imaginary unit, $S_{ij}$ denotes connection strength, and $P_{ij}$ denotes a phase that corresponds to a time lag of a pulse signal output from a neuron j to neuron i at a predetermined frequency. $S_{ij}$ reflects the receptive field structure of the neuron i, and generally has a structure that differs according to an object or feature to be recognized or detected. This is separately formed by learning (supervised learning or self-organization) or formed as a preset structure.

Furthermore, the learning rule for the self-organization that is related to delay amount is given by:

$$\dot{C}_{ij}=\beta S_{ij}\exp\{-i2\pi\tau_{ij}\}-C_{ij} \quad (6)$$

where $\dot{C}_{ij}$ denotes a time differentiation of $C_{ij}$, $\tau_{ij}$ denotes the foregoing time lag (a preset amount), and $\beta(\sim1)$ denotes a constant.

Solving the above expression causes $C_{ij}$ to converge to $\beta\exp(-2\pi i\tau_{ij})$, so that $P_{ij}$ converges to $-\tau_{ij}$. An example wherein the learning rule is applied will be explained with reference to the time window in the learning mode shown in FIG. 3B. A connection weight is updated according to expression (6) only if the neurons (n1, n2, and n3), pre-synaptic neurons, and a post-synaptic neuron, namely, a feature detection cell, are both firing within the time range of the learning time window. In FIG. 3B, the feature detection cell fires after the elapse of the time window; alternatively, however, it may fire before the elapse of the time window shown in the drawing.

Another method may be used for the learning rule. Further alternatively, the principle of competitive learning may be introduced so as to make pulses arrive at a predetermined interval or longer from each other, that is, to set the difference in time lag to a predetermined value or more.

Processing at Feature Detection Layer

The following will describe the processing in a learning mode and a recognizing mode that is implemented primarily in the feature detection layers.

Each feature detection layer 102 receives pulse signals regarding a plurality of different features from the same receptive field as previously described, and computes a spatiotemporally weighted total sum or a weight sum, and carries out threshold processing. The pulses associated with features arrive at predetermined time intervals in a delay amount or phase that has been set by learning.

The learning control procedure of the pulse arrival time pattern is not a main point of the present application, and only a minimum description will be given. For example, a competitive learning program is introduced, wherein, if a feature element constituting a certain graphic pattern is a salient feature that contributes most to the detection of the graphic pattern, then this feature element arrives first, and the feature elements whose degrees of salience are almost the same arrive with predetermined time intervals provided therebetween. Alternatively, the learning control may be designed such that predefined feature elements arrive at different time intervals. The predefined feature elements in this case refer to the feature elements that make up an object to be recognized and are considered especially important (e.g., a large average curvature and a high degree of linearity).

The degree of salience is equivalent to, for example, the strength of response (the pulse delay amount in this embodiment) of a cell for detecting feature elements when the graphic pattern is detected. In this case, the neurons corresponding to the low-order feature elements in the same receptive field on the feature integration layer, which is the layer in the preceding stage, will synchronously fire or output pulses in predetermined phases. It is obvious that, if the neuron in the feature integration layer 103 has a connection to a feature detection neuron for detecting the high-order feature located at a different position (in this case, the neuron has a different receptive field, but has a connection making up the same high-order feature), then the neuron also synchronously fires.

However, the output level depends on a total sum or an average value or the like of the contributions from a plurality of pacemaker neurons provided for each receptive field. The output level in this example uses phases as the reference; alternatively, however, frequencies, amplitudes, or pulse widths may be used for the reference. In each neuron in the feature detection layer 102, the spatiotemporal weighted total sum of input pulses is computed on a pulse train reaching the neuron only in a time window having a predetermined width. The means for performing the weighted addition in the time window is not limited to the neuron element circuit shown in FIG. 2; another method may be used.

The time window corresponds, to a certain extent, to a time period other than the refractory period of an actual neuron. More specifically, there is a similarity to the actual neuron in that no output is provided from a neuron during the refractory period, i.e., the time range other than the time window, whatever input it may receive, whereas firing based on an input level takes place in the time window other than the refractory period.

The refractory period shown in FIG. 3B is a time period from the point immediately following the firing of a feature detection cell to the next time window starting time. Obviously, the duration of the refractory period and the width of the time window can be set to arbitrary values. The refractory period does not have to be shorter than the time window as in the case shown in FIG. 3B. The starting time of the time window can be made the same among the neurons of the feature detection layers and the feature integration layers, without the need for pacemaker neurons, by introducing the mechanism wherein synchronous firing takes place primarily by weak mutual connection among neurons and a predetermined connecting conditions (E. M. Izhikevich, 1999 "Weakly Pulse-Coupled Oscillation, FM Interactions, Synchronization, and oscillatory Associative Memory" IEEE Trans. on Neural Networks, vol. 10. pp. 508–526). The synchronous firing is known to be triggered generally by mutual connection between neurons and an entrainment phenomenon.

Hence, in the embodiment also, such an effect can be obtained, without using pacemaker neurons, by employing a configuration that satisfies the conditions for the weak mutual connection between neurons and for predetermined synaptic connections.

In the embodiment, as previously explained, the same starting time mentioned above may be accomplished by, for example, applying timing information or a clock pulse from a pacemaker neuron (which outputs pulses at a fixed frequency) to each feature detection layer neuron, as schematically shown in FIG. 6, the pacemaker neuron receiving inputs from the same groups of neurons in the receptive field.

With such an arrangement, even if synchronization control of time windows is necessary, it would not be necessary to conduct the synchronization control over the entire network. Moreover, even if clock pulses fluctuate or vary, as mentioned above, the influences will be uniformly exerted with respect to the outputs from the same local receptive field. More specifically, the positional fluctuation of a window function in the time domain will remain unchanged among the neurons making up the same receptive field. Thus, the reliability of feature detection will not be deteriorated. The local circuit control enables further reliable synchronous operation to be achieved, resulting in a higher tolerance for the variations in the parameters of circuit elements.

To help better understanding, descriptions will now be given of a feature detection neuron for detecting a triangle as a feature. It is assumed that the feature integration layer 103 in the preceding stage responds to graphic features or feature elements, such as L-shaped patterns $(f_{11}, f_{12}, \ldots,)$ having diverse orientations, patterns formed of combinations of line segments having continuity or linkage with the L-shaped patterns $(f_{21}, f_{22}, \ldots)$, and patterns formed of combinations of portions of two sides of triangles $(f_{31}, \ldots)$ as shown in FIG. 7C.

Figure 7C:
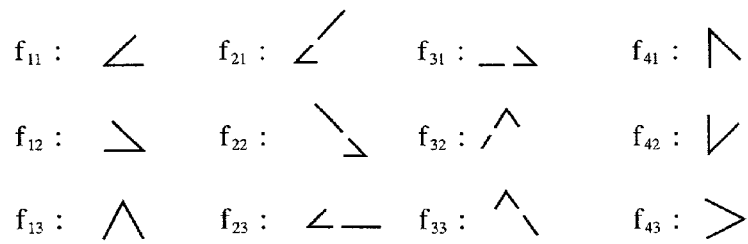
Figure 7D:
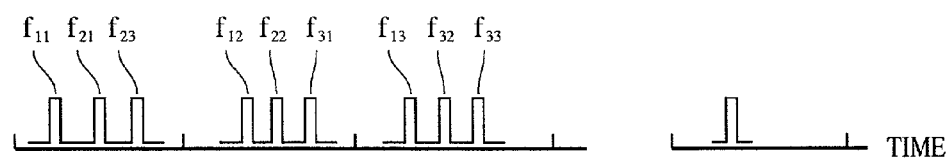

Reference characters $f_{41}$, $f_{42}$, and $f_{43}$ in FIG. 7C denote the features constituting triangles having different orientations, and denote the features corresponding to $f_{11}$, $f_{12}$, and $f_{13}$ with different orientations. When a specific delay amount is set by learning for the neurons making interlayer connections, it is preset in the neuron for detecting a triangle as a feature such that the neuron receives pulses associated with major and different features constituting a triangle in each sub time window or time slot $(w_1, w_2, \ldots)$ obtained by dividing the time window.

For instance, the pulses associated with the combinations of the sets of features making up a triangle as a whole arrive at $w_1, w_2, \ldots, w_n$ obtained by n-dividing the time window first, as shown in FIG. 7A. The delay amounts are set by learning so that the L-shaped patterns $(f_{11}, f_{12},$ and $f_{13})$ arrive at $w_1$, $w_2$, and $w_3$, respectively, and the pulses associated with the feature elements $(f_{21}, f_{22},$ and $f_{23})$ arrive at $w_1$, $w_2$, and $w_3$, respectively.

The pulses associated with the feature elements $(f_{31}, f_{32},$ and $f_{33})$ arrive in a similar order. In the case shown in FIG. 7A, a pulse associated with one feature element arrives at one sub time window or time slot. The time window is divided into the sub time windows in order to individually and reliably perform the detection of the pulses associated with different feature elements or the detection of different feature elements developed and represented on a time base in each sub time window. This will lead to the possibility of changing a processing mode and enhanced adaptability of the manner in which those features are integrated (e.g., switching between a mode wherein all feature elements are to be detected and a mode wherein a predetermined percentage of features are to be detected). For example, if an object to be recognized or detected is a face, and the search into or detection of eyes, which are parts of the face, is important, and a high priority should be set for the detection of eye patterns in visual search for that purpose, the response selectivity for the feature element patterns making up an eye or the sensitivity for detecting a particular feature can be selectively increased by introducing feedback connection from a high-order feature detection layer. This enables detection to be performed by imparting a higher level of importance to the low-order feature elements making up a high-order feature element or pattern.

When it is set beforehand such that the pulses associated with more important features arrive at the sub time windows earlier, it becomes easier to detect features with higher levels of importance by setting the weighting function values in the sub time windows at greater values than those in the remaining sub time windows. The levels of importance of the detection priorities of features can be acquired by learning or defined in advance.

Thus, if all that is necessary is the occurrence of an event wherein a predetermined percentage of feature elements are detected, then dividing the time window into the sub time windows is almost meaningless. Only one time window may be sufficient for the purpose. Alternatively, the pulses associated with a plurality of (three in this case) different feature elements that arrive may be added up (refer to FIG. 7D). In other words, the pulses associated with a plurality of feature elements (FIG. 7D) or an arbitrary number of feature elements may be supplied to a single sub time window or time slot. In this case, referring to FIG. 7D, the pulses associated with feature elements $f_{21}$ and $f_{23}$ that support the detection of an apex angle portion $f_{11}$ of a triangle arrive at a first sub time window. Similarly, the pulses associated with feature elements $f_{22}$ and $f_{31}$ that support the detection of an apex angle portion $f_{12}$ arrive at a second sub time window.

The number of divisions into the sub time windows or time slots, the widths of the respective sub time windows or time slots, the classes of features, and the assignment of time intervals to pulses associated with the features are of course not limited to the above, and they may be changed. For example, in addition to the feature elements described above, the sub time windows for feature elements, such as "X" and "+" may be set. Such feature elements may be redundant or unnecessary for the graphic detection of a triangle. On the other hand, detecting the absence of such feature elements leads to higher accuracy of the detection of a graphic pattern of a triangle.

Even when a change that cannot be represented by a combination of the above feature elements is added, such as a case where a rotation within a predetermined range is added, the pulses output from the neurons of the feature integration layer that represent the foregoing feature elements have continuous phase delays based on the degrees of deviations from an ideal pattern, which is known as "graceful degradation". The range of the phase delay amounts in this case is such that the pulses arrive at predetermined sub time windows or time slots. Hence, the outputs can be stabilized so that the permissible range for the changes in the graphic features to be detected remains at a predetermined level or higher. For instance, referring to FIG. 7C, a triangle Q1 formed by the features corresponding to the features $f_{11}$, $f_{12}$, and $f_{13}$ and a triangle Q2 formed by the features corresponding to the features $f_{41}$, $f_{42}$, and $f_{43}$ should be different from each other at least in their orientations.

In this case, if detection or integration cells associated with the features exist, then, for a triangle Q3 that is oriented midway between the above two triangles, the detection or integration cells associated with $f_{11}$, $f_{12}$, and $f_{13}$, and the detection or integration cells associated with $f_{41}$, $f_{42}$, and $f_{43}$ will both have output levels that are lower than a maximum response output level, and directly based on a computed value of convolution with a filter kernel providing a receptive field structure that depends on the type of feature. The vector quantities of the outputs from all these cells are integrated as the factors intrinsic to an intermediate graphic figure, thus enabling the detection of a graphic having a shape midway between the two triangles as a result of a rotation.

Qualitatively, for example, as the rotational angle is decreased, causing the intermediate graphic figure to be closer to Q1, the outputs from the cells associated with $f_{11}$, $f_{12}$, and $f_{13}$ will be relatively increased. As the intermediate graphic figure approaches Q2, the outputs from the cells associated with $f_{41}$, $f_{42}$, and $f_{43}$ will be relatively increased.

Spatiotemporal Integration of Pulse Outputs and Network Features

The following will describe the computation of spatiotemporal weighted total sum of input pulses. As shown in FIG. 7B, each neuron calculates the weighted sum of input pulses by using a predetermined weighting function (e.g., Gaussian) for each sub time window or time slot, and compares the total sum of the individual weighted sums with a threshold value. Reference character $\tau_j$ denotes the center position of the weighting function of a sub time window j, and is measured from the starting time of a time window as the reference, i.e., by the time elapsed from the starting time. Generally, the weighting function may be a function of the distance from the predetermined center position, that is, the deviation on a time base. The center position here indicates a pulse arrival time when a feature expected to be detected has been found. The function may alternatively be an asymmetrical function.

When the weighting function is the aforesaid distance function, if the center position $\tau$ of the weighting function of each sub time window or time slot of a neuron denotes a time lag after learning among neurons, then a neural network calculating the spatiotemporally weighted total sum of input pulses can be regarded as a radial basis function network (hereinafter referred to as "RBF") of a type of time base domain. A time window $F_{Ti}$ of a neuron $n_i$ that takes a Gaussian function as the weighting function is given according to the following expression when the size in each sub time window is denoted as $\sigma$, and a coefficient factor is denoted as $b_{ij}$:

$$F_{Ti} = \sum_j^N b_{ij} \delta(t - \tau_{ij}) \exp\left(-\frac{(t - \tau_{ij})^2}{\sigma_{ij}^2}\right) \quad (7)$$

The weighting function may take a negative value. For example, when a neuron of a certain feature detection layer is expected to finally detect a triangle, if a feature $F_{false}$, such as "X" or "+", which is obviously not a constituent of a graphic pattern of the triangle, is detected, then a weighting function and a connection from a feature detection or integration cell that apply negative contribution can be imparted from the pulse associated with the feature $F_{false}$ and after in calculating the total sum value of inputs so that a final detection output of the triangle is not supplied even if there is a great contribution from another feature element.

Figure 7E:
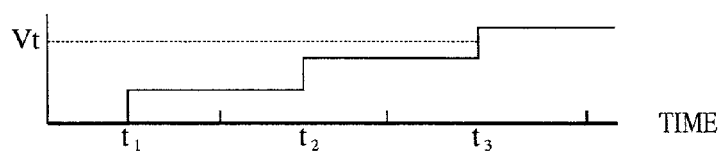

A spatiotemporal sum $X_i(t)$ of an input signal supplied to the neuron $n_i$ of the feature detection layer is given by:

$$X_i(t) = \sum_j S_{ij} F_{Ti}(t) Y_j(t - \tau_{ij} - \varepsilon_j) \quad (8)$$

where $\varepsilon_j$ denotes an initial phase of an output pulse from the neuron $n_j$. This initial phase $\varepsilon_j$ may be converged to zero by the firing synchronized with that of the neuron $n_i$, or $\varepsilon_j$ may be always set to zero if the time window is forcibly synchronized by supplying a timing pulse from a pacemaker neuron. Obtaining the weighted sum based on the pulse inputs shown in FIG. 7A and the weighting functions shown in FIG. 7B provides the temporal transition of weighted sum values, as shown in FIG. 7E. When the weighted sum value reaches a threshold value Vt, the feature detection neuron outputs a pulse.

As previously mentioned, the output pulse signal from the neuron $n_i$ is supplied, with a time lag (phase) obtained by learning, to a neuron of an upper layer at an output level based on a squashing nonlinear function of a spatiotemporal sum ("total sum of inputs") of the input signals. The pulse output takes a binary fixed frequency, and at the time of output, a phase modulation amount based on the squashing nonlinear function for the spatiotemporal sum of input signals is added to the phase equivalent to a fixed delay amount determined by learning.

Processing Procedure Implemented by Layers

FIG. 8 is a flowchart illustrating the processing procedure of each layer described above. The flowchart summarizes the flow of the processing from the detection of low-order features to the detection of high-order features. First, in step S801, a layer performs the detection of low-order features, including the calculation of a Gabor wavelet transform coefficient at each position. Then, in step S802, the layer performs the integration processing of the low-order features, such as local averaging of the features. The layer detects and integrates medium-order features in steps S803 and S804, respectively, then detects and integrates high-order features in steps S805 and S806, respectively. In step S807, an output regarding whether an object to be recognized or detected is present, or an output regarding the detected position of the object is supplied as the output of the final layer. The number of layers assigned to steps S803 and S804, and S805 and S806 can be arbitrarily set or changed according to a subject, such as an object to be recognized.

Figure 9:
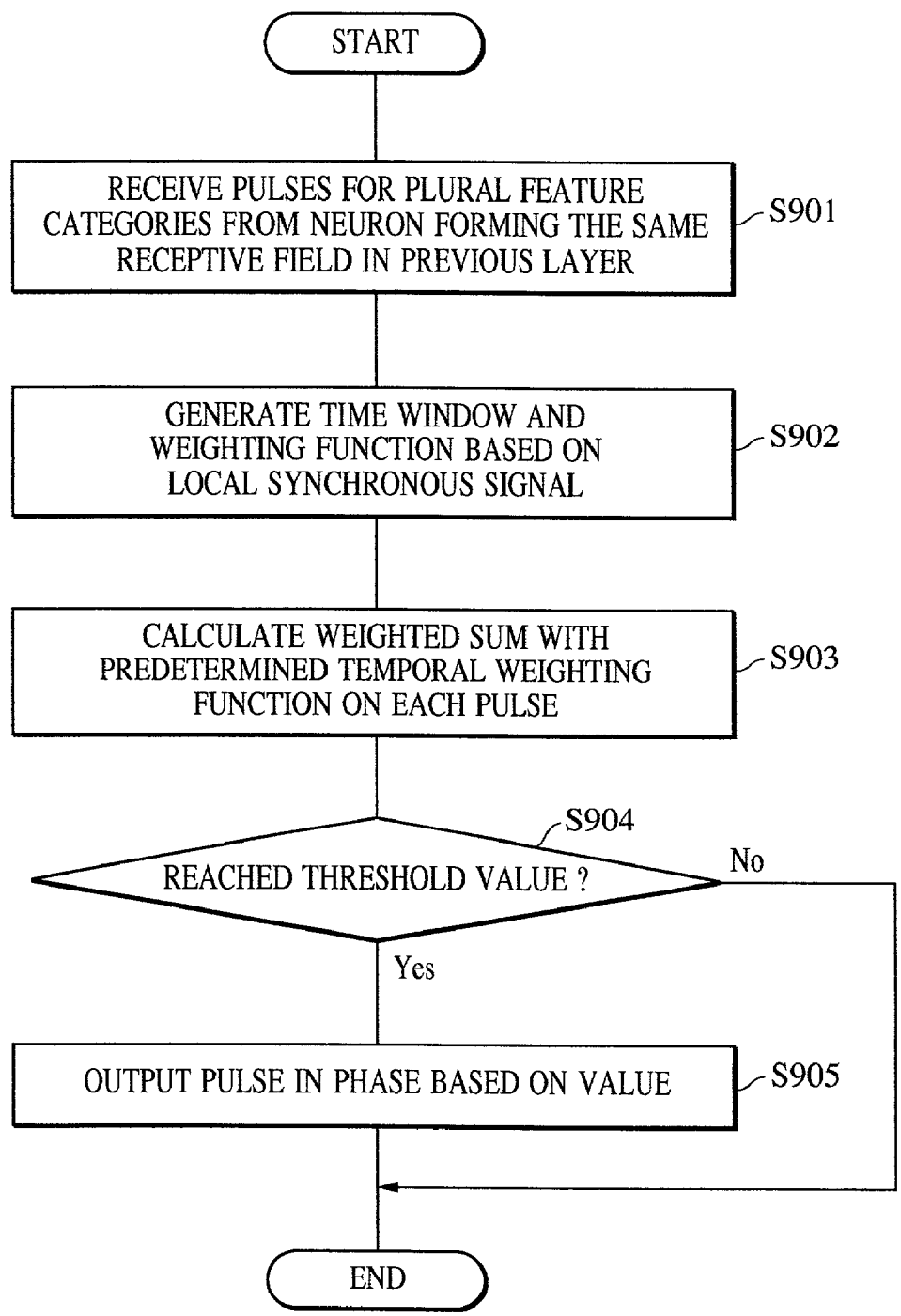
FIG. 9 is a flowchart showing a processing procedure of each feature detection neuron.

FIG. 9 is a flowchart showing the procedure of the processing implemented by each of the feature detection neurons 602. First, in step S901, the feature detection neuron 602 receives pulses associated with a plurality of feature categories from a neuron 601 forming the receptive field 105 in an input layer 101 or a feature integration layer 103, which is the preceding layer. In step S902, the neuron 602 generates a time window and a weighting function on the basis of a local synchronizing signal received from a pacemaker neuron 603 or obtained through the interaction with neurons in the preceding layer. In step S903, the neuron 602 obtains a weighted sum based on a predetermined temporal weighting function. In step S904, the neuron 602 determines whether a threshold value has been reached, and if the determination result is affirmative, then the neuron 602 outputs a pulse in step S905. Steps S902 and S903 are shown serially in the flowchart, while they are actually implemented substantially at the same time.

Figure 10:
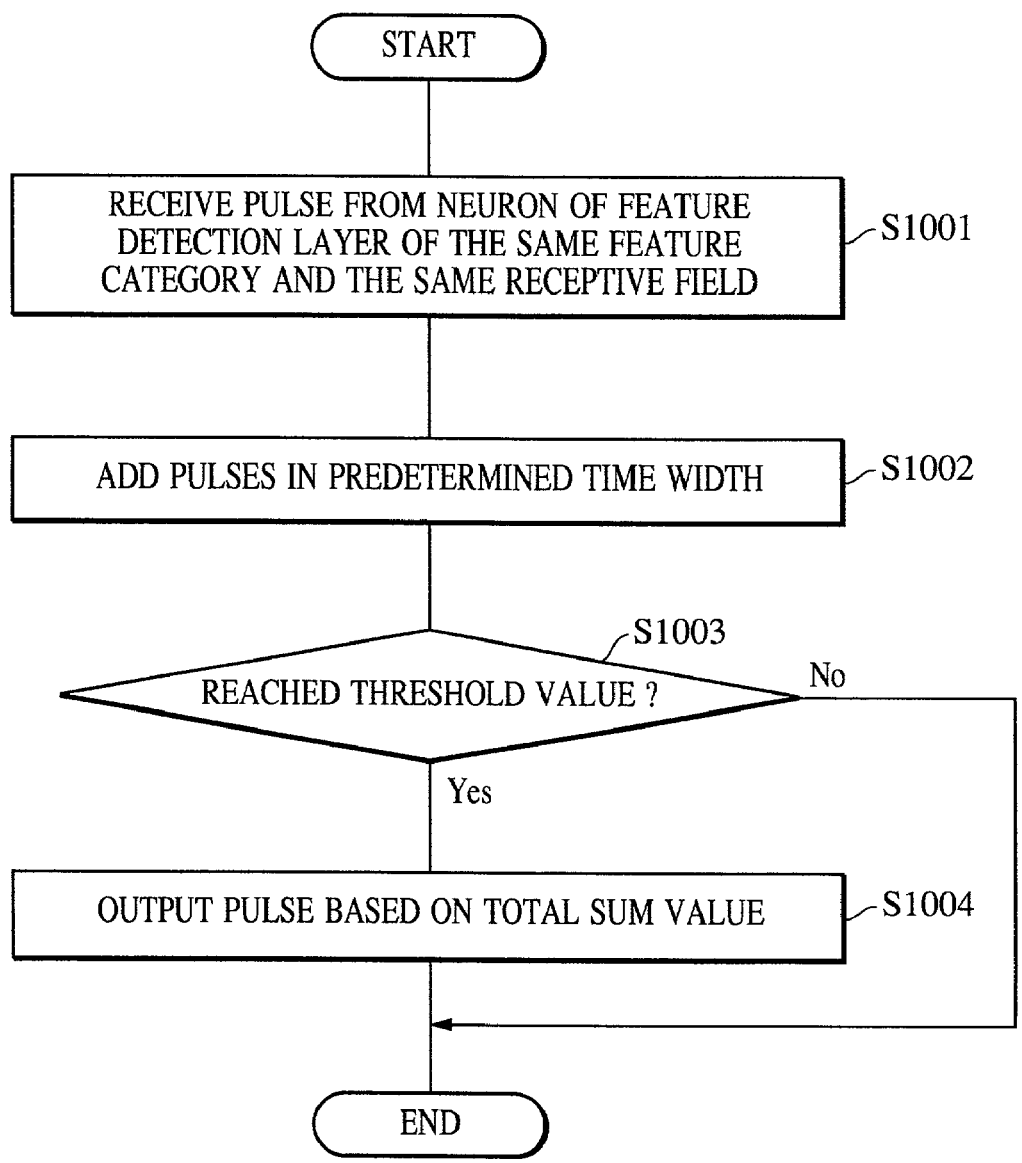
FIG. 10 is a flowchart showing a processing procedure of each feature integration neuron.

The procedure of the processing implemented by each feature integration neuron is as shown by the flowchart of FIG. 10. In step S1001, the feature integration neuron receives a pulse input from a feature detection neuron that provides a detection module 104 for detecting features of the same category and provides a local receptive field intrinsic to the neuron. In step S1002, the feature integration neuron adds input pulses for a predetermined time width, which means a time range other than a refractory period. In step S1003, the feature detection neuron determines whether the total sum value of the input pulses, which may be measured, for example, on the basis of a potential, has reached a threshold value, and if the determination result is affirmative, then the neuron outputs a pulse in a phase based on the total sum value.

Modification Examples of Network and Configuration

The input pulses are associated with the features at individual positions in a spatial domain or a spatial dispositional relationship of feature elements, enabling a spatiotemporal RBF to be formed.

To be more specific, neuronal output values are weighted before adding them to make it possible to represent a spatiotemporal function of a pulse pattern for an arbitrary graphic pattern by using a set of a sufficiently large number of feature elements or feature detection cells, which is prepared in advance, and computing a weighted total sum in a sufficiently large number of sub time windows or time slots. If the category of an object to be recognized and the changes in the shape of the object are limited to a certain extent, then the required number of feature detection cells or sub time windows or time slots may be reduced.

In the present embodiment, the common buses employ local bus lines such that one bus line is allocated to one receptive field; the common bus, however, is not limited thereto. Alternatively, pulse phase delay amounts may be separately set on a time base so as to allow an interlayer connection from one layer to another layer to be accomplished using a single bus line. Furthermore, a common bus line may be employed for adjacent receptive fields that have relatively large portions thereof overlapping each other.

Instead of using the spatiotemporal RBF described above, processing or threshold-value processing may be carried out such that the computation result of the weighted sum in respective sub time windows or time slots turns into a nonlinear squashing function value, and the product thereof may be obtained. For instance, using a circuit configuration (not shown), a threshold-value processing result (binary) may be obtained for each sub time window and stored temporarily in a memory. The logical products of the threshold-value processing results obtained in sequence may be determined in a time series manner.

When the products of the results of the threshold-value processing, the tolerance of the detection of features will be smaller if a pattern is missing or its saliency is low.

The processing discussed above for detecting a graphic pattern by using the spatiotemporal RBF may alternatively be accomplished in the form of an operation similar to a recalling process of associative memory. More specifically, even if a low- or medium-order feature element to be detected in a local region or an entire region is missing, it is possible to make an arrangement so that the entire spatiotemporal RBF network detects medium- or high-order feature elements and fires the appropriate neurons if several other feature elements are detected and the foregoing total sum value of expression (8) exceeds a threshold value.

The configuration of the network is not limited to the one shown in FIG. 1. Obviously, an MLP or other alternative may be used as long as it includes a layer for detecting predetermined geometric feature elements.

Example of Application to Imaging Apparatus

Figure 11:
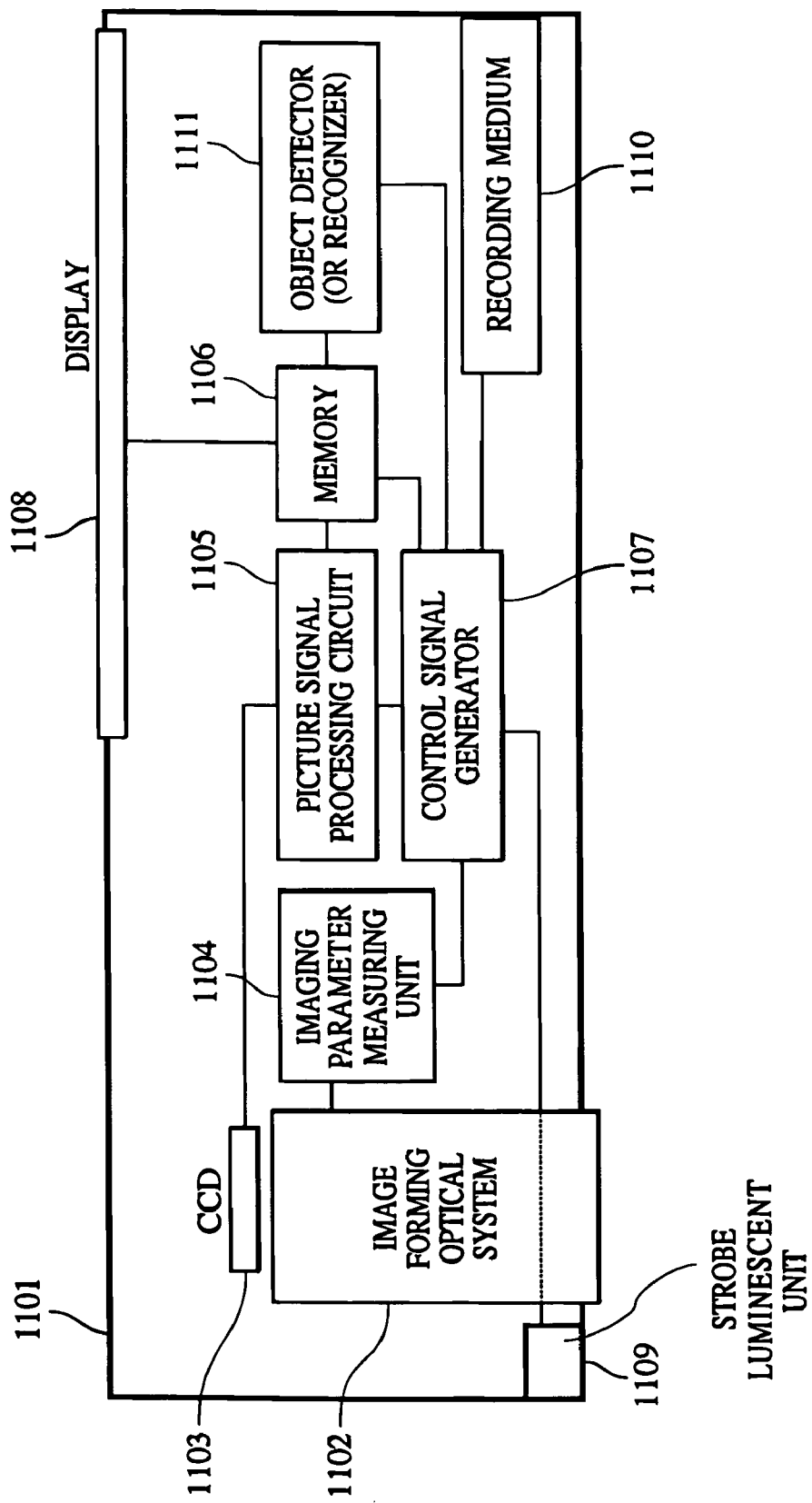
FIG. 11 shows the configuration of an example wherein a pattern detecting or recognizing apparatus according to the embodiment has been applied to an imaging apparatus.

FIG. 11 shows an imaging apparatus incorporating the pattern detecting or recognizing apparatus having the configuration of the present embodiment. The following will describe an operation for focusing on a particular object, making color corrections of the particular object, and controlling exposure. FIG. 11 illustrates the configuration of an example in which the pattern detecting or recognizing apparatus in accordance with the embodiment is used with the imaging apparatus.

An imaging apparatus 1101 shown in FIG. 11 is equipped primarily with an image forming optical system 1102 that includes a taking lens and a zoom photographing drive control device, a CCD or CMOS image sensor 1103, an imaging parameter measuring unit 1104, a picture signal processing circuit 1105, a memory 1106, a control signal generator 1107 for generating control signals for controlling an imaging operation, controlling imaging conditions, etc., a display 1108 serving also as a finder, such as an EVF, a strobe luminescent unit 1109, and a recording medium 1110. The imaging apparatus 1101 is further provided with the aforesaid pattern detecting or recognizing apparatus as an object detecting or recognizing apparatus 1111.

The imaging apparatus 1101 uses the object detecting or recognizing apparatus 1111 to detect, for example, the position and size of a face image of a person that has been registered in advance from taken pictures. Then, the information regarding the position and size of the person's face is supplied from the object detecting or recognizing apparatus 1111 to the control signal generator 1107. The control signal generator 1107 generates control signals for optimally carrying out the focusing control, exposure condition control, white balance control, etc. for the person, on the basis of the outputs from the imaging parameter measuring unit 1104.

Employing the aforesaid pattern detecting or recognizing apparatus with the imaging apparatus enables detection of a person and optimal control of imaging based on detection results to be achieved with low power consumption and at high speed in a realtime.

Second Embodiment

In the first embodiment, synapses have been configured to carry out phase modulation. In this embodiment, the recognition of a graphic pattern or the like is performed using a network constituted by synapse elements that modulate pulse widths in analog values and integrate-and-fire neurons shown in the first embodiment in the network configuration shown in FIG. 1.

The modulation by a synapse is expressed by $W_a=S_{ij}W_b$ when the pulse width of a pre-synaptic signal is denoted as $W_b$, and the pulse width of a post-synaptic signal is denoted as $W_a$. In this case, $S_{ij}$ means the same as the connection strength in expression (5) of the first embodiment. To take a wide dynamic range for the modulation, the basic pulse width of a pulse signal must be set to a value that is sufficiently smaller than the period, i.e., a basic pulse interval.

A neuron fires or outputs a pulse when its potential exceeds a predetermined threshold value because of the charges accumulated due to the inflow of a plurality of pulse currents that represent predetermined feature elements. This embodiment does not particularly need the weighted addition of arrived pulses for each sub time window, which has been described in the first embodiment, but implements integration in a time window having a predetermined width. In this case, a feature element or a graphic pattern to be detected depends solely on a total temporal sum of the signals supplied to a neuron in a feature detection layer, i.e., the total sum of pulse current values. The ratio of pulse width between input and output pulses is equivalent to the value of the weighting function in the first embodiment. When the weighted addition of the arrived pulses for each sub time window is performed, information regarding the presence or transformation of a feature detected is represented in the time intervals of arriving pulses or in an arrival time pattern itself, as in the case of the first embodiment.

The output feature of a feature detection layer neuron may be set such that the frequency increases, or the pulse width or amplitude increases as the degree of salience (refer to the first embodiment) of an applicable feature increases.

Figure 12A:
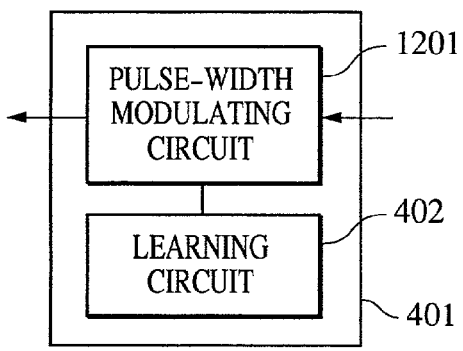
FIG. 12 shows the configuration of a small synapse circuit used in a second embodiment.

FIG. 12A shows a configuration unit of a small synapse circuit 401 used in this embodiment. A learning circuit 402 of the same kind of the one in the first embodiment and a pulse width modulating circuit 1201 are included. For the pulse width modulating circuit 1201, a well-known circuit, such as the one disclosed in the gazette of U.S. Pat. No. 2,717,662 by the present assignee, may be used.

Figure 12B:
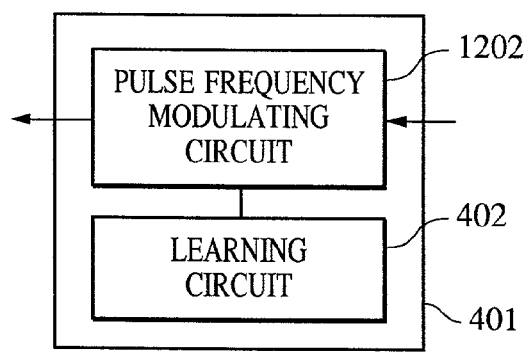

Instead of performing the aforesaid pulse width modulation, a pulse frequency may be modulated at each synapse element. In this case, the configuration of the small synapse circuit 401 that corresponds to the above configuration includes the learning circuit 402 and a pulse frequency modulating circuit 1202, as shown in FIG. 12B. A known configuration may be applied to the pulse frequency modulating circuit 1202. The modulation by the synapse is expressed by $f_a=S_{ij}f_b$ when the pre-synaptic pulse frequency is denoted as $f_b$, and the post-synaptic pulse frequency is denoted as $f_a$.

It is needless to say that the pulse modulating circuit or the like is equipped with a control device that saturates to an upper limit value, i.e., a pulse cycle, at a maximum pulse width if a neuron output involves frequency modulation or pulse width modulation.

Third Embodiment

The feature detection neurons used in this embodiment are adapted to detect graphic features and their deformation on the basis of the time intervals in analog values and the orders of pulse arrivals, or detect graphic features on the basis of the levels of importance, which will be described hereinafter.

Figure 13:
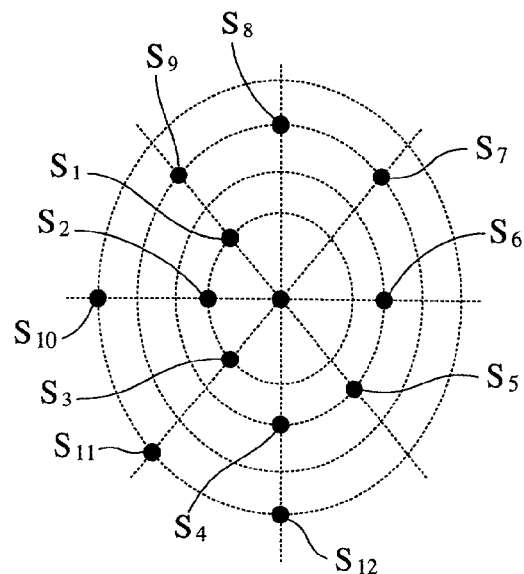
FIG. 13 shows a sampling structure in a receptive field of a feature detection neuron used in a third embodiment.

The network configuration used in this embodiment is the same as that shown in FIG. 1 except that a phase offset based on the location in a receptive field is imparted to each interlayer synaptic connection. FIG. 13 shows a sampling structure in the receptive field of a feature detection neuron employed in this embodiment. For example, if the receptive field is elliptical, as shown in FIG. 13, then the sampling structure is configured such that the phase modulation amounts at lattice points ($S_1$, $S_2$ . . . ) that are spirally sampled from the center position of the ellipse gradually increase. The phase modulation amount at an arbitrary point is defined as the phase modulation amount at the lattice point closest to that point.

Figure 14:
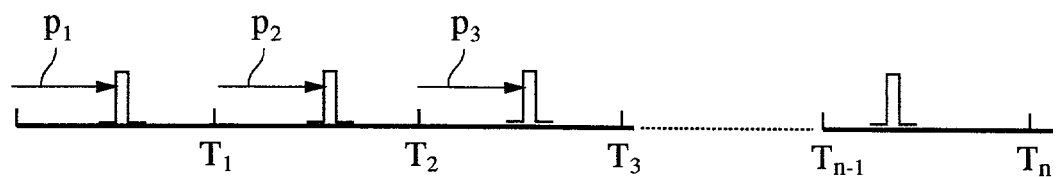
FIG. 14 illustrates an example of a phase modulation amount that depends on a position in a receptive field of a feature element.

FIG. 14 illustrates an example of the phase modulation amount based on a location in the receptive field of the feature element. Thus, the phase modulation amounts ($p_1$, $p_2$, . . . ) based on the locations in the receptive field are added within the modulation range of the range of a sub time window to which an associated feature should belong, enabling the information regarding the dispositions of features to be extracted from the locations in the individual sub time windows of spike trains. It is needless to say that the sampling may be performed in a different pattern than the spiral pattern.

It is assumed that the weighted addition using the time window functions in neurons (as described in the first embodiment) or the temporal integration in a predetermined time window of a pulse width modulation signal (as described in the second embodiment) is performed, and each feature element has its associated sub time window. Thus, the position of a spike in each sub time window indicates the spatial position of a feature element in the same receptive field, allowing the temporal interval pattern of a plurality of spikes to represent the dispositions of feature elements or high-order graphic patterns.

Moreover, the window functions based on the levels of importance of features or phase modulation can be imparted. The level of importance in this case relates to a "salient" feature element or a graphic pattern that facilitates the discrimination of a pattern to be detected or recognized from other patterns, and is different for each pattern category. This is empirically acquired by learning. The levels of importance can be acquired, for example, by updating parameters in directions for improved reliability in detection or recognition when perturbation of a parameter that highly assesses the contribution of the detection of a certain feature is imparted by, for instance, increasing the sub time window function value or by changing the phase modulation amount of an associated feature.

In the embodiments explained above, the method has been described in which a spike train associated with a plurality of different features from the receptive field is used for representing, detecting, or recognizing two-dimensional pattern information. Low- or high-order feature elements or graphic pattern elements are detected by threshold-value processing of a weighted sum in a time window of a pulse train. This makes it possible to reliably detect a desired pattern even if an object to be detected or recognized deforms due to a positional change, a rotation, etc. or deficiency or the like occurs in detecting a feature due to the influences of lighting, noises, or the like, under complicated, diverse conditions. This advantage can be obtained without the need of relying on any particular network structure.

Moreover, "context-dependent" processing can be implemented, including the processing adapted to a pattern existing around an object to be detected or recognized, the processing for imparting priority to a particular portion of an object to be detected or recognized, and the processing steps for dealing with a case where a pattern that should not be detected has been detected. It is also possible to make an arrangement for implementing quicker detection or identification of more familiar patterns.

Whether a feature has been detected can be known from the arrival of a pulse (digital information) from a predetermined neuron in a predetermined time range. The degree of deviation in the form of deformation from an ideal pattern of the feature is explicitly represented in a network by means of analog information, including a pulse delay amount, a pulse width, and a frequency. This arrangement makes it possible to dramatically improve the accuracy for discriminating highly similar patterns and the time required for the processing.

Moreover, according to the configurations described above, the pulses of a pulse train temporally disposed on a single input line of a predetermined neuron are positioned in a time window so as to correspond to the features of a predetermined pattern. With this arrangement, the difficulties of wiring between neuron elements can be alleviated, and the circuit scale and power consumption for recognizing or detecting a predetermined object by two-dimensional pattern processing can be significantly reduced, as compared with prior arts, while maintaining high reliability at the same time.

According to the pattern detecting apparatus described above, a desired pattern can be reliably detected even if deficiency or the like of features of an object to be detected occurs. In addition, the accuracy of discrimination between patterns with high similarity and the time required therefor can be dramatically improved.

Fourth Embodiment

This embodiment will detect or recognize patterns without depending on scales. The following will describe the aspects that are different from the embodiments discussed above.

General Configuration

The general configuration of the pattern detecting or recognizing apparatus according to the fourth embodiment is identical to that shown in FIG. 1.

In this embodiment, the feature detection layers 102 (1,0), (1,1), and feature integration layers 103 (2,0), (2,1), shown in FIG. 1 form a set of processing channels at a plurality of resolutions or scale levels as a whole. Each processing channel implements processing at one scale level or resolution to detect and recognize low- to high-order features by hierarchical parallel processing.

Each layer has a plurality of circuit elements that belong to different processing channels, the circuit elements being disposed in a predetermined layout. Referring now to the examples shown in FIG. 15 and FIG. 16, the configuration of the processing channels will be described in conjunction with the feature integration layer (2,0).

Figure 15:
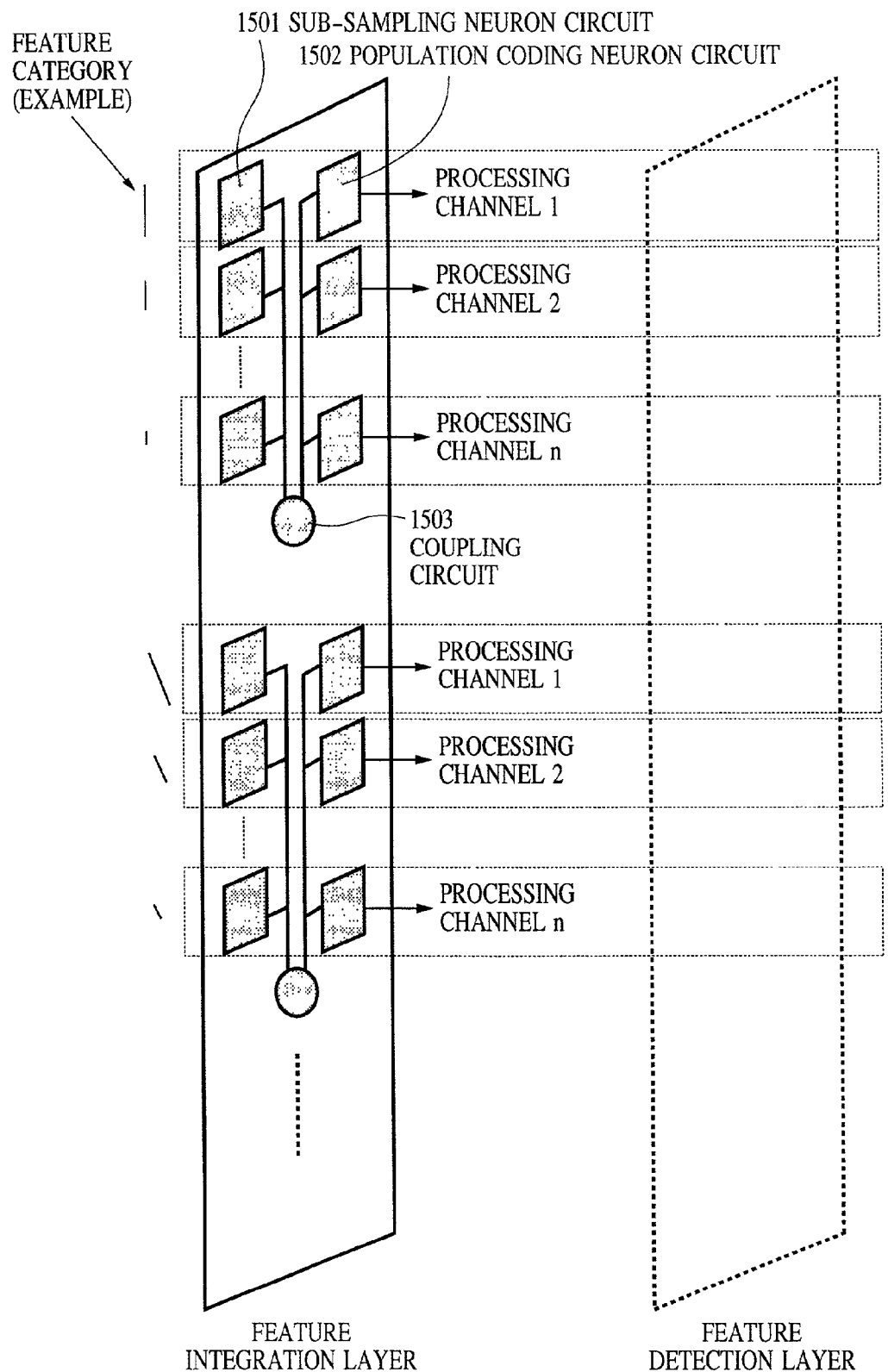
FIG. 15 shows a circuit configuration of a feature integration layer.
Figure 16:
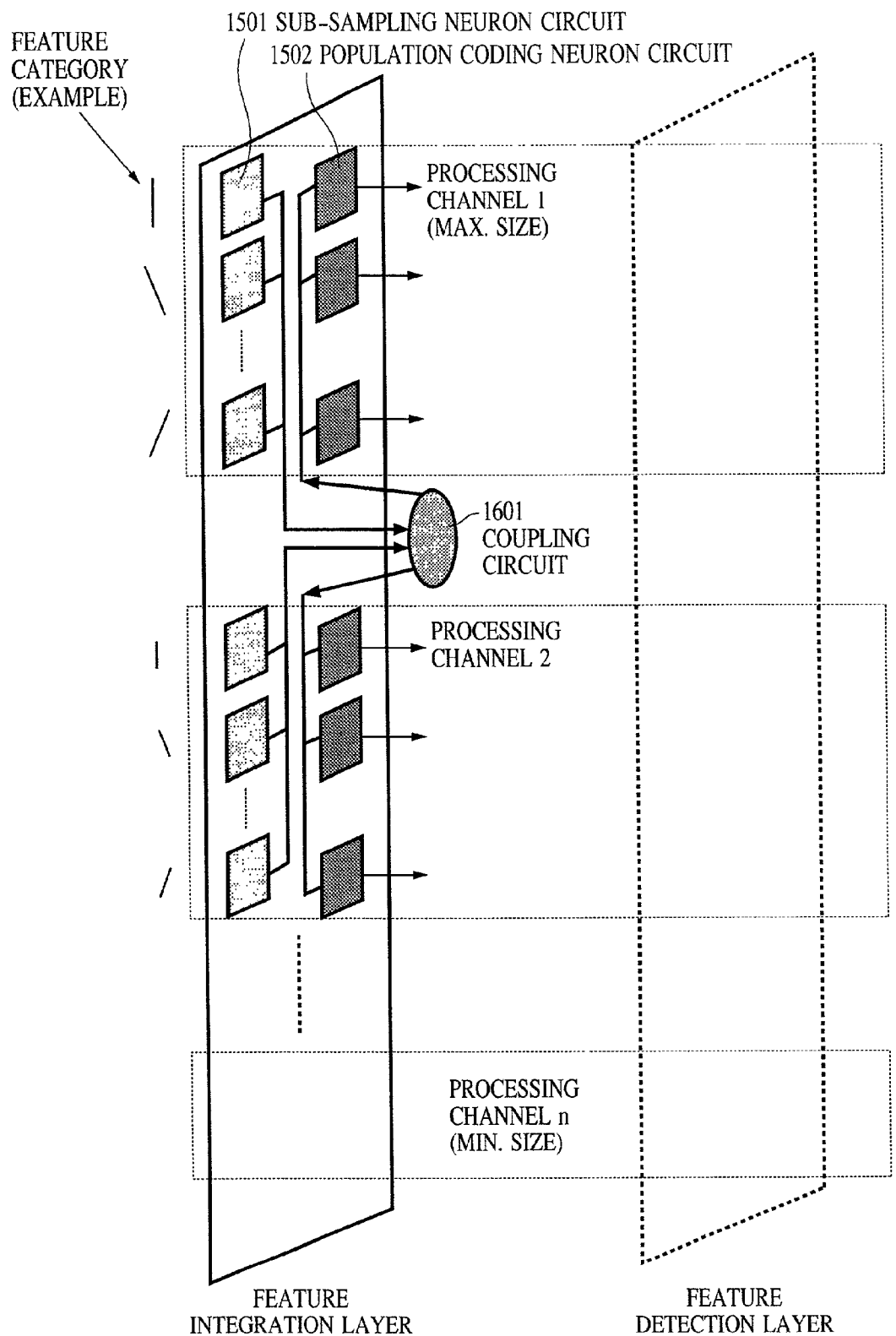
FIG. 16 shows another circuit configuration of a feature integration layer.

Both examples shown in FIG. 15 and FIG. 16 form one processing channel with a subsequent layer if the scale level or the resolution is the same. FIG. 15 shows the feature integration cells arranged closely together because they share the same feature category (a directional component in this case) although they belong to different processing channels. FIG. 16 shows the feature integration cells arranged closely together because they share the same scale level, namely, the same processing channel, although they handle different feature categories. The functional differences of the above configurations will be explained later. In a feature integration layer (2,0), each circuit element receives Gabor wavelet transform features as low-order features, which will be discussed later, from the cells of a feature detection layer (1,0).

Generally, in a feature detection layer (1,k), where "k" indicates a natural number, a feature detection cells that receive the outputs from a plurality of feature integration cells forming the same channel in the preceding layer (2,k−1) are configured to belong to the channel.

The feature integration layer (2,0) on a What pathway has a predetermined receptive field structure, and is formed of neuron elements that generate pulse trains. The feature integration layer (2,0) integrates a plurality of neuron element outputs in the same receptive field from the feature detection layer (1,0) by sub-sampling performed by local averaging or the like and performing computation for combining the processing results at different scale levels. The neurons in the feature integration layer share a common structure for their receptive fields as long as the same feature category and the same scale level are concerned.

Feature detection layers (1,1), (1,2), . . . , (1,N) have predetermined receptive field structures acquired by learning. As in the case of the layers described above, the layers ((1,1), . . . ) detect a plurality of different features in each feature detection module, and the latter layers ((2,1), . . . ) integrate the detection results on a plurality of features received from the feature detection layers in the previous stages. The feature detection layers are connected or wired so as to receive cell element outputs of the feature integration layers in the previous stages that belong to the same channels. The feature integration layers carry out two types of processing.

One type of processing is sub-sampling. The sub-sampling process primarily averages the outputs from a local region (a local receptive field of an appropriate feature integration layer neuron) of a feature detection cell population of the same feature category and the same scale level. The other type of processing is the integration of the results of processing at different scale levels. This processing linearly or nonlinearly combines the outputs of a plurality of feature detection cell populations of the same feature category but at a plurality of different scale levels.

A Where pathway having feature position detection layers ((3,0), . . . , (3,k)) receives the input of predetermined feature integration layers (not necessarily all feature integration layers) on the What pathway, and is involved in outputting the positions of low-, medium-, and high-order features. The following descriptions will omit further detailed explanation of each layer of the Where pathway.

Processing by Feature Detection Layers

Each neuron of the feature detection layer (1,0) has a receptive field structure based on $g_{mn}$. When $g_{mn}$ has the same scale index m, its receptive field is also of the same size. In computation, an associated kernel $g_{mn}$ size is based on the scale index. In this example, the sizes of 30×30, 15×15, and 7×7 on an input image are set, beginning with the coarsest scale.

Each neuron outputs pulses at an output level which takes a nonlinear squashing function of a wavelet transform coefficient value obtained by inputting the sum of products of a distribution weighting factor with image data. In this embodiment, a phase is used for representing output information; however, a frequency, amplitude, or pulse width may alternatively be used for the reference. Thus, the Gabor wavelet transform according to expression (4) has been performed to obtain the output of the entire layer (1,0).

The number of sampling points, i.e., the number of positions at which feature detection or the like is performed, is set to be the same for each scale level. Hence, the features at individual points or locations that have been extracted by Gabor wavelet transform are schematically represented by the hierarchical structure shown in FIG. 25 that has different representative areas for different scale levels. The representative areas mean input data ranges wherein at each representative point feature can be detected. Multiple representations of features at a plurality of scale levels are obtained on each position in an image for the population coding process to establish correspondence to arbitrary scale levels, which will be discussed later. The circles (○) in FIG. 25 indicate the corresponding point in input data at each scale level.

Unlike the neurons of the detection layers, the neurons of the subsequent feature detection layers ((1,1), (1,2), ..., (1,N)) form the receptive field structures for detecting features unique to a pattern to be recognized by using the Hebb learning rule or the like. In a latter layer, the size of a local region for detecting a feature gradually approaches the size of the entire object to be recognized, so that later layers in the hierarchy detect geometrically medium- or high-order features. For instance, in detecting or recognizing a face, the medium- or high-order features refer to the feature at the level of graphic elements, such as eyes, the nose, and the mouth, making up the face.

Different processing channels that share an identical hierarchical level, i.e., an identical level of complexity of a feature to be detected, detect features that belong to the same category at different scales. For instance, "eyes" which are defined as medium-order features are detected "eyes" of different sizes by different processing channels. In other words, the detection is performed in a plurality of processing channels of different scale level selectivities for the "eyes" of the given size in an image. The neurons of the feature detection layer may have a mechanism for receiving inhibitory (shunting inhibition type) connections from outputs of a layer in the preceding stage to ensure stable outputs.

Processing at Feature Integration Layers

The neurons of the feature integration layers 103 ((2,0), (2,1), ...) will now be described.

As shown in FIG. 1, the connection from the feature detection layer 102 (e.g., (1,0)) to the feature integration layer 103 (e.g., (2,0)) is configured so as to receive an input of excitatory connection from a neuron of the same feature element or type of a feature detection layer in the preceding stage in the receptive field of the feature integration neuron. There are two types of neurons of the feature integration layer 103, namely, sub-sampling neurons, and populating coding neurons. The sub-sampling neurons carry out sub-sampling by local averaging, such as calculating a mean value, a representative value, or a maximum value, of inputs from neurons forming the receptive field of the feature detection neuron, for each feature category, as previously described. The population coding neurons connect outputs related to the features of the same category over different scales or processing channels.

According to the former, the pulses associated with a plurality of features of the same class are supplied, and the pulse inputs are integrated and averaged in a local region or a receptive field, or a representative value, such as a maximum value, is calculated in a receptive field. This allows reliable detection of a feature even if the position of the feature fluctuates or deformation occurs. Therefore, the receptive fields of the feature integration neurons may have the same structure regardless of the categories of features. For example, receptive fields may be composed of rectangular regions of a predetermined size, and have evenly distributed sensitivity or weighting coefficient therein.

Population Coding Related to Scale Level

The mechanism of the population coding performed by the latter type of neurons will be explained in detail. The population coding neurons perform integration by performing normalized linear coupling of the outputs from a plurality of sub-sampling neurons that are at the same hierarchical level (i.e., the complexity of a graphic feature is at about the same level), but belong to different processing channels for the same feature, and exist in the same feature integration layer. For example, the feature integration layer 103 (2,0) that receives the outputs of the feature detection layer 102 (1,0) carrying out Gabor wavelet transform integrate, by linear combination or the like, the outputs associated with a set $\{g_{mn}\}$ (n is constant, and m=1,2, ...) of Gabor filters that belong to different processing channels, but have the same directional selectivity.

To be more specific, an output $p_{ij}(t)$ of a sub-sampling neuron that has directional component selectivity i and scale selectivity j, and a population code $q_{ij}(t)$ having the same selectivity are represented by expression (9) indicating the linear combination of normalized outputs of the sub-sampling neuron, and expression (10) indicating a normalizing scheme therefor. For the purpose of explanatory convenience, the output status transition of the sub-sampling neuron and the population coding neuron is expressed as discrete time transition.

$$q_{ij}(t+1) = \sum_k W_{ij,ik} P_{ik}(t) \qquad (9)$$

$$p_{ij}(t) = \frac{q_{ij}(t)^\beta}{C + \lambda \sum_k q_{ik}(t)^\beta} \qquad (10)$$

where $w_{ij,ab}$ denotes a coupling coefficient that indicates the contribution provided by a neuron or a neuron population that has a plurality of different selectivities or sensitivity features. The contribution of the output of a sub-sampling neuron having a feature category, namely, a directional component selectivity index "a" and a scale level selectivity index "b", is supplied to a population coding neuron having a directional component selectivity index "i" and a scale level selectivity index "j". The $w_{ij,ab}$ denotes a filtering function or selectivity based primarily on the directional component index "i" and the scale level index "j", and typically takes the form of the function of |i-a| and |j-b| as follows: $w_{ij,ab}=f(|i-a|,|j-b|)$.

As it will be discussed later, the population coding based on the linear coupling through the intermediary of $w_{ij,ab}$ is intended for $q_{ij}$ to impart a probability of existence in terms of feature category or directional component and a scale level, considering the detection levels of neurons having other selectivities. The parameter C denotes a normalizing constant, and λ and β denote constants. Typically, β is 1 or 2. Setting β to 2 provides an effect for compressing and reducing the contribution of low-level noise components, as compared with β being set to 1. C denotes a constant for preventing $p_{ij}$ from diverging even if the total sum of population codes for a certain feature category is nearly zero. In an initial state when a system is started up, $q_{ij}(0) = p_{ij}(0)$.

In conjunction with FIG. 15, the addition is carried out only on the scale level selectivity index in expressions (9) and (10). As a result, the population coding neurons output the amounts proportional to the probabilities of existence of respective features that belong to the same feature category but different scale levels or processing channels.

Furthermore, as in the case of the example shown in FIG. 16, in general, a system for implementing the population coding, also on the medium level of a preset number of directional components, can be constructed by further adding the directional component selectivity index. In this case, by properly setting parameters β and $w_{ij,lk}$ in expressions (11) and (12) that will be described hereinafter, the configuration shown in FIG. 16 enables the population coding neurons to output the amounts proportional to the probabilities of existence of the features for individual scale levels and in feature categories.

As indicated by expression (9), the population code $q_{ij}(t)$ is obtained by the normalized linear combination concerned with the outputs of neurons having the sensitivity at different scale levels. If $q_{ij}(t)$ that has reached a steady state is properly normalized so as to set its value somewhere between 0 and 1, then $q_{ij}$ will provide a probability of the directional component i and the scale level j, provided that the proper normalization mentioned above is accomplished by, for example, using a total sum value on $q_{ij}$.

Accordingly, to explicitly determine the scale level associated with the size of an object in input data, a curve for fitting $q_{ij}$ is determined to estimate the maximum value, and the scale level based thereon is determined. The scale level thus obtained generally indicates an intermediate value of preset scale levels.

Figure 26:
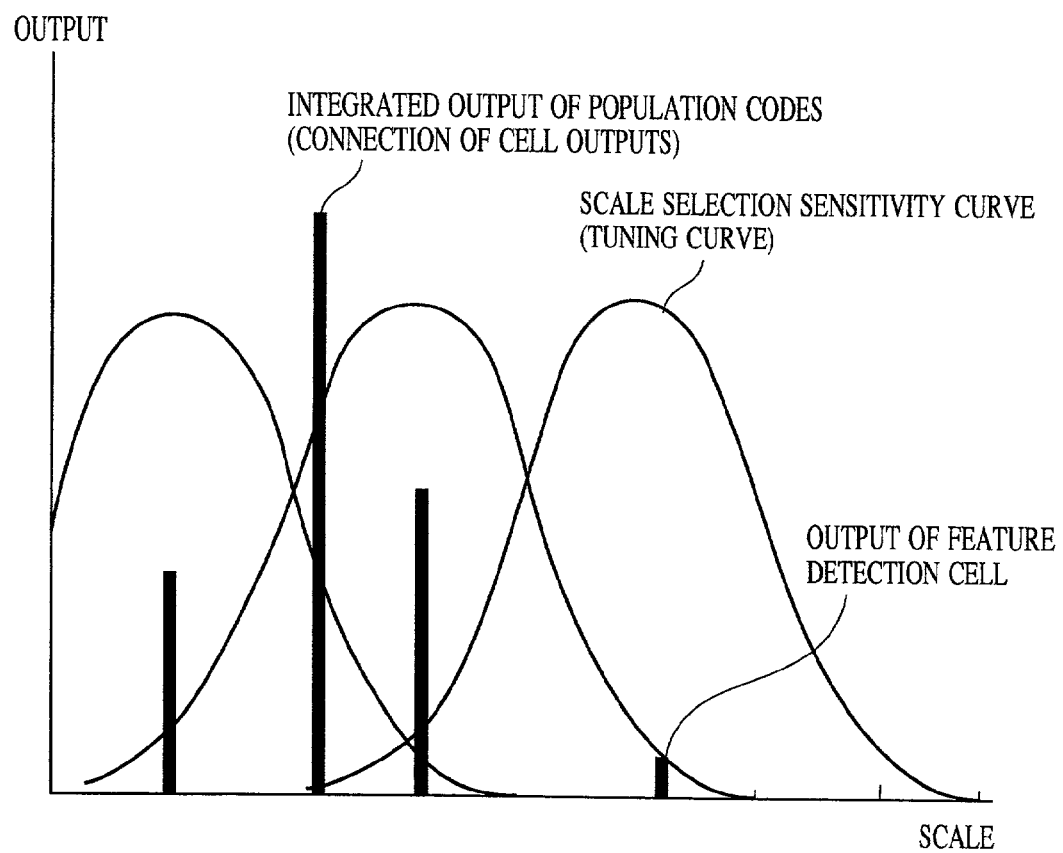
FIG. 26 illustrates an example of the population coding of scale levels.

FIG. 26 shows an example of population coding of scale levels, wherein the axis of abscissa indicates scale level, while the axis of ordinates indicates cell outputs. The outputs correspond to pulse phases. A neuron that has its peak sensitivity at a particular scale shows a drop in its output level or a phase delay for a feature having a size deviating from that particular scale, as compared for a feature having the size that corresponds to that particular scale.

FIG. 26 shows the sensitivity curves or "tuning curves" for the scale selectivities of individual feature detection cells, cell outputs, and integrated population coded outputs or the moments related to the scale levels of cell outputs, i.e., linear sums. The positions of the integrated population coded outputs on the axis of abscissa reflect the presumed values of the scale or size of an object to be recognized.

In this embodiment, actually, the scale levels are not explicitly determined, and the outputs from a feature integration layer to a feature detection layer are denoted as $q_{ij}$. In this case, normalized $q_{ij}$ may alternatively be used. More specifically, In both FIGS. 15 and 16, the outputs from the feature integration layer 103 to the feature detection layer 102 are the outputs from population coding neurons rather than from sub-sampling neurons. Thus, the outputs will be eventually represented collectively in the form of a detection probability of a particular object that covers a plurality of scale levels or resolutions like the normalized $q_{ij}$.

According to the circuit configuration of the feature integration layer 103 shown in FIG. 15, in a sub-sampling neuron circuit 1501, among the feature detection layer neuron outputs of the preceding stage, the neuron outputs sharing the same feature categories and size selectivities are first received by the local receptive fields of the sub-sampling neurons to perform local averaging. The sub-sampling neuron outputs are sent to a coupling circuit 1503. At this time, as it will be discussed later, the pulse signal from each of the neurons is subjected to delays by a predetermined phase amount (e.g., an amount proportional to the square of the output level of a feature detection neuron if β of expression (6) is 2) by a synapse circuit (not shown), and propagated through a local common bus. Alternately, however, the neurons may be physically independently wired without using the common bus.

The coupling circuit 1503 implements the processing based on the expressions (5) and (6) to carry out population coding on the information that belongs to the same feature category, but has different size selectivities or involves a plurality of processing channels.

According to the circuit configuration shown in FIG. 15, the population coding has been performed on the sub-sampling neuron outputs of the same feature category (directional component selectivity). In contrast to this, according to the circuit configuration shown in FIG. 16, the processing based on expressions (11) and (12) below is implemented by the coupling circuit that performs population coding on sub-sampling neuron outputs over entire feature categories and size selectivities.

$$q_{ij}(t+1) = \sum_l \sum_k W_{ij,lk} p_{lk}(t) \qquad (11)$$

$$p_{ij}(t) = \frac{q_{ij}(t)^\beta}{C + \lambda \sum_l \sum_k q_{lk}(t)^\beta} \qquad (12)$$

The method for calculating the scale level of an object to be recognized will now be described. Implementing the above processing allows the calculation of the scale level of the object to be recognized that is based on an average activity level or sub-sampling neuron output level $P_a$ of each processing channel. An estimated scale level S is represented, for example, as follows:

$$S = \frac{\sum_a P_a S_a}{\sum_a P_a} \qquad (13)$$

$$P_a = \sum_i p_{ia} \qquad (14)$$

where $P_a$ denotes the average activity level of a processing channel "a", $S_a$ denotes the scale level or scale index of the processing channel "a", and $p_{ia}$ denotes the activity level of a sub-sampling neuron that belongs to the processing channel "a". The average activity level $P_a$ can be used, for the processing in the succeeding layer, for controlling the activity levels of the neurons in each processing channel.

For example, $P_a$ can be used for generating a signal for controlling a neuron firing threshold value in the succeeding layer. In this case, the firing threshold values of the subsequent layers are decreased to effectively increase a feature detection sensitivity for the channel having a maximum level of $P_a$, while the firing threshold values of the subsequent layers are increased to effectively decrease the feature detection sensitivity for the remaining channels. This allows only the channel or scale level with the maximum $P_a$ to be activated, thus making it possible to achieve reduced power consumption and robust processing immune to noises. Moreover, the threshold values of the subsequent layers are controlled on the basis of the value of $P_a$ by decreasing the threshold values for channels having relatively higher $P_a$ values. This arrangement makes it possible to conduct adaptive control of the feature detection sensitivity on the basis of an average channel activity level at the stage where low-order features are extracted.

Figure 18:
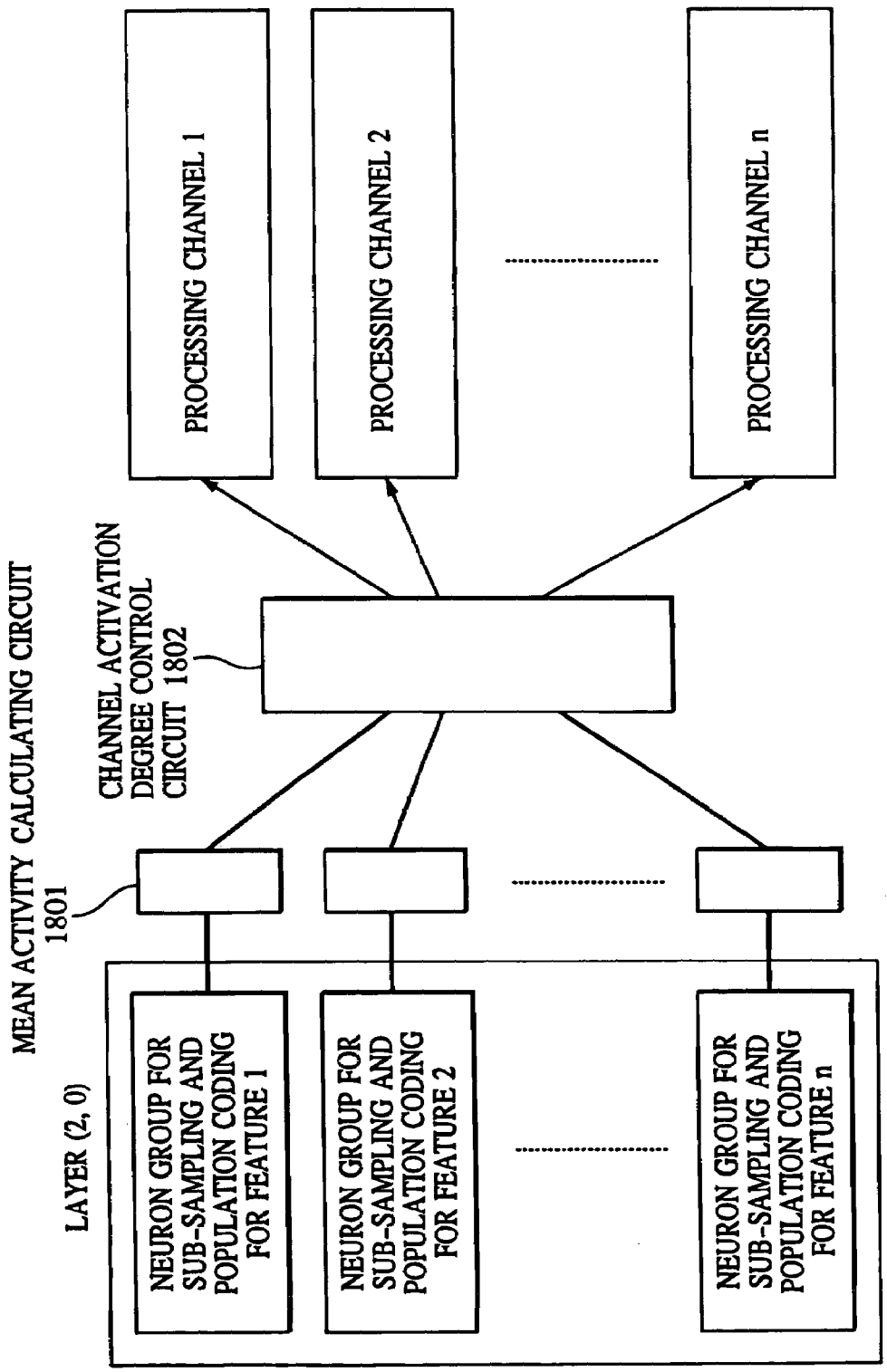
FIG. 18 shows a configuration of a channel activation degree control circuit.

Moreover, it is also possible to provide a channel activation control circuit that processes the output signals of each population coding neuron by amplifying or attenuating the signals, i.e., advancing or delaying pulse phases thereof, on the basis of $P_a$ for each channel in the layer (2,0). FIG. 18 shows a configuration of such a channel activation control circuit. A channel activation control circuit 1802 is provided between the population coding neurons and the succeeding layer, namely, the feature detection layer shown in FIGS. 15 and 16, and receives the processing results of a mean activity calculating circuit 1801 that processes the outputs of the population coding neurons.

In the last layer, over a plurality of channels, the probability of existence of an object to be recognized as a high-order feature is represented in the form of the activity level of a neuron, the activity level being based primarily on a firing frequency or the phase of a firing spike. In a Where processing pathway, or if the information regarding the position of the object to be detected or recognized is also detected in the last layer, the probability of existence of the object on the basis of the position or location in input data is detected in terms of the activity level of each neuron in the last layer. In this case, the probability of existence of the object is replaced by the presence of the object if the threshold-value processing is implemented.

The population coding could be performed by linear coupling that does not involve normalization; however, this would lead to susceptibility to noises. Hence, it is preferable to carry out normalization. The normalization shown in expression (10) and (12) can be accomplished by the "shunting inhibition" at the neural network level. The linear coupling shown in expression (9) and (11) can be accomplished by lateral connection.

Figure 17:
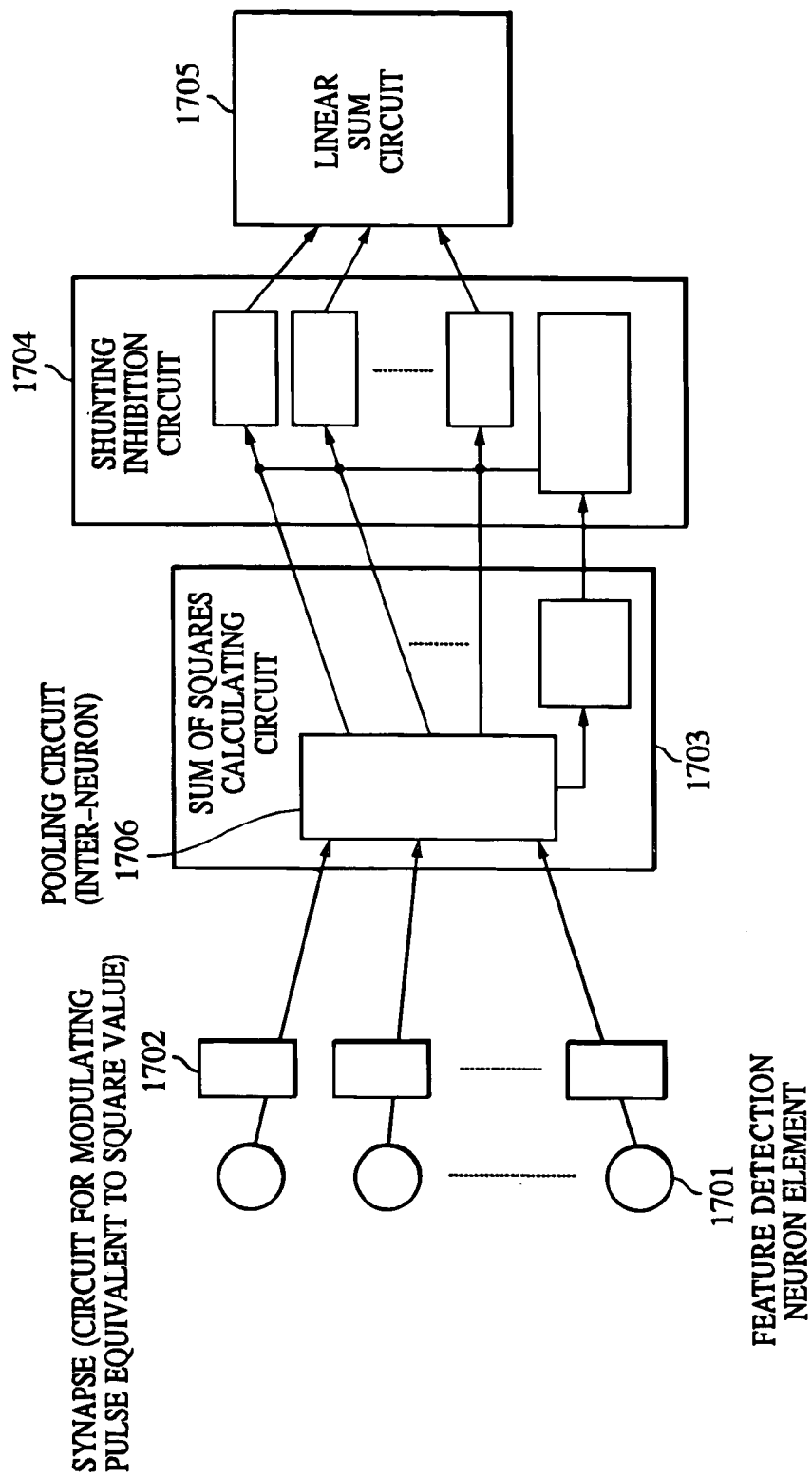
FIG. 17 shows a configuration of a normalizing circuit.

An example of a normalizing circuit for β being 2 is shown in FIG. 17. The normalizing circuit is constituted by a sum of squares calculating circuit 1703 for determining the sum of squares of the outputs of feature detection cells $n_{ij}$ that belong to different processing channels, a shunting inhibition circuit 1704 for primarily normalizing expression (10), and a linear sum circuit 1705 for determining and outputting the linear sum of expression (9).

The sum of squares calculating circuit 1703 has an inter-neuron circuit 1706 for pooling the square values of feature detection cells, and a synapse 1702 for applying a connection to the inter-neuron circuit 1706 imparts a pulse phase delay, a pulse width modulation, or a pulse frequency modulation equivalent to the square value of an output of the feature detection neuron element 1701.

The shunting inhibition circuit 1704 is constituted by, for example, a variable resistance element (and a capacitor) that is proportional to the inverse number of a value obtained by multiplying an output of the inter-neuron circuit 1706 by a predetermined coefficient (λ/C), a capacitor and a pulse phase modulating circuit (or a pulse width modulating circuit or a pulse frequency modulating circuit) that gives the square of the output of the feature detection neuron element 1701.

A modification example of the channel processing will now be described. There is an alternative to the aforesaid configuration wherein the population coding is carried out for each processing channel, and the output of each processing channel is transmitted to a succeeding layer (i.e., the configuration wherein the configuration shown in FIG. 15 or 16 is retained to succeeding layers in a cascade manner). In the alternative configuration, the outputs of the population coding neurons are propagated only to the feature detection cells of the succeeding layer that belong to the same channel as the processing channel imparting a maximum response level in the feature integration layer (2,0) so as to improve the processing efficiency and to reduce power consumption.

In this case, a maximum input detecting circuit, that is, a so-called "winner-take-all circuit" (hereinafter referred to as "WTA circuit") is provided between the outputs of the feature integration layer (2,0) and the succeeding feature detection layer (1,1) in addition to the configuration shown in FIG. 15 or 16. The WTA circuit acts as a processing channel selecting circuit that receives the outputs of the population coding neuron circuit and imparts a maximum response level. The processing channel selecting circuit may be provided for each position of the feature integration layer. Alternatively, one such processing channel selecting circuit may be provided for that layer to calculate a maximum response level for each processing channel on the entire input data, independently of locations.

Figure 19A:
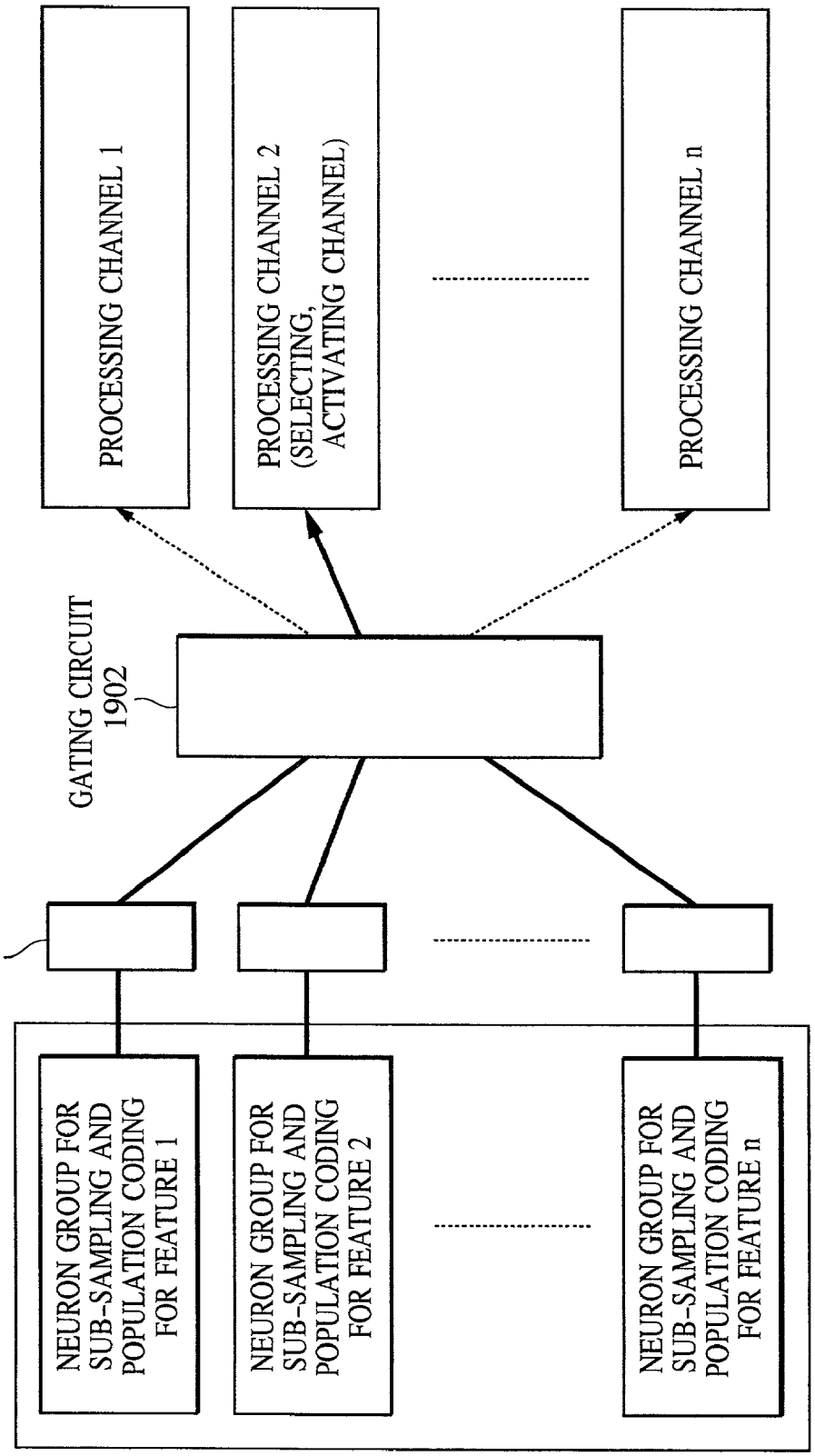
FIG. 19 shows a configuration of a gating circuit.

For the WTA circuit, a known configuration may be employed, such as the one disclosed in Japanese Patent Laid-Open No. 08-321747, U.S. Pat. No. 5,059,814, or U.S. Pat. No. 5,146,106. FIG. 19A schematically shows the configuration wherein the outputs of only the processing channels indicating maximum responses in a feature integration layer are propagated by the WTA circuit to a feature detection layer (the succeeding layer) in the feature integration layer. This circuit configuration is identical to the one shown in FIG. 18 except that the channel activation degree control circuit 1802 of FIG. 18 has been replaced by a gating circuit 1902.

Figure 19B:
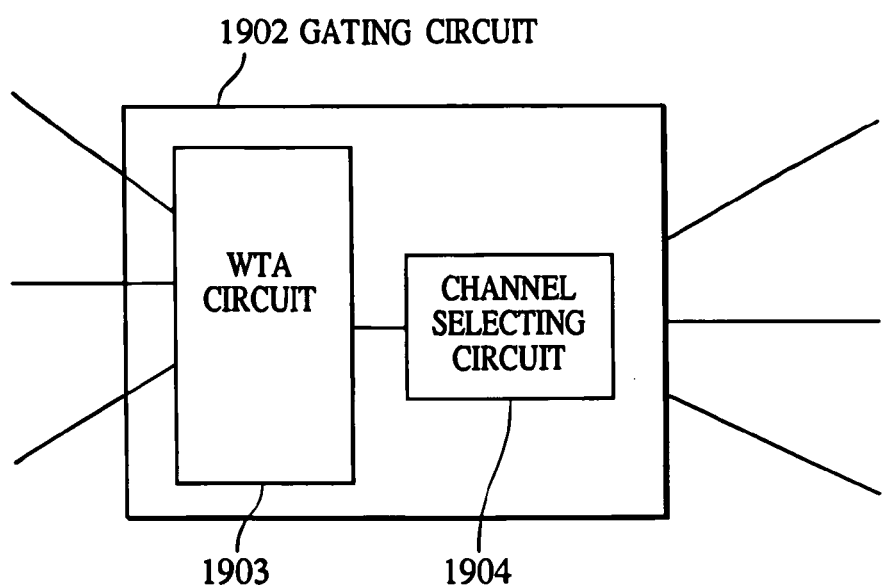

As shown in FIG. 19B, the gating circuit 1902 has a WTA circuit 1903 that receives a mean output level for each processing channel, and a channel selecting circuit 1904 for propagating the output of each neuron from a processing channel indicating a maximum mean output level to the same channel of the next layer.

In a succeeding feature integration layer (2,k), where k is 1 or more, such a processing channel selecting circuit is dispensable. For instance, an output of a feature integration layer after a high-order feature is detected may be fed back via the processing channel selecting circuit so as to select a processing channel in an integration layer of low- or medium-order features. This completes the explanation of the modification example of channel processing. The configuration is not limited to the ones shown in FIG. 15 or 16 wherein the processing steps of the sub-sampling, coupling, and population coding are implemented in the feature integration layer. Alternatively, for example, separate layers may be provided for the processing for coupling and the processing for population coding, respectively.

The advantages described below are obtained by performing the population coding on the outputs from the same type of feature category detection neurons of different scale levels. Accurate detection or recognition can be achieved even if the size of an object corresponds to a scale level that is different from any of preset scale levels and lies somewhere between them. Moreover, the multi-scale hierarchical parallel processing makes it possible to achieve stable recognition or detection of an object by properly selecting a plurality of scale levels or resolutions even if an object of a different size exists in a neighborhood or in an overlapping fashion. In addition, it is no longer necessary to prepare models corresponding to an enormous number of templates for dealing with objects of arbitrary sizes, so that processing can be implemented using a fewer scale levels.

Moreover, according to the embodiment wherein the processing channels are spatially separated and arranged up to the last layer, the population coding, including the processing of connection between processing channels, can be performed without the need for complicated timing control, as compared with the configurations wherein the processing channels are deployed on a time base, as will be shown in a fifth embodiment and a sixth embodiment to be described hereinafter. There is another advantage obtained because of the configuration in which the differences among the processing channels are output in the form of the firing characteristic of physically different neurons. This allows the recognition or detection processing to be performed concurrently at a plurality of scales, as compared with a case where the processing of individual scale levels is implemented in time series.

Even if another object of a nearly identical size exists in a neighborhood or in an overlapping manner, the performance for recognizing or detecting an object to be recognized or detected will be of course maintained because of the mechanism adapted to integrate a plurality of types of partial features by the local receptive field structure, the sub-sampling structure, etc.

The pulse coding and the detection method for two-dimensional graphic patterns are the same as those of the first embodiment, so that the explanation thereof will not be repeated.

Pulse Signal Processing by Feature Integration Layer

In the aforesaid coupling circuit, the pulses associated with the population coding levels obtained by expression (9) or (11) are supplied to the individual population coding neurons, and the population coding neurons acting as the output cells ($n_1$, $n_2$, and $n_3$) of the feature integration layer numbered (2,k) receive the pulse inputs from the pacemaker neurons of a layer numbered (1,k+1).

Then, the population coding neurons output pulses, using the falls of the pulses from the pacemaker neurons as the reference timings thereof if the outputs of the coupling circuit are at sufficiently high levels due to the inputs from a feature detection layer or a sensor input layer numbered (1,k) in the preceding stage. The sufficiently high levels here mean that, for example, the mean number of input pulses in a predetermined time range or time window is lager than a threshold value, or pulse phases are advanced.

The sub-sampling neurons described above are not subjected to the control of any of the pacemaker neurons, and carries out sub-sampling on the basis of a mean output level from the feature detection cells of the layer (1,k) of the preceding stage. The mean output level above refers to the level of outputs received in a time window having an independent phase for each sub-sampling neuron. The control of the timings for outputting pulses from the sub-sampling neurons to the coupling circuit is conducted without the intermediary of the pacemaker neurons. The same applied to the pulses output from the coupling circuit to the population coding neurons.

Thus, according to the present embodiment, the feature integration cells, such as the sub-sampling neurons and the population coding neurons, are not adapted to be placed under the timing control by the pacemaker neurons on their preceding feature detection layer numbered (1,k). This is because the timings for generating the time windows are not very important since the feature integration cells output pulses in phases (the phases used in this embodiment may be replaced by any of frequencies, pulse widths, and amplitudes) that are determined by the input levels indicated in terms of the temporal integration values of input pulses or the like in a predetermined time range rather than depending on an input pulse arrival time pattern. This should not be considered to exclude the configuration wherein the feature integration cells receive the timing control from the pacemaker neurons of a feature detection layer in the preceding layer. The point is to suggest the possibility of such a configuration.

It is also possible to accomplish learning control covering a plurality of scales or processing channels simply by presenting an object to be recognized or detected in one size during a learning mode. To be more specific, during the learning mode, the channel activation control circuit shown in FIG. 18 is controlled so as to distribute the outputs of a channel that has the highest mean activity level among the outputs in the feature integration layer (2,0) to the remaining channels, then the learning described above is performed.

For instance, if it is assumed that a learning rule is established in advance so that the same pulse intervals or the same arrival time pattern are used for different processing channels with respect to the same feature category, then the outputs of the feature integration layer neurons of the channel having the highest mean activity level will be distributed and supplied (in the same pulse train pattern) to the neurons of the feature detection layer (the next layer) of the following entire channels or the channels close to the scale level of that channel according to the receptive field structures of the feature detection neurons. The outputs are supplied in the form of the same pulse train pattern. In this case, all channels of the subsequent layer are activated at the same level. A different method may be used to obtain the same result.

Thus, the same effect obtained by a learning process on objects of a plurality of different sizes or scale levels can be obtained simply in one learning process without implementing the learning process by presenting different sizes of an object to be recognized or detected.

The following will describe the processing in a learning mode and a recognizing mode that is carried out mainly in a feature detection layer.

As previously described, in each feature detection layer 102, pulse signals associated with a plurality of different features are received from the same receptive field, and the spatiotemporally weighted total sum computation and the threshold-value processing are carried out in a processing channel set for each scale level. The pulses associated with feature quantities arrive at predetermined time intervals on the basis of delay amounts or phases preset by learning.

The learning control of the pulse arrival time pattern is not a main point of the present application, and only a minimum description will be given. For example, a competitive learning program is introduced, wherein, if a feature element constituting a certain graphic pattern is a salient feature that contributes most to the detection of the graphic pattern, then this feature element arrives first, and the feature elements whose degrees of salience are almost the same arrive with predetermined time intervals provided therebetween thereby to discriminate feature elements by pulse signals. Alternatively, the learning control may be designed such that predefined feature elements, which are the feature elements that make up an object to be recognized and are considered especially important (e.g., a large average curvature and a high degree of linearity), arrive at different time intervals.

The degree of salience is reflected in, for example, the strength of response (the pulse delay amount in this embodiment) of a cell for detecting feature elements when the graphic pattern is detected. In this case, the neurons associated with the low-order feature elements in the same receptive field on the feature integration layer (the layer in the preceding stage) will synchronously fire or output pulses in predetermined phases.

In general, if a neuron in the feature integration layer has a connection to a feature detection neuron for detecting the same high-order feature located at a different position (in this case, the neuron has a different receptive field, but has a connection making up the same high-order feature), then these neurons synchronously fire. However, the output level depends also on a total sum or an average value or the like of the contributions from a plurality of pacemaker neurons provided for each receptive field of a feature detection neuron. The output level in this example is given by phase; alternatively, however, frequencies, amplitudes, or pulse widths may be used for the reference. In each neuron on the feature detection layer 102, the spatiotemporally weighted total sum of input pulses is computed on a pulse train reaching the neuron only in a time window having a predetermined width. The means for performing the weighted addition in the time window is not limited to the neuron element circuit shown in FIG. 2; another method may be used.

In this embodiment, the Gabor wavelet transform has been used for extracting low-order features. It is obvious, however, that another multi-scale feature, such as a local autocorrelation coefficient obtained by a sizes proportional to scales, may alternatively be used.

As in the case of the first embodiment, installing the pattern detecting or recognizing apparatus having the configuration according to the embodiment in an imaging apparatus, as shown in FIG. 11, makes it possible to focus on a particular object, make color corrections of the particular object, and control exposure.

Fifth Embodiment

In this embodiment, the representation of features at different scale levels and the population coding described above are carried out only on low-order features. Scale-invariant representation of features is accomplished by pulse phase modulation or the like on features, and medium- and high-order features are detected in the scale-invariant feature representation domain.

More specifically, the same structure as that of the first embodiment is employed up to the feature integration layer (2,0), and thereafter, scale-invariant signal conversion on low-order features that characterizes this embodiment is performed. From a feature detection layer (1,1) and after, medium- to high-order feature detection and integration are performed on scale-invariant feature representation. With this arrangement, a simplified circuit configuration, a smaller circuit scale, and reduced power consumption can be achieved while retaining scale-invariant recognizing performance at the same time, without using the configuration that includes a plurality of processing channels for medium- to high-order features shown in the first embodiment.

FIG. 21 shows a network configuration employed in the fifth embodiment. More specifically, in a feature detection layer (1,k), wherein "k" is a natural number, features are detected that are higher-order than the features obtained by the Gabor wavelet transform or the like and extracted from a layer (1,0). As shown in FIG. 21, however, from a layer (1,1) and after, it is possible to eliminate physical differences among processing channels in circuit configuration.

Referring to FIG. 21, $S_{k,m}$ is detected in a layer (1,0), and it indicates a feature category of a scale level m and of a k-th feature category. $C_{k,m}$ is integrated in a layer (2,0), and it indicates a feature category of a scale level m and of a k-th feature category. From a layer (1,1) and after, the feature categories to be detected and integrated have no scale level indices attached thereto.

FIG. 23 shows the transition of signal trains. In order to obtain scale-invariant representation of information by pulse phase modulation, phase conversion is carried out once by a pulse phase converter 2101 shown in FIG. 21 so that pulses of different processing channels are placed at different positions on a time base and that pulse signals belonging to different processing channels are not mixed (see FIG. 23A). Then, scale-invariant pulse signal trains are obtained by a scale-invariant signal converter 2102, and the pulse trains from the feature integration layer 103 (2,0) are caused to arrive at the neurons of the feature detection layer 102 (1,1).

To be more specific, for the pulses associated with the same low-order feature category but different scale level processing channels (hereinafter referred to as "the same feature but different scale"), a learning rule, such as self-organization or the like as mentioned previously or self-organization of phase delay amount is set so that the pulses are represented in terms of a predetermined pulse interval pattern when they reach feature detection cells. For example, in the case of the same feature of different scales, a configuration is designed such that the difference in processing channel (different scaling property) in the detection of low-order features is represented as a pattern wherein the ratio of the intervals of input pulses to the feature detection cells is identical but the scaling in the time domain is different, or as a pattern wherein the absolute values of pulse intervals provide the phase offset values that differ according to scale levels, as a result of a learning process.

More specifically, in the former case, T used in the learning rule of expression (6) is given by the following formula according to the scale level index m and the feature category index k. To make explanation simpler, the index representation of time delay incurred from the neuron j to the neuron i in expression (6) will be omitted.

$$\tau(k,m) = \alpha \eta_k \rho_m + \xi_{km} \quad (15)$$

In the latter case, $\tau$ is represented as follows:

$$\tau(k,m) = \eta_k + \alpha \rho_m \quad (16)$$

where $\eta_k$ indicates an amount unique to a feature category, $\rho_m$ indicates an amount unique to a scale level, and $\alpha$ indicates a positive constant. In the above expressions, $\rho_m$ indicates the expansion and contraction rate in the time domain, and $\xi_{km}$ indicates a phase offset, all of these being intrinsic to the scale level. Expression (15) includes the phase offset amount $\xi$ for preventing different processing channel signals from being mixed on a time base.

Subsequently, a scale-invariant signal converter 2102 generates a time window weighting function for a time range for a particular channel, that is, a scale level, selected by a gating circuit (see FIG. 23B), and carries out conversion into scale-invariant pulse train information regarding the feature to be detected (see FIG. 23C). Normally, only a pulse train associated with the feature category detected by a particular scale level or processing channel is extracted, and the pulse train is copied so as to be subjected to predetermined conversion, as necessary.

To be more specific, the gating circuit as shown in FIG. 19 is used to extract a pulse train of a processing channel with the highest mean activity level. For the former case, the pulse phase converter 2101 performs pulse phase conversion to obtain the expansion and contraction ratio in the time domain that remains constant in relation to a reference value. For the latter case, the conversion is performed so that a phase offset amount in an arrival pattern of a plurality of pulses to feature detection neurons for detecting a certain graphic feature remains constant in receiving pulses from any processing channels.

In any case, the conversion is made so that pulse phases depend solely on feature categories as shown by the expression below:

$$\tau = C_1 \eta_k + C_2 \qquad (17)$$

where $C_1$ indicates a positive constant, and $C_2$ indicates a non-negative constant. In the case of representing information based on pulse width modulation, similar processing can be employed for handling an increase or decrease of pulse widths or offset amount.

In the learning mode, as previously explained in the first embodiment, an arrangement may be made so that, even when an object to be recognized or detected is presented in one size, conversion into a plurality of scale levels may be made internally to conduct learning control. In this embodiment, when a learning pattern is presented at a fixed scale or size for one channel, a pulse train pattern based on that particular channel is converted into a different channel, i.e., a different position of a time base, according to expression (15) or (16) by the channel activation degree control circuit shown in FIG. 18. The converted pulse train is copied and transmitted to the subsequent layers (see FIG. 23D).

The conversion into the scale-invariant feature representation may not be limited to the Gabor wavelet transform or to the low-order feature levels, such as a directional component. Alternatively, the same configuration as that of the first embodiment may be used for the processing up to medium-order features having a predetermined level of complexity. More specifically, the detection or integration of features having complexity of a predetermined level or less may be performed by physically independent or spatially arranged processing channels, and features having complexity of a predetermined level or more may be processed by obtaining the scale-invariant representation as in this embodiment.

In this case, up to medium-order features having complexity of a predetermined level or less, the population coding, such as the coupling of processing channels, is carried out without complicated timing control, and the difference of processing channels is output in the form of the firing characteristic of physically different neurons. This arrangement provides an advantage in that the detection processing for up to medium-order features can be performed quickly and simultaneously at a plurality of scales, as compared with a case where the processing of individual scale levels is implemented in series.

For high-order features, a smaller scale of circuit and reduced power consumption of a circuit can be achieved, as previously mentioned. Thus, the feature level or complexity level at which scale-invariant representation is obtained can be decided by considering all factors together, including the processing time, the complexity of timing control, the required circuit scale, and power consumption.

Sixth Embodiment

According to this embodiment, in the feature detection neurons that belong to different scale levels or processing channels, a learning rule is established such that the arrival time intervals or the arrival time patterns of the pulses associated with graphic features of the same category (e.g., L-shaped patterns) differ according to scale levels. The population coding is performed by linear coupling based on weighted addition of entire time-divided pulse signals.

FIG. 22 shows a network configuration employed for the sixth embodiment. The sixth embodiment shown in the drawing includes a pulse phase converter 2101 and a time-base population coder 2201 provided between population coding neurons and a feature detection layer, which is the succeeding layer, in the configuration shown in FIGS. 15 and 16. With this arrangement, a feature detection layer (1,1) receives signals obtained by deploying or arranging the pulses that belong to different processing channels on a time base of a predetermined channel.

Figure 20:
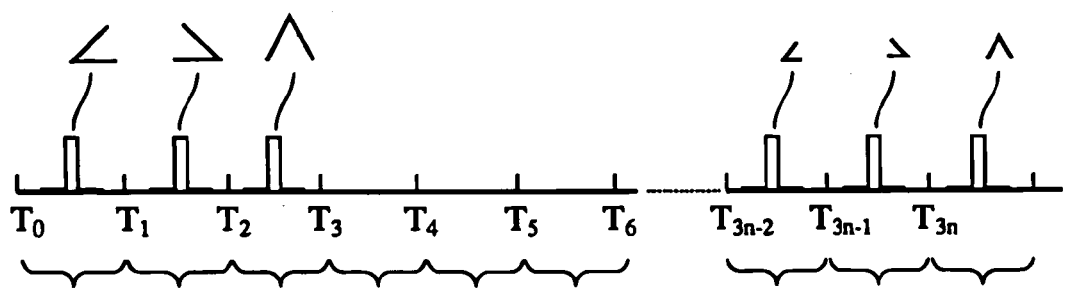
FIG. 20 shows an example of a signal supplied to a feature integration layer if patterns of different sizes are detected at the same location when processing channels or scale levels are to be arranged in the time domain.

FIG. 20 illustrates an example of signals supplied to a feature integration layer when patterns of different sizes have been detected at the same location in the process of developing processing channels or scale levels in the time domain. As illustrated, the differences of the processing channels or scale levels are time-divided to be set at different positions on the time base of pulses reaching feature detection neurons. In other words, different phase offset amounts are imparted.

Specifically, sub time windows $w_{1,1}$, $w_{2,1}$, $w_{3,1}$ shown in FIG. 20 are the time windows for the L-shaped pattern set detected at scale level 1, and $w_{1,n}$, $w_{2,n}$, $w_{3,n}$ are the time windows for signal pulses representing a detected L-shaped patterns making up a set of the same feature category, and are associated with a scale level n.

As in the case of the fifth embodiment, multi-scale processing can be implemented by a single circuit in the layers from the feature detection layer 102 (1,1) and after, without the need for providing a different circuit for each processing channel, thus permitting economical circuit configuration to be attained. In other words, as shown in FIG. 22, the physical discrimination among different processing channels can be eliminated in circuit configuration from the layer (1,1) and after. In this embodiment, the coupling and population coding corresponding to expressions (9) and (10), respectively, are performed in the time domain on the signals of the scale levels or processing channels disposed at temporally different positions, in the layer (1,1) and after.

The outputs from the feature detection layer 102 (1,1) to a feature integration layer 103 (2,1) are supplied in a time sharing mode for each processing channel or scale level. This applied to all the succeeding layers. More specifically, when performing temporal integration on input signals of feature detection cells, pulses for one processing channel are output in correspondence to the entire range of a sub time window making up one scale level. The population coding in the feature integration layer is implemented by integrating input pulses in the time windows involving multiple channels.

The graphic feature signals of different scale levels or processing channels are processed by population coding neurons in the following two steps. First, input pulses are integrated in the time window for each processing channel thereby to carry out detection on the same feature category for each scale level, then the computation for the population coding is performed according to expressions (9) and (10) by denoting the integration value of each time window as $p_{ij}$. The processing channel outputs thus time-shared are temporally integrated to permit the detection or recognition of a graphic pattern of an arbitrary pattern.

The example shown in FIG. 24 illustrates the transition of a signal train in order from top, beginning from the outputs of a feature detection cells on each channel or scale level to the outputs of population coding cells of a feature integration layer. In this example, the scale level ranges from 1 to n, and the feature category ranges from 1 to 3.

Figure 24A:
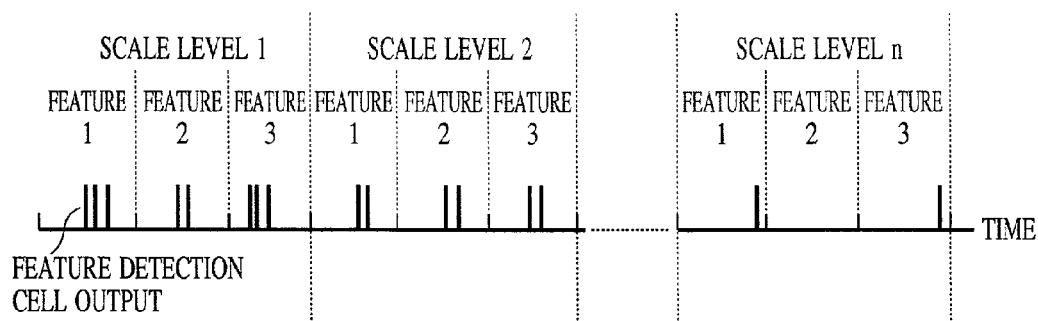
FIG. 24 shows the transition of a signal train of the sixth embodiment.

FIG. 24A illustrates the outputs from the feature detection cells to the feature integration layer that have been deployed on a time base for each scale level and each feature. There are a plurality of outputs for each feature simply because a plurality of feature detection cells for detecting the same feature or the same scale level exist, and the outputs reflect the presence of fluctuations due to Poisson noises or the like or the variations in the sensitivity with respect to feature category or scale levels. The missing pulses associated with feature 2 at a scale level n merely mean that no pulses have been detected. At the scale level n, the phases are also delayed on features 1 and 3, as compared with other scale. This means that the detection level is low.

Figure 24B:
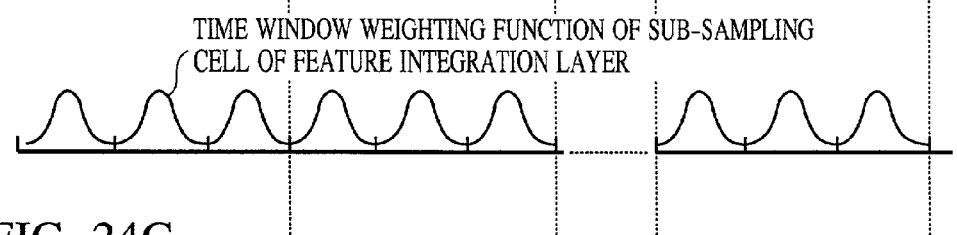
Figure 24C:
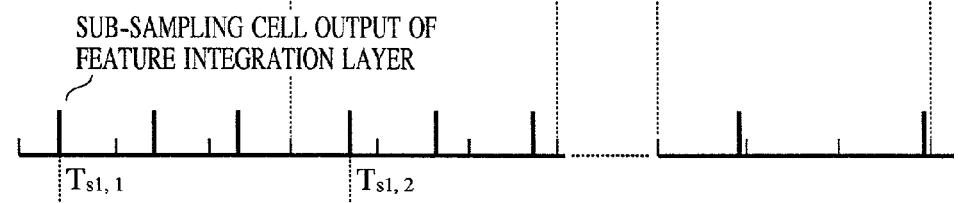
Figure 24D:
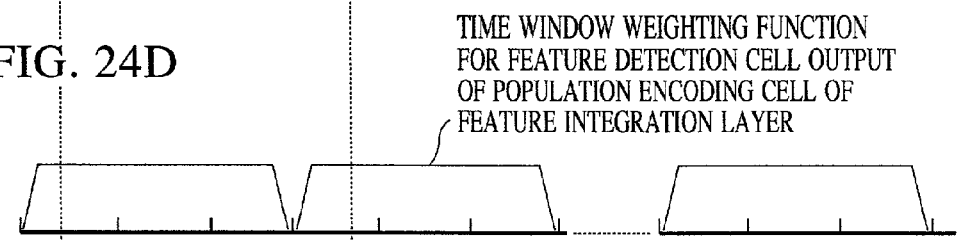
Figure 24E:
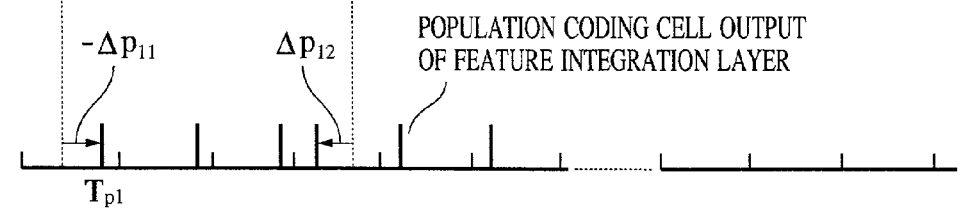

FIG. 24B shows the weighting functions for temporally integrating the outputs of the feature detection cells by the sub-sampling cells of the feature integration layer. FIG. 24C shows the resulting outputs of the sub-sampling cells. FIG. 24D shows the time window weighting functions for individual scales that are used for integrating the outputs of the sub-sampling cells in population coding cells. FIG. 24E shows the distribution of the outputs from the population coding cells on a time base.

The descriptions will now be given of an example indicating an advantage obtained by the population coding. Regarding feature 1 at scale levels 1 and 2, the pulses on the time base before and after the population coding are modulated so that the pulses of scale level 1 have a phase delay, namely, a time delay $\Delta_{p11}$, while the pulses of scale level 2 have a phase advance, namely, a time advance $\Delta_{p12}$. This indicates that the outputs of the sub-sampling cells have been modulated on the activity level or the like of all channels according to expressions (3) and (4), and that the size or the scale level of the object to be recognized or detected lies between the preset scale levels 1 and 2. The processing thereafter may be performed by, on a time base, the channel activation control or the gating function shown in FIGS. 18 and 16 in the first embodiment.

To be more specific, the channel activation control circuit or the gating circuit calculates a target channel activation degree or selects a channel from the time-shared channel data. Then, the channel activation control circuit or the gating circuit sets a neuron threshold values for the subsequent layers on the basis of the channel activation degree for each time window for each channel or scale level, or conducts control or signal levels by amplifying or attenuating them, or allows signals of only a selected channel to pass.

According to the embodiment set forth above, features are detected at a plurality of resolutions or scale levels, and the population coding is performed on the features of the detected plural scale levels, thus making it possible to inhibit deterioration in detection performance even if the size of an object to be detected arbitrarily changes.

The detection of low- or high-order feature elements or graphic pattern element is performed by conversion into pulse trains having phases that differ according to resolutions or scale levels so as to accomplish the recognition processing at multiple scales by the single processing circuit. This configuration obviates the need for providing physically different processing channels, allowing dramatically reduced circuit scale and power consumption, as compared with a case where no such phase conversion is performed.

Moreover, the pulse signals serving as feature detection signals are subjected to the threshold-value processing of a weighted sum in a time window. This makes it possible to reliably detect a desired pattern even if an object to be detected or recognized deforms due to a positional change, a rotation, etc. or deficiency or the like occurs in detecting a feature due to a size change, or the influences of lighting, noises, or the like, under complicated, diverse conditions. This advantage can be obtained without the need of relying on any particular network structure.

According to the embodiment described above, the positions of the pulse trains in time windows that are temporally disposed on a single input line of a predetermined neuron are associated with predetermined pattern features and scale levels. With this arrangement, the difficulties with wiring among neuron elements can be alleviated, permitting significantly reduced scale and power consumption of a circuit for recognizing or detecting a predetermined object by two-dimensional pattern processing, while maintaining the above-mentioned high reliability.

Furthermore, features are detected at a plurality of resolutions or scale levels, and multiplexing or the population coding is performed on the features of the detected plural scale levels, thus making it possible to prevent deterioration in detection performance even if the size of an object to be detected changes arbitrarily.

The detection of feature elements is performed by conversion into pulse trains having phases that differ according to resolutions or scale levels so as to accomplish the recognition processing at multiple scales by a single processing circuit. This configuration dramatically reduces circuit scale and power consumption.

Seventh Embodiment

In this embodiment, the descriptions will be given of a case where a pattern is detected or recognized while performing selective attention.

Figure 27:
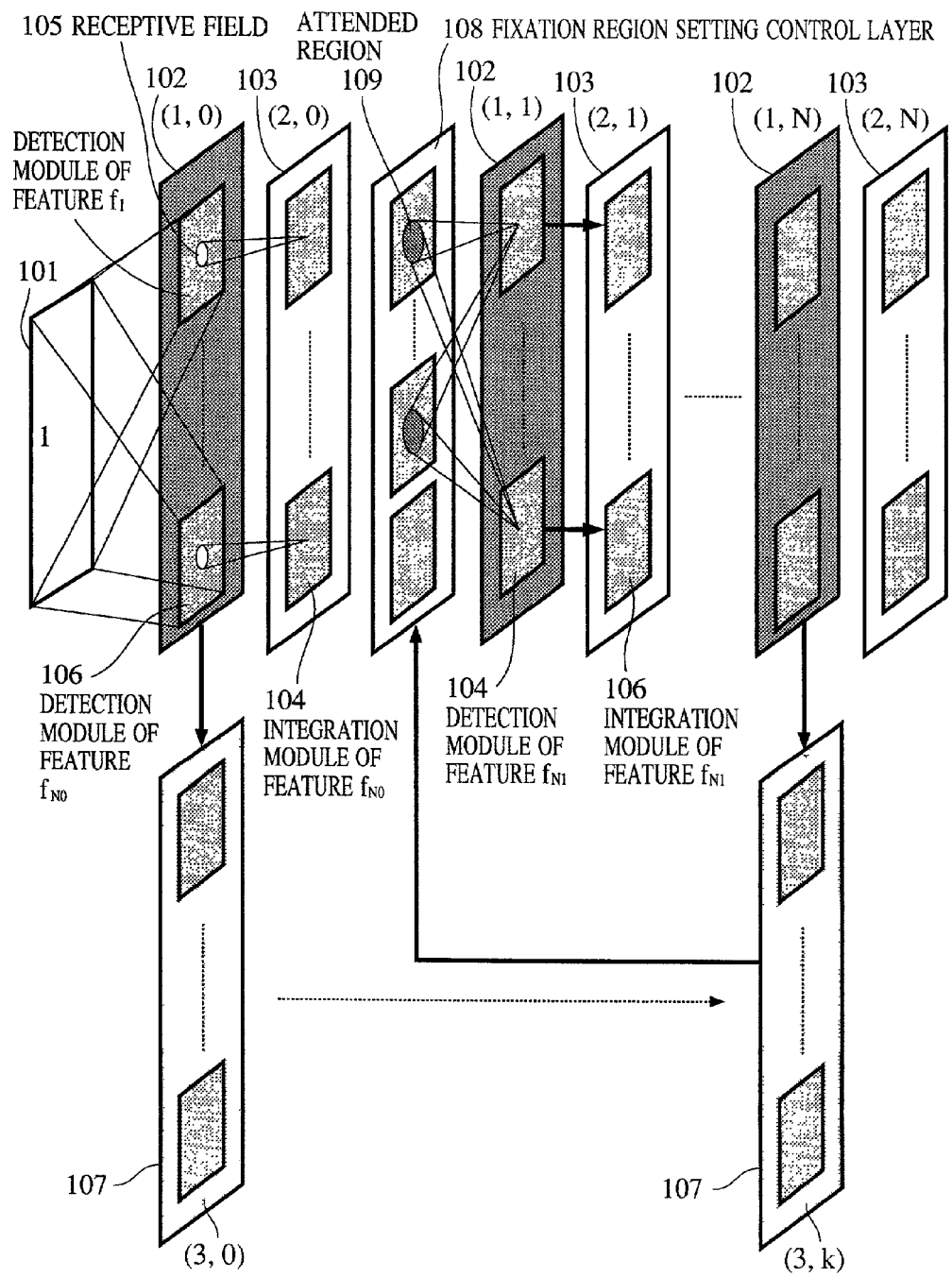
FIG. 27 is a block diagram showing a network configuration in a seventh embodiment.

FIG. 27 shows the general configuration of a pattern detecting or recognizing apparatus according to the seventh embodiment.

In this embodiment, the detailed explanation of the application to speech recognition will be omitted. Briefly, the selective attention for speech in the following description is equivalent to, for example, extracting and processing only a particular band or phoneme, selectively processing only features extracted by a technique, such as an independent component analysis, or extracting and processing the speech or feature of a particular speaker that depends upon context.

The following will describe the process for inputting an image. A What pathway includes feature detection layers 102 ((1,0), (1,1), . . . , (1,N)), feature integration layers 103 ((2,0), (2,1), . . . , (2,N)), and an attended region or fixation region setting control layer 108.

The fixation region setting control layer 108 receives a feature salience map from a feature integration layer (2,0), which will be discussed hereinafter, and a feedback connection from an upper layer, e.g., a feature position detection layer (3,k), through a Where pathway, which will be discussed hereinafter. Based on the feedback signals, the fixation region setting control layer 108 conducts control of the setting of the position and size of a fixation region and of updating or the like thereof. The details of the operating mechanism of the fixation region setting control layer 108 will be explained later.

Feature detection layers (1,k) form, as a whole, processing channels of a plurality of resolutions or scale levels. Specifically, taking an example wherein the Gabor wavelet transform is performed by a feature detection layer 102 (1,0), a set of feature detection cells having Gabor filter kernels in their receptive field structures that share the same scale level but have different directional selectivities belongs to the same processing channel in the feature detection layer 102 (1,0), as shown in FIG. 12. In the succeeding layer (1,1), the feature detection cells for detecting higher-order features that receive the outputs from the feature detection cells belong to the same processing channel. In further succeeding layers (1,k), in which k>1, the feature detection cells that receive the outputs from a plurality of feature integration cells that form the same channel in a layer (2,k−1) belong to that channel also. In each processing channel, processing at the same scale level or resolution is implemented to detect and recognize low-order features to high-order features through the hierarchical parallel processing.

The feature integration layer 103 (2,0) on the What pathway has a predetermined receptive field structure and is composed of neuron elements that generate pulse trains. Hereinafter, the receptive field will mean the range of connection to the output elements of an immediately preceding layer, and the receptive field structure will mean the distribution of the connection weights. The neuron feature integration layers U103U (2,0) integrate a plurality of neuron element outputs in the receptive fields from the feature detection layer U102U (1,0). The integration is carried out by sub-sampling by local averaging or the like, and by computation, such as coupling of the results of processing at different scale levels.

Each receptive field of the neurons in the feature integration layer share the same structure as long as the neurons belong to the same layer. Feature detection layers 102 (1,1), (1,2), . . . , (1,N)) and feature integration layers 103 ((2,1), (2,2), . . . , (2,N)) have predetermined receptive field structures individually acquired by learning. As in the case of the aforesaid layers, the former layers ((1,1), . . . ) detect a plurality of different features in individual feature detection modules, and the latter layers ((2,1), . . . ) integrate detection results regarding a plurality of features received from a preceding feature detection layer.

The former feature detection layers are connected or wired to receive the outputs of the cell elements of the feature integration layers in the preceding stage that belong to the same channel. The feature integration layers implement two types of processing. One type of processing is sub-sampling by, for example, averaging the outputs from local regions, i.e., the local receptive field of the neuron in the feature integration layer, of the populations of feature detection cells of the same feature category and the same scale level. The other type of processing is to integrate the results of the processing at different scale levels. In the integration processing, the outputs of a plurality of feature detection cell populations of the same feature category but of a plurality of different scale levels are linearly coupled or non-linearly coupled.

A Where pathway having feature position detection layers ((3,0), . . . , (3,k)) receives the outputs of predetermined (not necessarily all) feature detection layers on the What pathway, and is involved in the outputs of the positions of low-order, medium-order, and high-order features. The Where pathway forms the connection of feedback from an upper feature integration layer or a feature detection layer, as shown in FIG. 1 ((1,N)→(3,k)→Fixation region setting control layer 108).

In other words, it is assumed that the feedback connection has been formed beforehand by learning as a connection to an attention control neuron 2901 (FIG. 29) of a fixation region setting control layer 108 associated with a particular low-order feature constituting a high-order feature pattern detected by an upper layer. The learning involves the process of self-organization wherein, for example, the connection is potentiated or formed by simultaneous firing of a feature detection neuron of an upper layer and a feature detection neuron of a lower layer within a predetermined time width, otherwise, the connection is depressed or extinguished.

The outputs of each feature position detection layer 107 retain relatively high resolution components of the outputs of an associated feature detection layer 102 thereof. This is schematically shown by the arrows from the feature detection layers to the feature position detection layers in FIG. 27. Alternatively, the outputs of the feature integration layers are temporarily retained so as to create a map showing the salience level of each feature category. A salience map in a certain layer shows the spatial distributions of the detection levels or the probabilities of existence on input data of a plurality of feature categories or feature elements with similar complexity. The processing implemented in the feature position detection layers on the Where pathway will be discussed again later.

Figure 28:
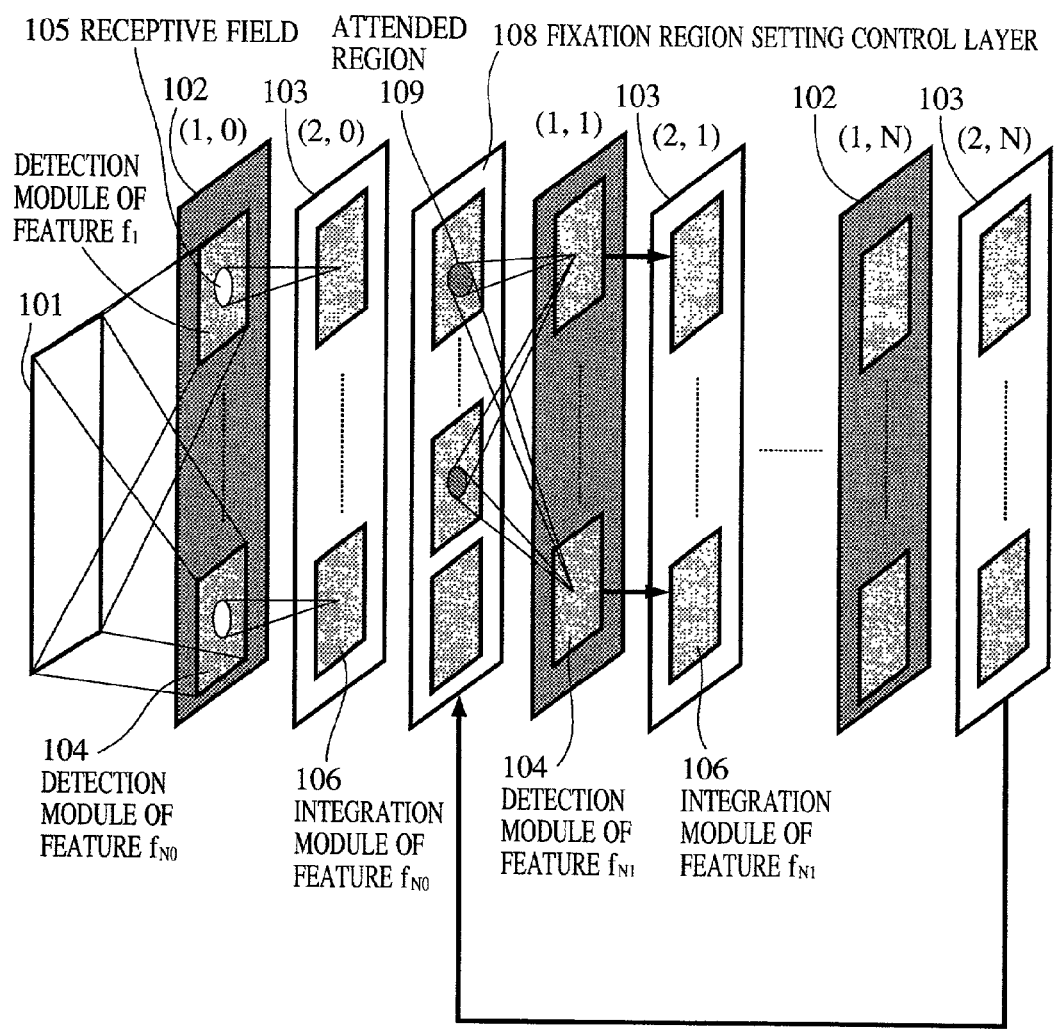
FIG. 28 is a block diagram showing another network configuration in the seventh embodiment.

In another network configuration shown in FIG. 28 that has a What pathway identical to that shown in FIG. 1 except for the receptive field size, a series of feature integration layers retain the spatial disposition relationship among feature categories up to high-order features. Hence, the sizes of the receptive fields are set to a predetermined level or less even in upper layers. For this reason, the feedback connection is made from a feature integration layer to the fixation region setting control layer 108 without providing a feature position detection layer.

Selective Attention

The configuration and operation of the fixation region setting control layer 108 will now be explained. In an initial state, the size of the fixation region set in the same layer is defined as an entire screen with respect to a processing channel of a maximum size among the a plurality of preset scale levels previously mentioned.

Figure 29:
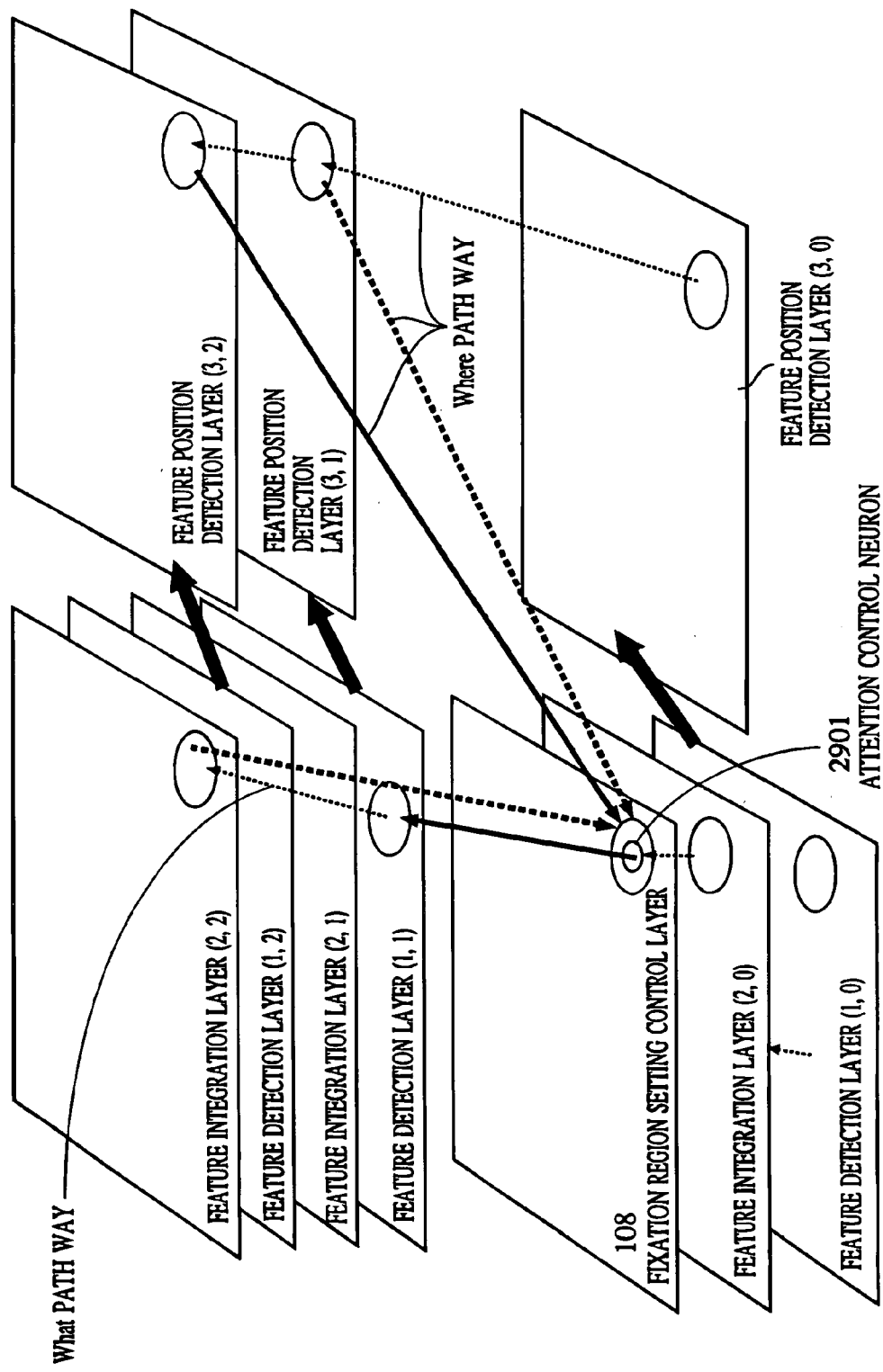
FIG. 29 is a schematic diagram illustrating connection centered around an attention control neuron in an attention control layer.

To be specific, as shown in FIG. 29, attention control neurons 2901 associated with a predetermined number of positions, where feature detection is carried out, of input data are disposed in the fixation region control layer. The circled regions shown in FIG. 29 schematically show the fixation points (in the layer (1,0)) and the associated regions in each succeeding layer. For the convenience of explanation, only one such associated region is shown in each layer; however, a plurality of associated regions can exist in each layer since the detection is generally performed on a plurality of feature categories. The sizes of the regions are approximately the same as the sizes of receptive fields.

Referring to FIG. 29, the bolded arrows directed from the feature detection layers to the feature position detection layers schematically show that the neurons of the feature position detection layers receive the outputs of the associated neurons of the feature detection layers. The feature position detection layer neurons usually have receptive fields that are smaller than those of the feature integration layer neurons and perform sub-sampling, as in the case of the feature integration layers. Thus, the spatial disposition information regarding feature categories can be retained better than that obtained in the feature integration.

The individual attention control neurons 2901 receive inputs through the intermediary of feedback connections from an upper feature position detection layer (3,2) or (3,1) via the Where pathway. In the case shown in FIG. 28, the individual attention control neurons 2901 receive inputs through the intermediary of feedback connections from neurons on the positions associated with the attention control neurons in a feature integration layer (2,2). The attention control neurons may receive the outputs from a feature integration layer (2,0) in parallel. Predetermined weighted linear addition or non-linear addition of these two or three types of inputs is performed, or selection control on a fixation region on the basis of one of the inputs is conducted (this will be discussed hereinafter). A particular attention control neuron that has been selected as the result of the addition or selection control mentioned above is activated, thus deciding the fixation region.

The position of the fixation region is set by feeding back the positional information regarding an object of a maximum level that is detected mainly the uppermost feature integration layer (2,N) or the uppermost feature position detection layer (3,M). The former, namely, the configuration shown in FIG. 28, is limited to the case where positional information is retained in a feature integration layer. There are mainly three methods for selecting fixation positions, as described below.

(1) The position of a fixation point is specified by the attention control neuron that has a maximum linear sum or non-linear sum of the feedback amount from an upper layer or a total feedback amount from a plurality of upper layers, and a feature detection layer output or a salience level of a low-order feature.

(2) The position of an attended point is specified by the attention control neuron that receives a maximum or maximal low-order feature salience level map value.

(3) The position of an attended point is specified by the attention control neuron that receives a maximum or maximal feedback amount from an upper layer, or a maximum or maximal total sum of feedback amounts if a particular attention control neuron has a plurality of feedback pathways.

The feedback amount mentioned above refers to the output level or an amount proportional thereto of a neuron of an upper feature position detection layer or a feature integration layer on a particular processing channel and a particular feature category. In the present invention, the case (1) or (3) applies. The method described in (2) is well known, and has a disadvantage described previously. Thus, the fixation position is decided by a contribution of the feedback amount from an upper layer. The process for recognizing an object is not started until the setting of a fixation region or the activation of an attention control neuron is performed. The setting is accomplished by the coordination between an upper layer neuron and a lower layer neuron in a bottom-up process based on the processing of signals from a lower layer to an upper layer, and a top-down process from an upper layer to a lower layer is performed.

Therefore, in an initial step wherein an upper layer neuron outputs a signal in a first bottom-up process, a recognition or detection state is not set. At this stage, it is still in a latent state wherein a salience map regarding high-order features has been output in an upper layer. Based on an attention control signal generated as the result of the top-down process, detection and integration neurons for high-order features of an upper layer supply outputs in another bottom-up process. At this stage, an elicited state is set wherein neurons of high output levels are localized and sparsely present in the upper layer. This completes a series of operations for recognition and detection. The upper layer is not necessarily limited to a layer (2,N) shown in FIG. 1 or FIG. 28, or a layer (3,k) shown in FIG. 1. The upper layer may instead be an intermediate layer that is lower than the highest level layer or an upper layer (not shown) that is higher than the highest level layer.

The number of the attention control neurons 2901 does not have to coincide with the number of neurons, namely, a number $N_{FO}$ of the positions where features are detected, in a feature integration layer (2,0). Alternatively, the number of the attention control neurons 2901 may be identical to, for example, a number $(N_{F_p})$ of neurons of the uppermost feature position detection layer. If $N_{F_p} < N_{FO}$, then the number of sampling points for conducting the attention control will be less than the number of the low-order feature detection positions. However, unless $N_{F_p} << vN_{FO}$, there will be hardly a problem in practical use when the lower limit value of the size of an object to be detected is $vS_0$, where $0<v<1$, and $S_0$ denotes the entire area of the image. The low-order feature salience level map received by an attention control neuron may be an output from a feature detection layer (e.g., layer (1,0)).

A fixation region set by updating a fixation position has a preset size decided by a processing channel to which the neurons of the uppermost layer that supplies a maximum feedback amount to the attention control neuron 2901, or the channel to which a feature integration layer neuron associated with an attention control neuron belongs. This is applied to the case of (3) described above. Alternatively, the preset size is decided by a processing channel to which a feature integration layer neuron belongs, the feature integration layer neuron being associated with an attention control neuron that receives a maximum or maximal linear sum of an input from an upper layer and a low-order feature salience. In this embodiment, the size of the fixation region is defined as the kernel size of a Gabor filter that belongs to the processing channel of the aforesaid feature integration layer (2,0).

Figure 30:
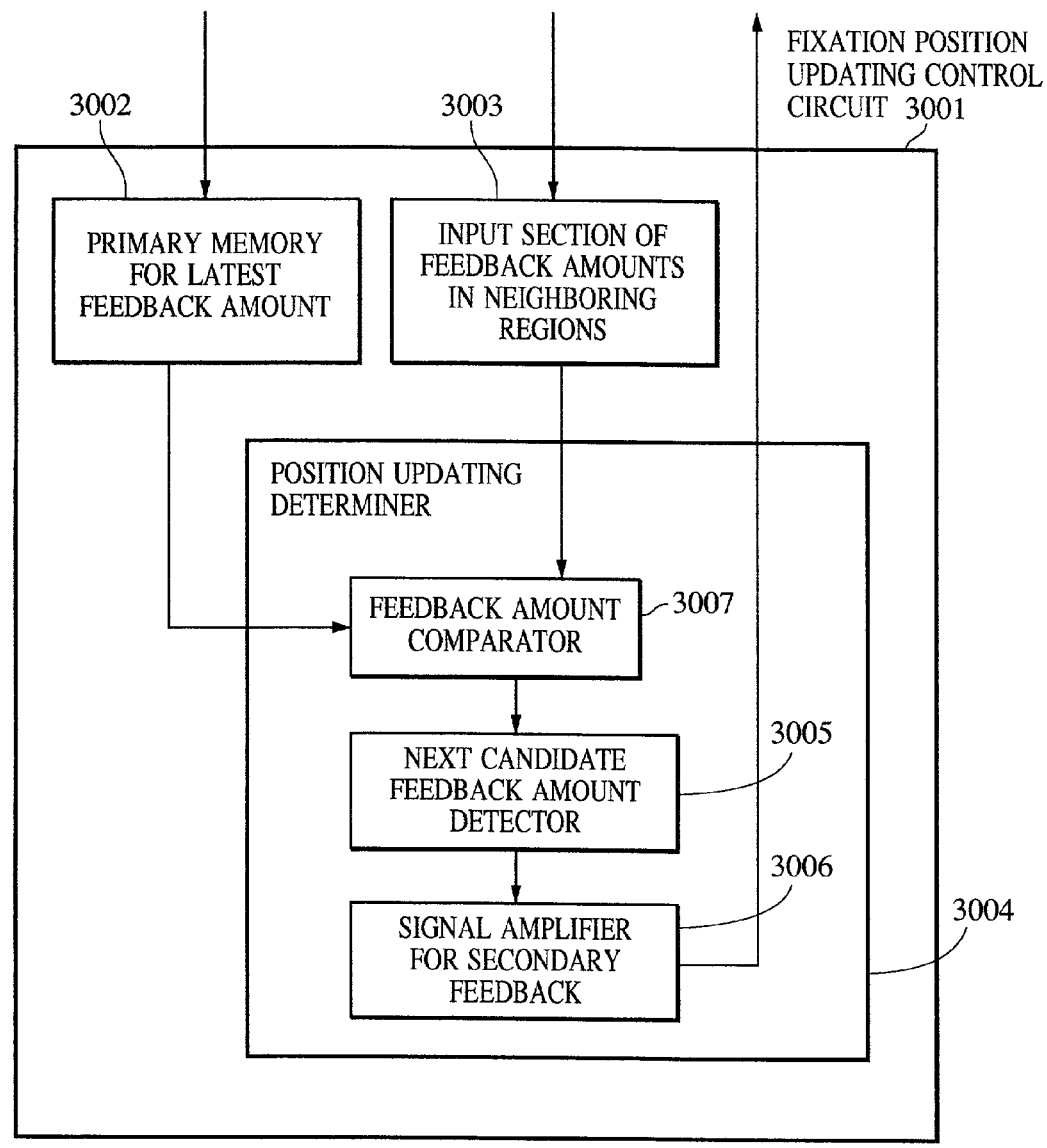
FIG. 30 shows a configuration of an attention position control circuit.

A possible specific configurations for the fixation region setting control layer may include the gating circuit 1902 of FIG. 19 and a fixation position updating control circuit 3001 of FIG. 30, which will be shown hereinafter, in the channel processing structure shown in FIG. 15 or 16 described above, in addition to the attention control neuron 2901.

The gating circuit is employed for masking low-order features to propagate the data of only a particular portion of a region to an upper layer. The gating circuit functions to selectively extract a region to be attended at in a selected particular channel from the outputs from the feature integration layer (2,0), then propagate the signals associated with the extracted region to a succeeding channel. Thus, a fixation region can be set by propagating only low-order feature signals from a particular region on a particular channel and input data.

In another possible configuration, a certain attention control neuron is selected and activated in response to, for example, a feedback signal from an upper layer thereby to transmit a pulse for stimulating firing via a synapse to the neuron at the associated position in the feature integration layer (2,0). This causes the associated neuron of the feature integration layer to be turned ON or set ready for firing. The ready-to-fire state in this case refers to a state wherein the neuron is ready to receive an output from a pacemaker neuron or the like, that is, a transient state, or a state wherein such a transient state is allowed.

Figure 31:
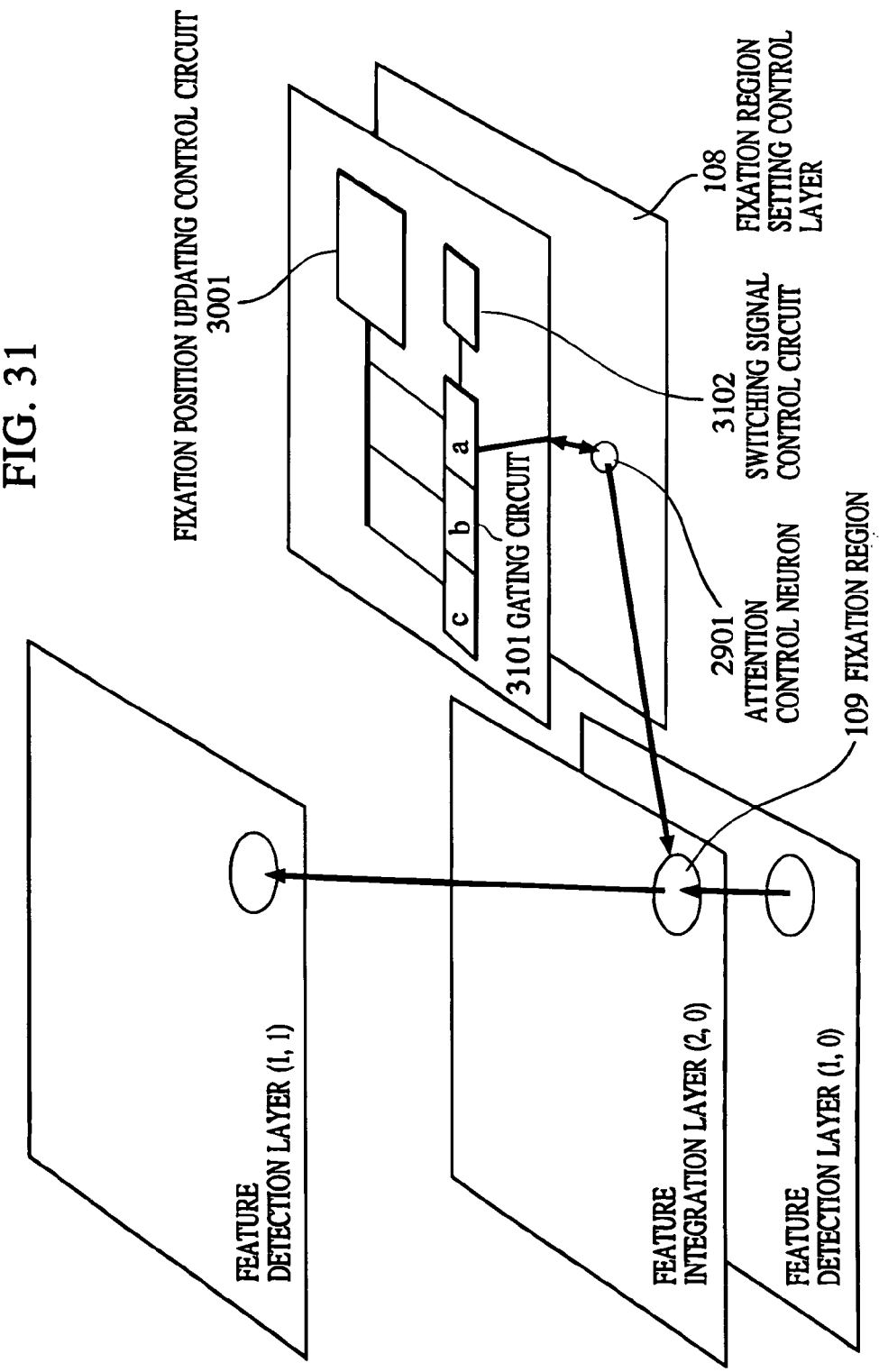
FIG. 31 is a diagram showing a network configuration centered around an attended region setting control layer.
Figure 32:
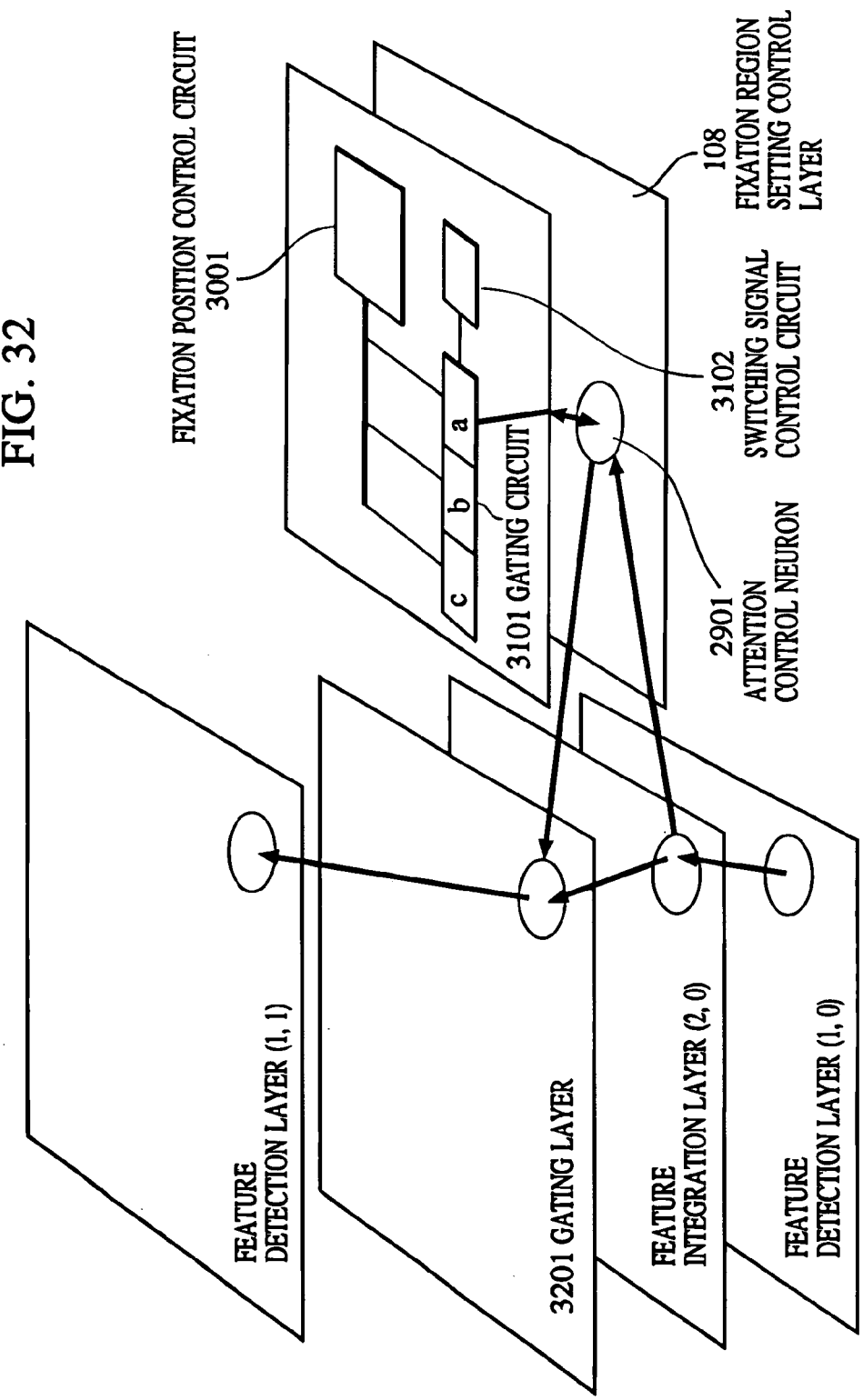
FIG. 32 is another diagram showing the network configuration centered around the attended region setting control layer.

FIGS. 31 and 32 show the examples of the pathways of signal propagation among the fixation region setting control layer 108, a feature integration layer (2,0) and a feature detection layer (1,1). The configurations shown in both FIGS. 31 and 32 employ a gating circuit 3101 that is provided together with a common bus of a digital circuit and has a switching function, and a switching signal control circuit 3102 for controlling the ON/OFF of the switching function at high speed. Referring to FIG. 31, the attention control neuron 2901 makes a connection to a neuron in a region of a predetermined size unique to the processing channel of a neuron that belongs to a region 109 centering about a plurality of neurons of the feature integration layer (2,0), i.e., the neurons on the feature integration layer that are associated with fixation positions (hereinafter referred to as "attention-center neurons"). The size of the region 109 is intrinsic to the processing channel to which the attention-center neurons on an integration layer belong.

The configuration shown in FIG. 31 has a connections between the attention control neuron 2901 and a feature integration layer, and fixation positions are controlled solely on the basis of the feedback amounts of a feature position detection layer on the Where pathway. A modified configuration may be employed, wherein attention control neurons and feature integration layer neurons are reciprocally connected, and the fixation positions are controlled on the basis of the foregoing feedback amounts and feature integration layer outputs. According to the configuration shown in FIG. 32, the attention control neuron 2901 has a similar connection to a gating layer 3201 equivalent to the gating circuit 1902 of FIG. 19, and the outputs of the feature integration layer (2,0) are supplied to the feature detection layer (1,1) through the intermediary of the gating layer 3201.

In the configuration shown in FIG. 31, a typically circular or rectangular region having a size intrinsic to the processing channel centered about the feature integration layer neuron located at a fixation position is activated, and the output of the feature integration layer (2,0) that is associated with the region is propagated to the feature detection layer (1,1). In the configuration shown in FIG. 32, only the gate of a region having a size unique to the processing channel centered about the fixation position in a gating layer is opened, and the output of the feature integration layer (2,0) that is associated with the region is propagated to the feature detection layer (1,1).

The gating layer is formed of FPGA or the like, and equivalent to a typical gating circuit wherein all logic circuits that are provided in correspondence to the individual positions of attention control neurons exist between the feature integration layer (2,0) and the feature detection layer (1,1). When an attention control neuron is activated, only a logic circuit unit located at a corresponding position in the gating layer is activated so as to transmit a signal to a succeeding layer.

The size of a fixation region to be set depends on the processing channel to which the feature integration layer neuron associated with the aforesaid activated attention control neuron belongs as previously explained. For instance, if the associated feature integration layer neuron belongs to processing channel 1 shown in FIG. 15 or 16, then the size of the fixation region will be the maximum one among preset sizes.

The mechanism for the updating control of fixation positions will now be described. In the case of (3) of the attention control mechanism mentioned above, the fixation position after initially set is updated basically in the order of the magnitude of feedback amounts received by the attention control neurons from an upper layer in a region in the vicinity of a predetermined range of a most up-to-date fixation position. The magnitude of feedback amounts here refers to the magnitude next to a maximum value. In the case of the aforesaid attention control mechanism of (1), the positions are updated in the order of evaluation value $G_f$, as shown below:

$$G_f = \eta_1 S_f + \eta_2 S_{FB,f} \tag{18}$$

where $G_f$ denotes an evaluation value regarding a feature f, $S_f$ denotes the salience regarding the feature f that is received from a lower feature integration layer, $S_{FB,f}$ denotes a feedback amount supplied to the attention control neuron 2901 regarding the feature f detected at the uppermost layer or an intermediate feature detection layer, and $\eta_1$ and $\eta_2$ denote positive constants. The constants $\eta_1$ and $\eta_2$ can be adaptively changed according to the nature of an object to be recognized or detected, e.g., detailed comparison of features for identifying a particular object among other similar objects or average (or rough) comparison of features in detecting features that belong to a particular category, such as a person's face.

To be more specific, the ratio of $\eta_2$ to $\eta_1$ is set to a small value for the aforesaid detailed comparison, whereas the ratio is set to a large value for the aforesaid average (or rough) comparison. Such control of the constants $\eta_1$ and $\eta_2$ is carried out by changing the associated synaptic connections to attention control neurons.

Figure 33:
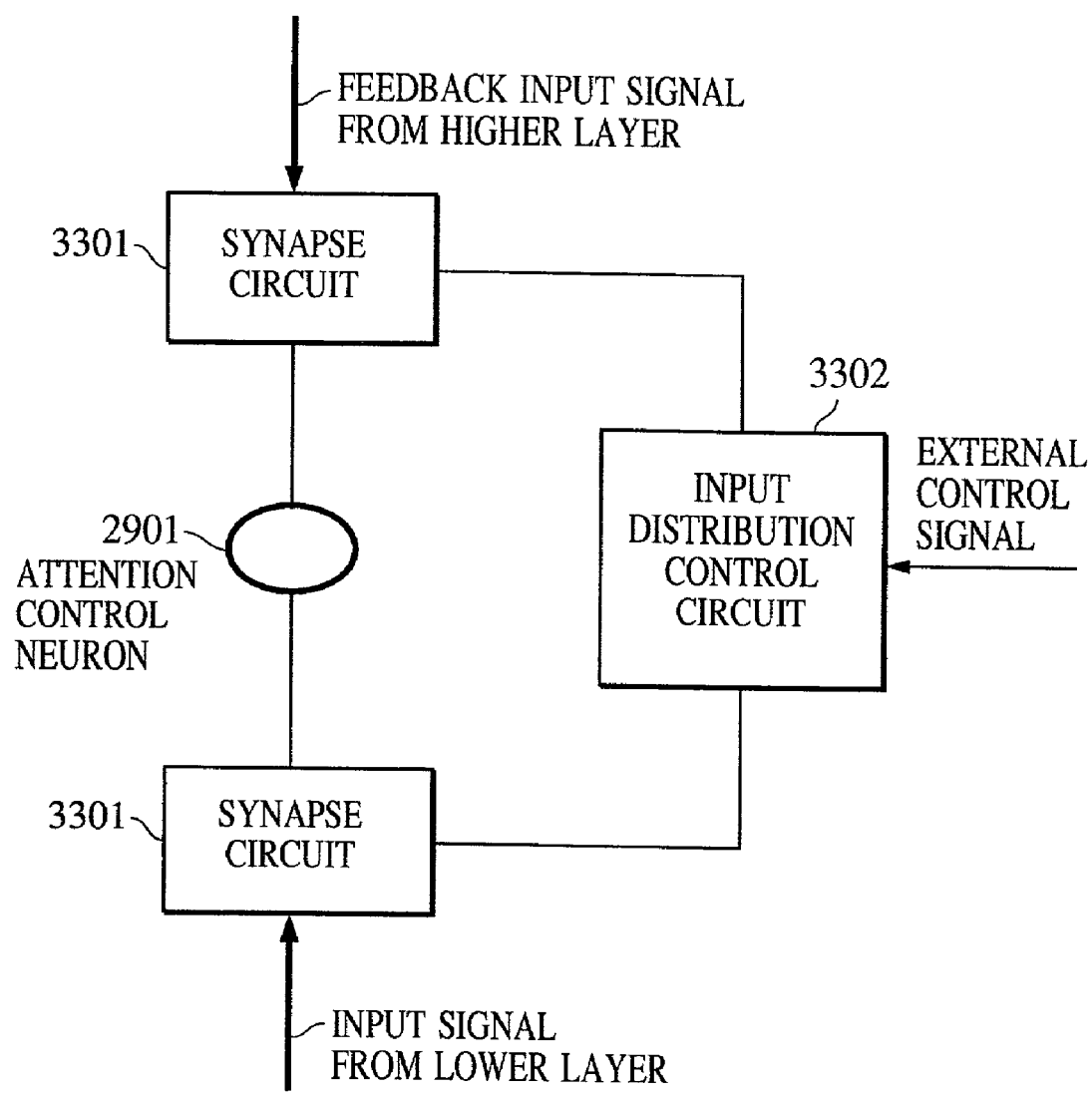
FIG. 33 shows a distribution control circuit for a lower layer input and an upper layer feedback input supplied to an attention control neuron.

FIG. 33 shows an example of configuration centering around an attention control neuron 2901 and a circuit 3302 for controlling the assignment of inputs to the attention control neuron when the control of the constants $\eta_1$ and $\eta_2$ pertaining to the synapse of the attention control neuron is carried out.

In this case, the input distribution control circuit 3302 connects to the synapse circuit 3301 involved in the modulation of the detection level of the salience map signal inputs of low-order features received from lower layers, and also to another synapse circuit 3301 involved in the modulation of the detection level of feedback signals from upper layers. The input distribution control circuit 3302 mainly controls the phase delay amounts at the synapses corresponding to the values of $h_1$ and $h_2$ in response to external control signals (e.g., a signal regarding a subject received from a further upper layer, not shown in FIG. 1, the signal indicating whether a particular mode is the one for detecting an object or for detailed identification).

The size of a neighboring region is about the same as the size of a fixation region in input data (e.g., a value not exceeding ten times the fixation region size). The search is limited to the neighboring region in order to maintain high processing speed. As long as the processing speed can be maintained to a reasonable level, the search range may cover entire image data.

The descriptions will now be given of the fixation position updating control circuit 3001 for controlling the sequential updating of fixation positions. This circuit shown in FIG. 30 is constructed mainly by a primary memory 3002 of a feedback amount supplied to the attention control neuron 2901 that is located in a point corresponding to a most up-to-date position, an input means of feedback amounts in a neighboring region 3003, and an updated position determiner 3004 that finds a next candidate feedback amount following a most up-to-date fixation position feedback amount in the neighboring region, and detects and activates an attention control neuron that receives the next candidate feedback.

The updated position determiner 3004 includes a comparator 3007 that receives the inputs from the primary memory 3002 and the input means of feedback amount in a neighboring region 3003, and compares the feedback amount at a most up-to-date attention control neuron with the feedback amount in its neighboring region, a secondary feedback signal amplifier 3006, which will be discussed hereinafter, and a next candidate feedback amount detector 3005. If the updated position determiner 3004 finds a feedback amount conforming to the most up-to-date feedback amount through the next candidate feedback amount detector 3005, then the determiner 3004 causes the second feedback signal amplifier 3006 to output a pulse to the attention control neuron associated therewith.

The aforesaid "conforming to the most up-to-date feedback amount" specifically means the following. When a feedback amount is input at random in a neighboring region and the two feedback amounts are compared according to the method mentioned above, if the difference therebetween lies within a predetermined reference or threshold value range, or if the feedback amount of an object to be compared with is larger than the most up-to-date feedback amount, which can happen if a search range is updated, then this situation is referred to as "conforming to the most up-to-date feedback amount". As a result, the next updated position is effectively detected.

Referring now to the configuration schematically shown in FIGS. 31 and 32, the transmission of signals between the attention control neuron 2901 and the fixation position updating control circuit 3001 will be described. As it will be discussed later, a particular attention control neuron 2901 and the fixation position updating control circuit 3001 are temporarily connected to each other, and the attention control neuron associated with the updated position selected according to the method mentioned above is activated by receiving a secondary feedback input from the updated position determiner 3004. The secondary feedback input is a feedback signal having a signal level proportional to the feedback amount supplied from an upper layer to an attention control neuron. This opens a fixation region intrinsic to the neuron, and only the signal corresponding to the data of this region in input data will be transmitted to a succeeding layer.

The foregoing temporary mutual connection will be described in more detail. An attention control neuron activated at a certain time, i.e., the attention control neuron to be placed under the control for transmission of a signal to a succeeding layer, is temporarily connected to another particular attention control neuron in a neighboring region that exists in correspondence to the above attention control neuron. This temporary mutual connection is made to propagate the signal through the intermediary of a local common bus. To be more specific, among other attention control neurons in a neighboring region, only one neuron located at a random position spontaneously fires and outputs a spike pulse within a predetermined time range (e.g., in the range of ten-odd milliseconds), and the spike pulse reaches an activated attention control neuron through the common bus. Thus, a channel of communication with the already activated fixation position updating control circuit 3001 is established only during the above-mentioned period of time.

Accordingly, the common bus is accessed only when, for example, a neuron other than a most up-to-date attention control neuron in a neighboring region is fired. To be more specific, a variable resistance array whose wire resistance temporarily drops when a pulse signal from the fired neuron propagates on the wire connected to the common bus, and a control circuit (not shown) therefor is employed. As another alternative, a gating circuit 3101 or a switching circuit and a switching signal control circuit 3102 schematically shown in FIGS. 31 and 32 are provided between the attention control neurons and the common bus. The switching signal control circuit 3102 sends a turn-ON signal to one of gating circuits ("c" of 3101 shown in FIGS. 31 and 32) by using a fire pulse signal from an attention control neuron as a trigger, thereby temporarily opening a channel, i.e., turning ON the connection to the common bus.

After a next candidate fixation position is selected, the secondary feedback signal amplifier 3006 amplifies a feedback signal from an upper layer to an attention control neuron to a predetermined level by means of advancing a pulse phase in the case of phase modulation, then the amplified feedback signal is returned to the attention control neuron.

In this case, the number of the attention control neurons that is activated at a certain time, which accordingly means a fixation region, is limited to one per feature category. For this reason, when the attention control neuron that was activated at a certain time shifts into a different attention control neuron in the activation state, the activity of the originally activated neuron is suppressed for a predetermined time. This is implemented by the formation of an inhibitory mutual connection between closest attention control neurons. The inhibitory connection is shown by the dotted line extended from the attention control neuron 2901 of FIGS. 31 and 32.

The range of the feedback amount related to attention control described above has a preset lower limit value. After the control goes onto a fixation position corresponding to the lower limit value, the control is reset to an initial fixation point position.

The aforesaid mechanism for directly controlling the updating of a fixation region by the attention control layer and by employing the feedback signals from upper layers provides the following advantages not available with prior arts.

As compared with a case where only a salience map for low-order features is used to perform the fixation region control, the aforesaid mechanism enables efficient, quick search to be achieved, and also makes it possible to avoid meaningless visual search in which a fixation region continues to librate between two feature patterns.

In an object to be gazed at, only a feature part or pattern (e.g., eyes or the like in the object is a face) to be gazed at in particular can be selectively and efficiently searched for. In this case, the feedback from an intermediate layer related to the detection of a feature part in an object may be used rather than the feedback from the uppermost layer.

The search for the next updated position in a neighboring region of the latest fixation position allows quick fixation position updating control to be accomplished.

Even if there are a plurality of objects that belong to the same category, by properly setting the sizes of neighboring regions wherein the search is performed, the control can be carried out to ensure stable, sequential search from one object to another without causing the shifting range of fixation point positions to be fixed at any one particular object.

Processing in Feature Position Detection Layer

Referring to FIG. 29, feature position detection layers have Where pathways separated from a What pathway, and make a connection to a feature detection layer (1,k) at the same hierarchical level and also a feedback connection to a fixation region setting control layer 108. The feature position detection layer 107 share the same arrangement and function as those of the sub-sampling neuron 1501 of the feature integration layer 103 except that the population coding carried out by the feature integration layer 103 is not performed and that the receptive field sizes do not significantly change between upper layers and lower layers in order to prevent information regarding a feature disposition relationship from being lost. Hence, in the feature position detection layer 107, the neurons are disposed based on feature categories, and the neurons connect to feature detection layer neurons to perform sub-sampling. Thus, the distribution of firing neurons that represents a rough spatial distribution or disposition concerned with an object to be recognized or detected can be obtained in the feature position detection layer of an uppermost feature position detection layer.

Pulse Signal Processing in Feature Position Detection Layer

The pulse signal processing of the feature position detection layer is identical to that of the sub-sampling neuron 1501 of the feature integration layer 103. The neurons of a layer (3,k) performs sub-sampling on the basis of an average output level from the feature detection cells of a layer (1,k) in the preceding stage without being placed under the control by any pacemaker neurons. The average output level in this case is obtained from outputs received within a time window having an independent phase for each sub-sampling neuron.

Processing Procedure for Fixation Position Setting Control

Figure 37:
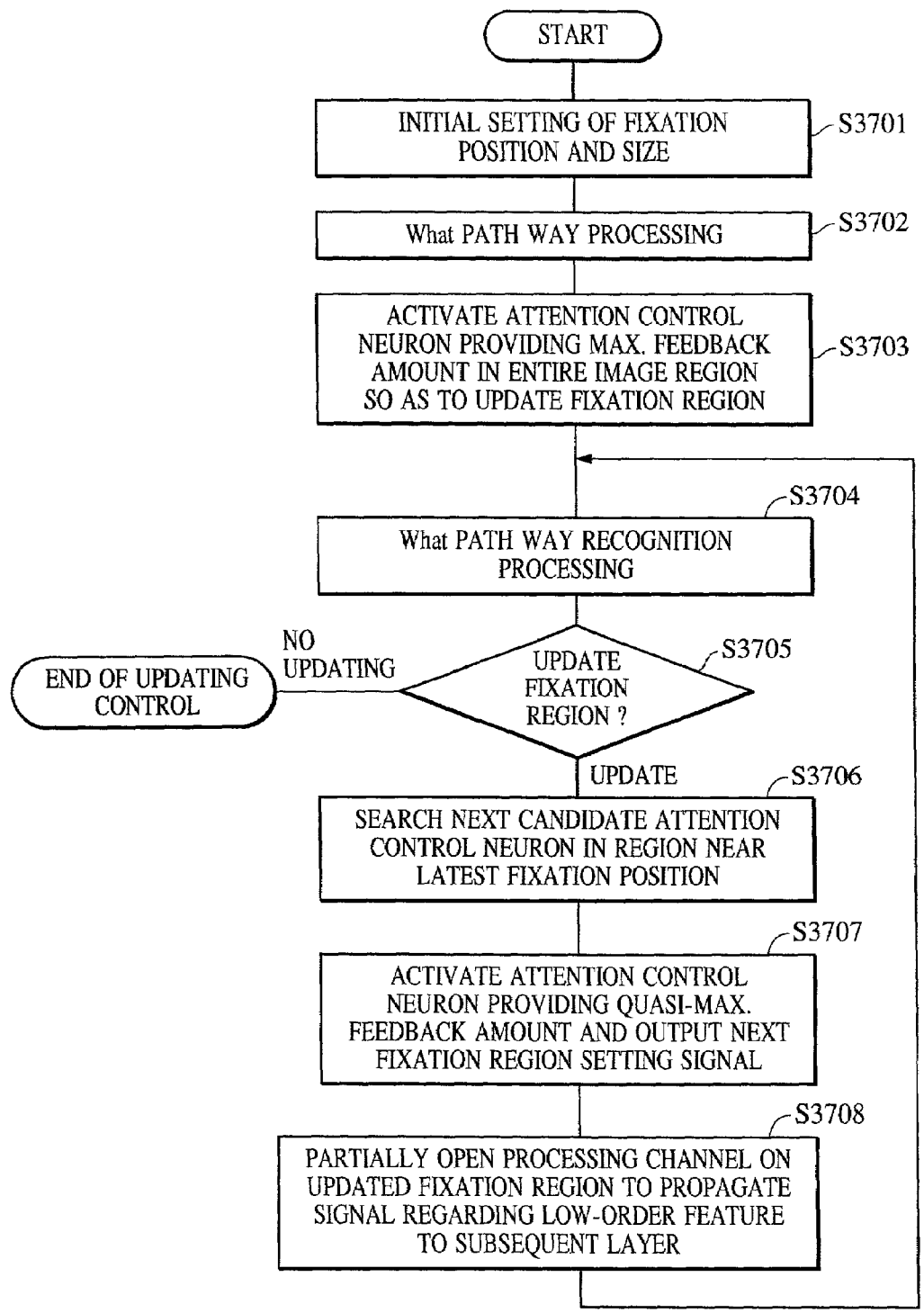
FIG. 37 is a flowchart showing the flow of processing related to attended position setting control.

FIG. 37 outlines the processing for controlling the setting of a fixation position. First, in step S3701, the fixation position is set at the center of an image to define the entire image as the size of a fixation region. Then, in step S3702, the processing by means of the What pathway up to the uppermost layer is implemented. At this stage, as previously mentioned, the state wherein an object has been perceived, that is, a recognized state, has not yet been reached.

Thereafter, in step S3703, based on a feedback amount or the like received from a feature position detection layer (3,M) corresponding to the uppermost layer through the Where pathway or the like, a neuron in the feature integration layer that corresponds to the attention control neuron receiving a maximum feedback amount or a predetermined maximum evaluation value given by expression (17) is specified as a new fixation position, and the size of the fixation region intrinsic to the processing channel to which that particular feature integration layer neuron belongs is set. In step S3704, recognition processing is carried out in the What pathway. In the next step S3705, whether the fixation position should be updated is determined, and if the determination result is affirmative, searching for a new candidate attention control neuron is performed in a region in the vicinity of the latest fixation position in step S3706, thus conducting the control for updating the fixation region.

Whether a fixation region should be updated is determined as follows. In a first example, it is determined whether there is another attention control neuron having a sufficient level of a feedback amount in a neighboring region. Such a neuron is called a "next candidate neuron". In a second example, it is determined whether no next candidate neuron exists in a neighboring region and whether there is an unset fixation position in a screen. In this case, a circuit (not shown) is required for determining the presence of an unset fixation position. In a third example, it is determined whether an external control signal has been received.

In the above first example, one next candidate neuron is selected according to the method described above so as to set the next fixation position or the like. In the above second example, the next fixation position is set at an arbitrary unset position outside the latest neighboring region or an arbitrary unset position adjoining the neighboring region. The above third example applies to a case where, if an actuating signal issued by, for example, a user pressing a shutter button is not detected as a control signal, then the user gives an instruction for urging updating, and the signal for the updating instruction is detected as a control signal.

In step S3707, as the result of the updating, the attention control neuron receiving a quasi-maximum feedback amount mentioned above is activated, and a signal for setting the next fixation region is output from the activated neuron to a feature integration layer in the case shown in FIG. 31 or to a gating layer in the case shown in FIG. 32. In step S3708, a part of a particular processing channel is opened thereby to propagate the signal from the feature integration layer neuron associated with the updated fixation region to a feature detection layer (1,1). On the other hand, if it is decided not to perform updating as a result of determining whether the attention should be updated (refer to the three cases of determinations described above), then the control operation for updating the fixation region is terminated.

Example of Modifications

As an alternative, the recognition of a graphic pattern or the like is performed using a network constituted by synapse elements that modulate pulse widths in analog values and integrate-and-fire neurons in the network configuration shown in FIG. 27. In this case, the modulation by a synapse is expressed by $W_a = S_{ij} W_b$ when the pulse width of a pre-synaptic signal is denoted as $W_b$, and the pulse width of a post-synaptic signal is denoted as $W_a$, where $S_{ij}$ means the same as the connection strength in expression (5) of the first embodiment. To take a wide dynamic range for the modulation, the basic pulse width of a pulse signal must be set to a value that is sufficiently smaller than the cycle, i.e., a basic pulse interval.

A neuron fires or outputs a pulse when its potential exceeds a predetermined threshold value because of the charges accumulated due to the inflow of a plurality of pulse currents that represent predetermined feature elements. In the case of the pulse width modulation or the like, the weighted addition of arrived pulses for each sub time window is not particularly necessary; however, integration in a time window having a predetermined width is implemented. In this case, the feature element or graphic pattern to be detected solely depends on the temporal total sum of signals for the feature detection layer neuron, i.e., the total sum of pulse current values. The width of input pulses corresponds to the value of a weighting function.

As another alternative, the configuration for obtaining scale-invariant feature representation first may be used thereby to obviate the need for a plurality of processing channels for medium and high orders. According to the configuration to be described below, scale-invariant recognition performance can be maintained, so that efficiency of selective attention processing can be improved. This leads to a simplified circuit configuration, a smaller scale, and reduced power consumption.

In the basic configuration previously discussed, the control for setting a fixation region has been conducted after the population coding for low-order features, and the population coding has been performed for each layer level. Alternatively, the feature representations at different population coding scale levels and the aforesaid population coding may be performed only for low-order features, and scale-invariant feature representations, i.e., scale-invariant pulse information conversion, may be performed by phase modulation of pulses associated with features, as it will be described later. Thereafter, the control for setting the aforesaid fixation region may be conducted, and the detection of medium- and high-order features may be carried out in a scale-invariant feature representation domain. The control for setting the fixation region could be carried out before the population coding; however, the processing efficiency will be lower than the case where it is conducted after the population coding.

To accomplish the conversion into the foregoing scale-invariant pulse information, the features that belong to the same feature category but have different scale levels or sizes are represented by an identical pulse interval. The conversion is performed, for example, so that a phase offset amount in an arrival pattern of a plurality of pulses to feature detection neurons for detecting a certain graphic feature remains constant in receiving pulses from any processing channels. The same processing may be implemented for increasing or decreasing a pulse width or an offset width when information is represented by pulse width modulation.

Furthermore, in feature detection neurons that belong to different scale levels or processing channels, a learning rule may be established so that the arrival time intervals or the arrival time pattern of the pulses that are associated with graphic features of the same category (e.g., L-shaped patterns) are different for different scale levels and time-shared.

The population coding is performed by linear coupling or the like based on the weighted addition of all time-shared pulse signals. In selective attention processing, the output data from a feature integration layer (2,0) associated with a specific partial region is selectively extracted as a fixation region before the population coding. The population coding on the selected output data is carried out on a time base. In layers from a feature detection layer (1,1) and after, multi-scale processing can be implemented by a single circuit, obviating the need for providing different circuits for different processing channels. The result is an economical circuit configuration. In other words, in the layers from the layer (1,1) and after, it is possible to eliminate physical discrimination among different processing channels in a circuit configuration.

The outputs from the feature detection layer (1,1) to a feature integration layer (2,1) are supplied in a time sharing mode for each processing channel or scale level.

Example of Application to Imaging Apparatus

Figure 38:
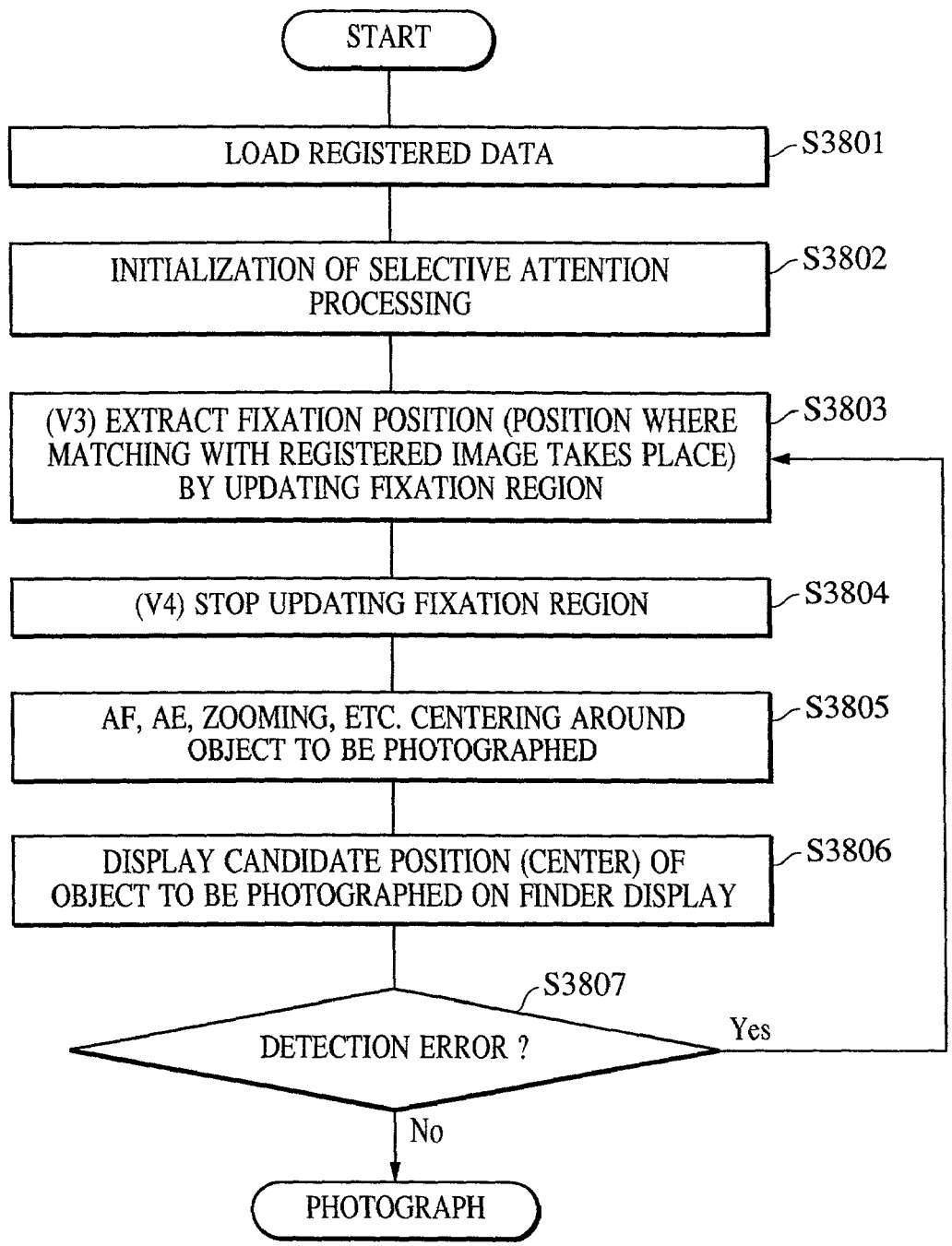
FIG. 38 is a flowchart showing the flow of control when a selective attention mechanism is incorporated in an imaging apparatus.

FIG. 38 outlines the processing flow of a photographing operation while performing selective attention in an imaging apparatus.

First, in step S3801, in order to identify an object to be detected or recognized beforehand, model data regarding an object to be photographed, such as the face of a target person when photographing a person, is loaded into a temporal memory (not shown) from a memory 1106 or from outside through the intermediary of a communication unit (not shown) incorporated in the imaging apparatus. Then, in step S3802, initialization for attention control processing is performed in a photographing standby state, such as a state wherein a shutter is half depressed. The initialization here is, for example, setting a fixation region at the center of the image or to the entire image size.

Subsequently, in step S3803, the fixation region updating as described above is begun to set a fixation region that meets a predetermined requirement (e.g., it is determined on the basis of an output of the uppermost layer that an object to be photographed has been detected). In step S3804, the fixation region updating is interrupted, and the control for optimal photographing conditions (e.g., AF, AE, AW, and zooming) is conducted, centering around a selected fixation region in step S3805. At this time, the position of the object to be photographed is indicated on a finder display by a marker, such as a reticle, in step S3806 to enable the user to confirm the object to be photographed.

Next, in step S3807 for checking for detection errors, it is determined, for example, whether a shutter button has been depressed within a predetermined time range, or whether a user has issued an instruction for searching another object (e.g., the state where a half-depressed shutter has been released). If it is determined that a detection error has been made, then the program returns to step S3803 to restart the updating of a fixation region. If it is determined that no detection error has been made, then photographing is implemented under the set photographing conditions.

Using the pattern detecting or recognizing apparatus in accordance with the embodiment described above in the imaging apparatus enables a subject to be reliably and efficiently detected or recognized even if the position of a subject or the size thereof in a screen is unknown when a plurality of subjects exist in an input image. This feature can be implemented at high speed in a real-time mode with less consumed power in performing the detection of a person or the like and the control of conditions (AF, AE, etc.) for ensuring optimal photographing conditions.

Eighth Embodiment

In this embodiment, the order of precedence or priority levels for the locations (the positions in the image) or the like to be selectively attended is determined in advance so as to quickly accomplish the updating of selective attention itself. An advantage of the eighth embodiment is that the processing efficiency, namely, the fixation point updating speed, is considerably improved by setting the order of precedence in advance before starting detection or the like by a setter 3401 for setting the priority levels, which will be defined hereinafter. Moreover, the permissible range of the priority levels is provided for restricting the positions that can be updated, and the fixation positions on only the attention control neurons having the priority levels within the range can be updated. This permits further quicker processing.

Figure 34:
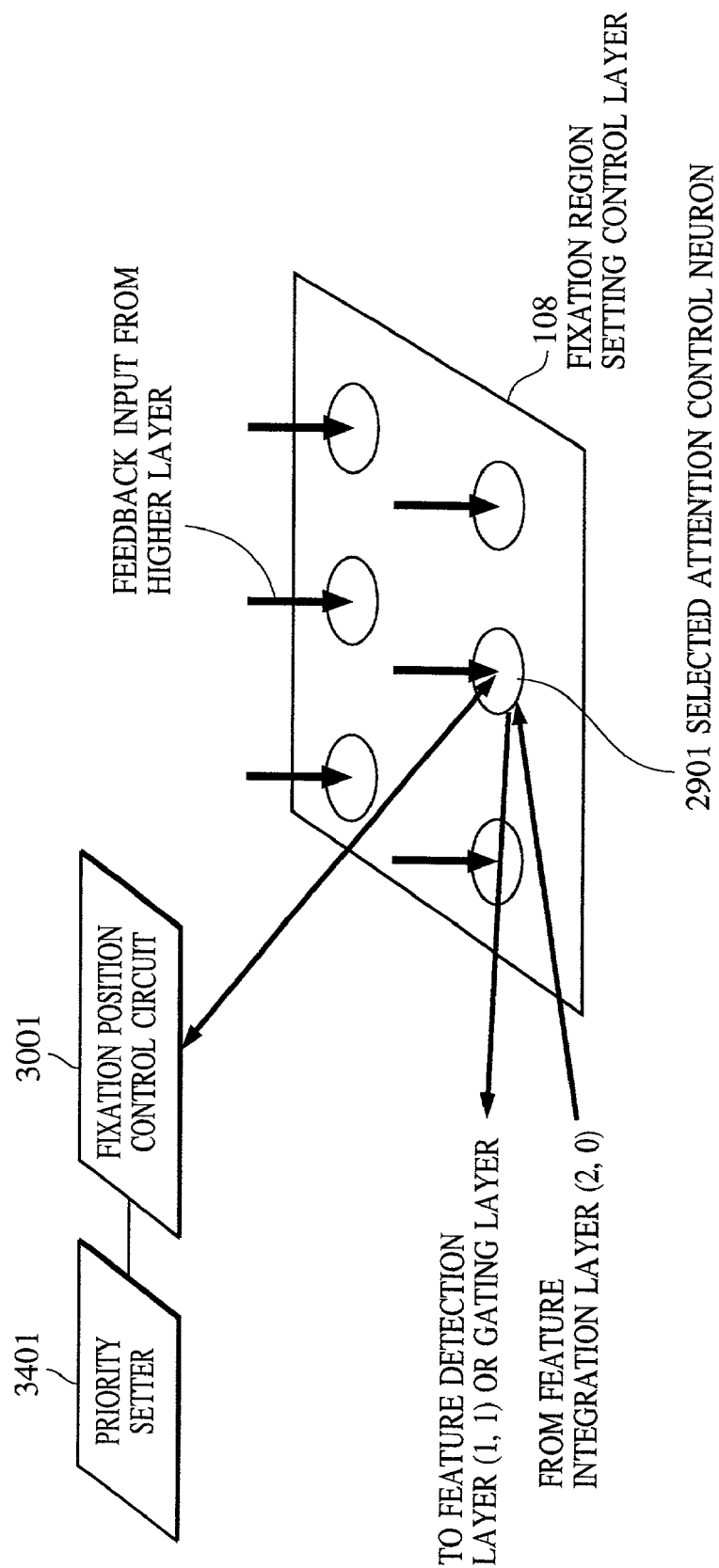
FIG. 34 shows a network configuration used in the second embodiment.

FIG. 34 shows the configuration of an essential section of the embodiment, centering around a fixation region setting control layer 108. A priority setter 3401 is provided for setting the order of precedence in selecting attention control neurons on the basis of the salience map of low-order features output from a feature integration layer (2,0) and the feedback amount from an upper layer. The priority setter 3401 and a fixation position updating control circuit 3001 should be provided in the vicinity of the fixation region setting control layer 108, or they may be provided on the fixation region setting control layer 108. The priority setter 3401 and the fixation position updating control circuit 3001 are composed of digital signal processing circuits or logic gate arrays. As in the previous embodiments, the fixation region setting control layer 108 has the attention control neurons associated with the positions where the detection of low-order features is performed on input data. The number of the attention control neurons is obtained by multiplying the number of processing channels by the number of feature categories, and the attention control neurons are located at the positions indicated by the ellipses in FIG. 34.

The amount indicating a priority level corresponds to a linear sum of the output of a feature integration layer or the value of salience level, and a feedback amount or the order thereof received from an upper layer, as shown by expression (18). A control signal for activating the attention control neurons in the descending order of the priority levels is sent out from the fixation position updating control circuit 3001 to a particular attention control neuron at the position to be updated. In order to determine the positions, namely, the addresses of the attention control neurons with higher priority levels, the fixation position updating control circuit 3001 sequentially accesses the attention control neurons according to a predetermined method (which will be discussed hereinafter) to calculate their priority levels. Then, the fixation position updating control circuit 3001 also sorts out and stores the information regarding the addresses of the neurons in the descending order of the priority levels in a primary memory (not shown). At this time, the fixation position updating control circuit 3001 stores only the addresses of the attention control neurons having the priority levels within a preset permissible range of priority levels.

The access to the attention control neurons for the purpose of calculating their priority levels is implemented by, for example, spirally sampling them, beginning with an initial fixation position, namely, the center of the image as in the previous embodiments. Alternatively, a processing channel to be searched for is determined on the basis of photographing conditions, such as the distance to a subject and a magnifying power, and only the associated population of attention control neurons may be searched for. If the size of a subject is known in advance, then the size of an object in a screen based on photographing conditions can be accordingly known, so that the scale level is narrowed down.

The fixation position updating control circuit 3001 selects the attention control neurons lying in a preset range of priority levels rather than selecting all registered attention control neurons by accessing their addresses in succession. For instance, in an initial stage for carrying out visual search, that is, selective attention control, the permissible range of priority levels is set at a higher level, and each time one permissible range of priority levels is cycled through, the number of the cycles is counted as the number of updating searches for fixation positions, and the permissible range of priority levels may be updated. For example, the permissible range of priority levels may be made narrower or wider each time the number of cycles is added.

Ninth Embodiment

The configuration of a ninth embodiment, centering around a fixation region setting control layer 108, is shown in FIGS. 31 and 32. In the ninth embodiment, an attention control neuron 2901 receives a feedback connection from an upper layer (e.g., a feature position detection layer (3,2) or a feature integration layer (2,2)) that outputs the information regarding the position and the probability of existence of an object that belongs to the category of the object to be recognized, and another feedback connection from an intermediate layer (e.g., a feature position detection layer (3,1) or a feature integration layer (2,1)) that outputs the information regarding the positions and the probabilities of existence of medium-order features that the object of that particular category to be recognized has (refer to the description of the population coding) or the information regarding detection levels. By using control signals or the like from outside (e.g., a further upper layer than the uppermost layer shown in FIG. 27), the attention control neuron 2901 then gives priorities to a feedback input from an upper layer during a search for the object in a detection mode, while it gives priorities to a feedback input from an intermediate layer while the object is being recognized in a recognition mode.

In this case, the search for an object in the detection mode simply means the detection of an object that belongs to the same category as an object to be recognized (e.g., the detection of a face) belongs to. The recognition here means to determine whether the detected object is the object to be recognized (e.g., whether the detected object is the face of a particular person) by carrying out the control of fixation position setting on the basis of more detailed features. In the latter recognition mode, a "degree of gaze" is higher than in the former detection mode.

Figure 35:
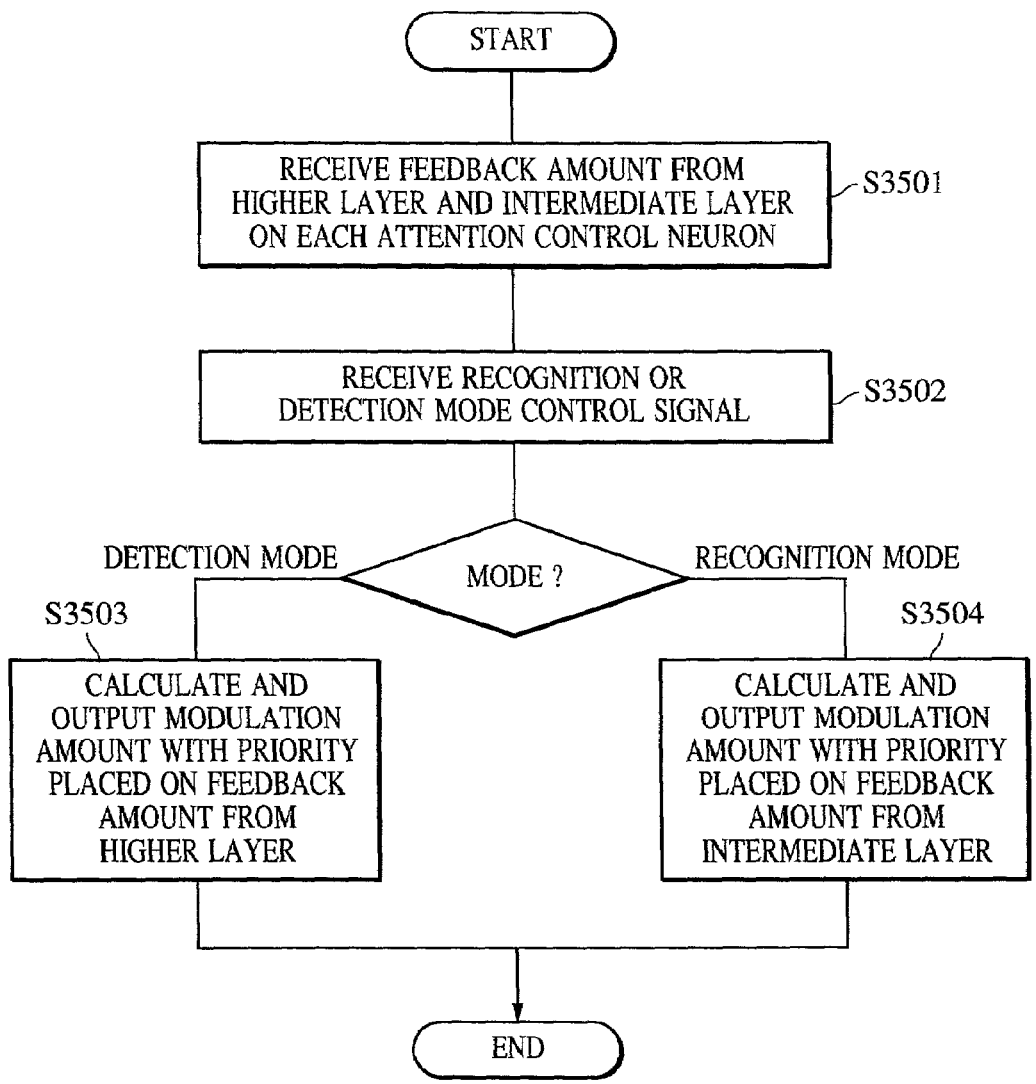
FIG. 35 is a flowchart of the processing implemented by a feedback amount modulating circuit.
Figure 36:
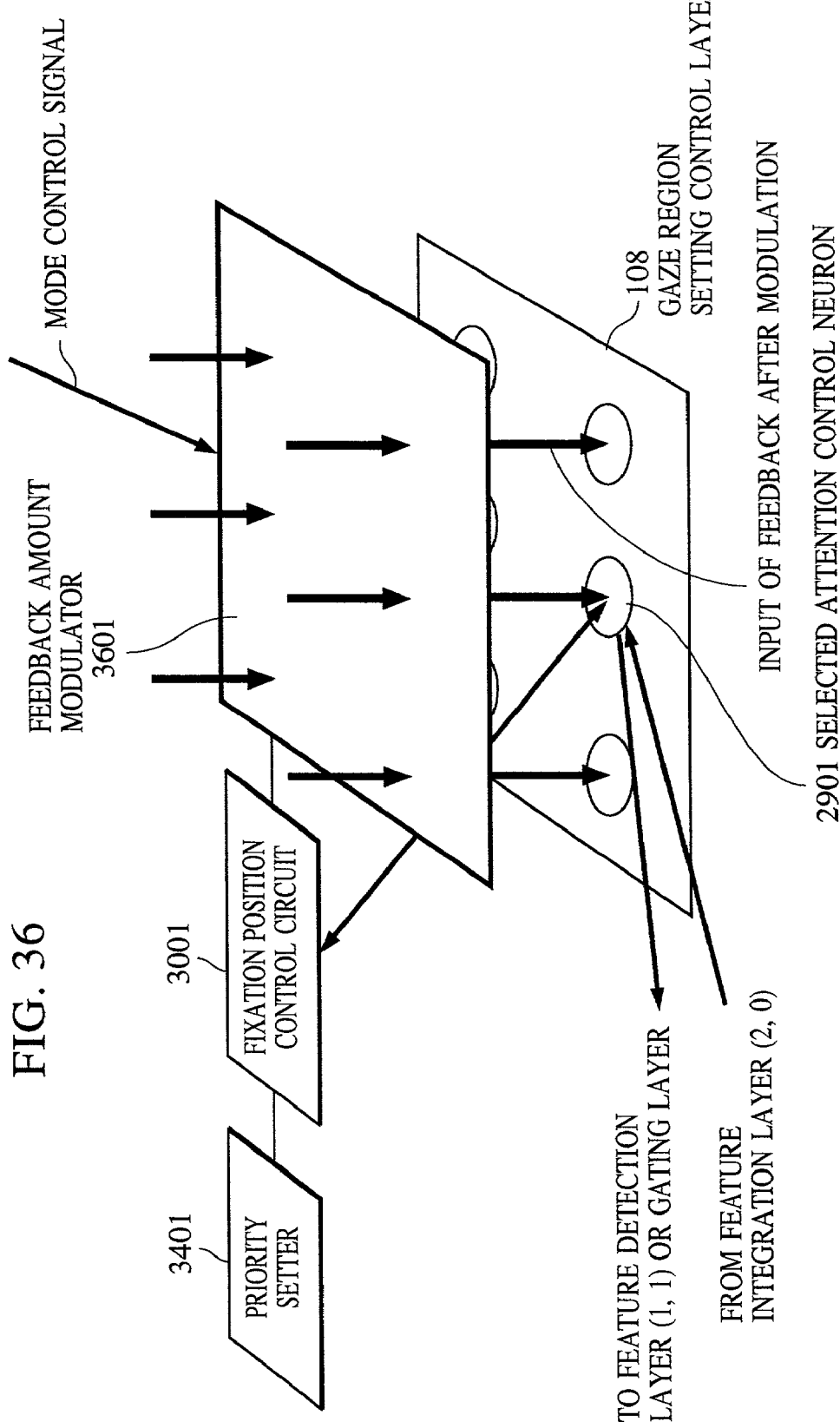
FIG. 36 shows a configuration centered around the attention control layer in the third embodiment.

The priorities based on the weighting of feedback connections are set by a feedback amount modulator 3601 shown in FIG. 36. The flow of processing implemented through the intermediary of the feedback amount modulator 3601 is shown in FIG. 35. In step S3501, the feedback amount modulator 3601 first receives the feedback amount from an upper layer and the feedback amount from an intermediate layer for the attention control neurons.

A mode control signal indicating whether the mode is the detection mode or the recognition mode is input in step S3502. If the mode is the detection mode, then the program takes only the feedback amount from an upper layer or a linear sum of the above two feedback amounts that have properly been weighted ($\alpha F_1 + \beta F_2$, where $F_1$ denotes the feedback amount from an upper layer, and $F_2$ is the feedback amount from an intermediate layer). The program then calculates a connection feedback amount that provides a larger contribution of the feedback amount from the upper layer so that $\alpha > \beta \geq 0$, and carries out modulation or amplification to output the calculated feedback amount in step S3503. If the mode is the recognition mode, then the program takes only the feedback amount from an intermediate layer or a linear sum of the above two feedback amounts, and calculates a connection feedback amount that provides a larger contribution of the feedback amount from the intermediate layer so that $0 \leq \alpha < \beta$, and carries out similar modulation in step S3504.

In this embodiment, the control for setting fixation positions can be conducted in the same manner as that in the first embodiment, excluding which feedback connection is given priority to. In addition to the method according to the first embodiment, the control for setting fixation positions may be carried out while adding random temporal changes to fixation point positions. There are some cases where the detection of an object to be searched for can be efficiently performed by adding fluctuations to fixation positions. More specifically, in the first embodiment, updating a fixation position always requires the search for the next candidate in a neighboring region, and if there is no attention control neuron to be the next candidate in the neighboring region of a latest fixation position, then the next fixation position is set outside the neighboring region or at an external adjoining position. Imparting the foregoing fluctuations to fixation positions provides the following unique advantages:

(1) Even if a neighboring region for searching is set to a smaller size than that in the case without the foregoing fluctuations, the processing weight required for the search in the neighboring region can be reduced without adding to the time required for the search. This is because the random fluctuations imparted to fixation positions provide action equivalent to searching for a fixation position without performing comparison between the feedback amounts or the like supplied to an attention control neuron in the neighboring region.

(2) If the widths of fluctuations are small, then the recognition or detection rate based on the temporally averaged outputs of a feature detection layer centering around a predetermined fixation point can be improved.

When imparting fluctuations to fixation positions, the variation width can be adjusted according to the degree of attention. The degree of attention is the degree of importance attached to the feedback amount from a layer where a particular pattern making up the entire pattern of an object to be recognized or detected is detected, or where the disposition of particular patterns providing such constituent elements is detected. For instance, the degree of attention is expressed in terms of the value of a detection level of the above feedback amount at an attention control neuron, the value being determined by using, as its reference, the detection level of a feedback input from an upper layer where the entire pattern or a high-order feature is detected. The value is represented by a ratio of a feedback amount $F_2$ from an intermediate layer to a feedback amount $F_1$ from an upper layer ($F_2/F_1$).

The variation width of a fixation position is controlled in such a manner that the variation width is decreased for a higher degree of attention. The degree of attention may be a monotonic increase function of the total sum of the feedback amounts from an upper layer, or may be decided by amplifying feedback amounts so as to increase the degree of attention as the differences in feedback amount among a plurality of attention control neurons decrease. The degree of attention here corresponds to the feedback amount supplied to the neurons. The amplification of the feedback amounts in the latter case mentioned above is performed associated attention control neurons 2901 in the fixation region setting control layer 108 by the feedback amount modulator 3601 shown in FIG. 36.

A method described below is available for imparting a temporal variation to a fixation point position. For instance, in a neighboring region similar to the one in the first embodiment that is centered around the most up-to-date fixation point position, an updated fixation point is set on the basis of the aforesaid modulated feedback amount in the same manner as that in the first embodiment. Then, a random variation is imparted to the position to set the final updated attention control neuron or fixation position. At this time, the width of the random variation can be controlled according to the degree of gaze, as described above.

Tenth Embodiment

Figure 39:
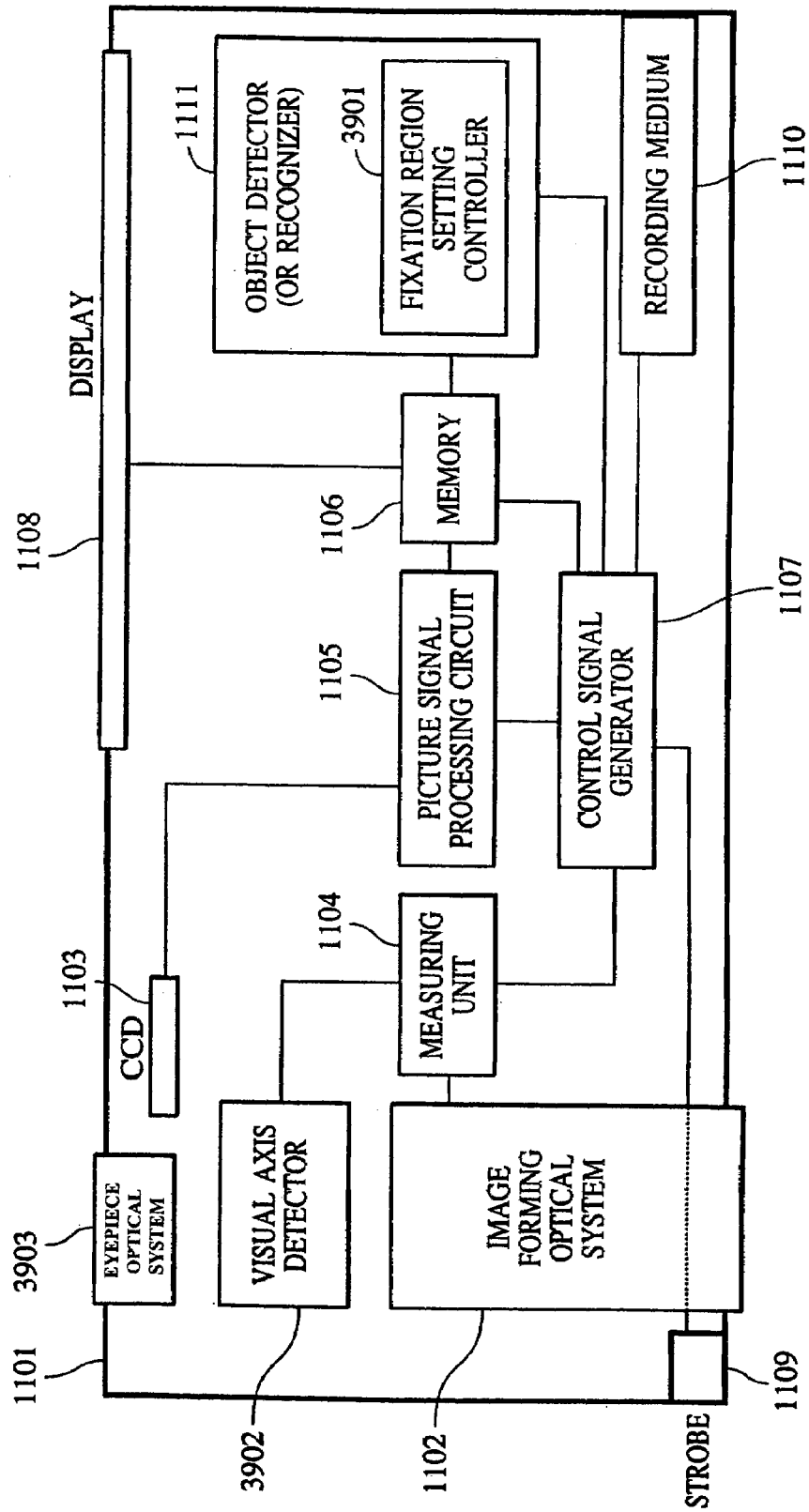
FIG. 39 shows an image input apparatus equipped with a mechanism for recognizing an object.

In the tenth embodiment, as shown in FIG. 39, a subject detecting or recognizing apparatus 1111 is installed in an image input apparatus, such as a camera or a video camera. The apparatus 1111 includes an assisting information detector 3902 for detecting information, such as the position and the size of an object, an image of which is intended to be input or photographed by a user or a photographer, and a fixation region setting controller 3901 according to the embodiments described above. In this embodiment, the assisting information detector 3902 will be described, taking a visual axis as an example.

The assisting information detector or the visual axis detector 3902 and the fixation region setting controller 3901 work together to carry out the control for setting a fixation position. This arrangement makes it possible to achieve automatic high-speed photographing that is ideally suited to a particular object in the image and that enables user's intention to be reflected. The assisting information in addition to the visual axis may be explicitly set by a user. In the following description, the assisting information detector 3902 will be called as "the visual axis detector 3902".

Referring to FIG. 39, the imaging apparatus 1101 is equipped primarily with an image forming optical system 1102 that includes taking lenses and a zoom photographing drive control device, a CCD or CMOS image sensor 1103, an imaging parameter measuring unit 1104, a picture signal processing circuit 1105, a memory 1106, a control signal generator 1107 for generating control signals for controlling an imaging operation, imaging conditions, etc., a display 1108 serving also as a finder, such as an EVF, a strobe luminescent unit 1109, and a recording medium 1110.

The subject detecting or recognizing apparatus 1111 includes the visual axis detector 3902, an eyepiece optical system 3903 for detecting visual axes, and a fixation region setting controller 3901. The eyepiece optical system 3903 is formed mainly by an eyepiece, an optical divider, such as a half mirror, a condensing lens, and an illuminating light source, such as an LED emitting infrared light. The visual axis detector 3902 is constituted mainly by a mirror, a focusing disc, a penta-roof prism, a photoelectric converter, and a signal processing means. Visual axis position detection signals are output from the imaging parameter measuring unit 1104.

The visual axis detector 3902 may employ the configuration disclosed in U.S. Pat. No. 2,505,854, U.S. Pat. No. 2,763,296, or U.S. Pat. No. 2,941,847 by the assignee, or another similar configuration. The description of the configuration, therefore, will be omitted.

A specific procedure for attention control will now be described. First, by the visual axis detector 3902, a user extracts a location or region that interests the user, and the information is stored in a primary memory. Then, the fixation region setting controller 3901 is actuated to preferentially search for a fixation candidate position or positions that have been stored in advance. The preferential search is similar to the setting of fixation positions on the basis of the order of preference, as has been described in conjunction with the eighth embodiment. For instance, the fixation positions are set according to the order of positions attended by the user, and for each fixation position, the search in a neighboring region described mainly in the seventh embodiment is implemented within a predetermined range of time. Thereafter, the updating of the position attended by the user and the search in a neighboring region are alternately repeated for the reason to be described later.

Alternatively, the signals from the visual axis detector 3902 may be input at predetermined time intervals while the fixation region setting controller 3901 is in operation, and search may be preferentially implemented in the peripheral areas of the positions attended by the user that are obtained from the signals. To be more specific, an attention control neuron located closest to the fixation position in the image that is specified by a signal from the visual axis detector 3902 is selected, and this control neuron is activated, or a gate opening signal is sent to a gate in a predetermined range of the gating layer 3201 shown in FIG. 32, thereby performing recognition or detection that reflects the position attended by the user.

Thus, the information regarding the positions the user gazes at is combined with the information regarding the fixation positions that are automatically updated by the fixation position setting control processing to control the setting of fixation regions for the following reasons:

1. The positions at which the user is gazing do not always accurately represent an object to be photographed or are not always useful for detecting an object to be photographed.

2. Using the positional information regarding an object that a user is intending to photograph as auxiliary information makes it possible to obtain a narrower search range. This allows more efficient search to be achieved, as compared with the case where only the fixation position setting control processing is implemented, as described in conjunction with the seventh, eighth, and ninth embodiments.

3. It is easier to detect improper fixation positions set by the fixation region setting controller.

Thus, accurate and quick detection and recognition of a subject has been accomplished by using the results of detection of the positions gazed at by a user as assisting information.

According to the embodiments described above, the setting control of a region to be gazed at can be accomplished with high efficiency with a small-scale circuit, without being distracted by low-order features, such as an edge that does not mean anything in detecting an object. The multi-resolution processing and populating coding mechanism incorporated into the attention control in which the feedback amounts received from upper layers are involved. Hence, even if a plurality of objects that belong to the same category exist in different sizes at random positions, efficient search among the plural objects can be performed by the mechanism for conducting feedback control using the detection levels of high-order features.

Pulse signals, which are feature detection signals, are subjected to the threshold-value operation of weighted load sums in time windows. This makes it possible to reliably and efficiently detect a desired pattern even if there are a plurality of objects to be detected or recognized and the dispositional relationship thereamong is unknown in advance, or even if the objects change their sizes or deform due to positional changes, a rotation, etc., or deficiency or the like occurs in detecting a feature due to the influences of lighting, noises, or the like, under complicated, diverse conditions. This advantage can be obtained without the need of relying on any particular network structure.

The setting and updating fixation regions can be quickly and reliably accomplished by combining the assisting information (e.g., the direction of a visual axis) from a user, and the fixation region setting control processing.

The search in fixation regions on the basis of the detection levels of high-order features can be performed with high efficiency, enabling quick detection and recognition of an object belonging to a predetermined category by using a compact system configuration.

The fixation regions are set only for low-order features or input data, obviating the need for the setting control for low- to high-order features, which has been conducted in prior arts (the selective tuning method and the prior art disclosed in Japanese Examined Patent Publication No. 6-34236). This arrangement leads to higher processing efficiency and higher speed.

Both the degrees of salience of low-order features or the like and feedback signals are employed in a mixed fashion. This arrangement enables adaptive processing to be implemented according to a recognition or detection mode. For example, the information regarding patterns that provide the elements making up an object to be recognized or regarding local feature dispositions is preferentially utilized in a recognition mode wherein detailed pattern analyses are made, while general features (e.g., high-order features or the feedback signals from upper layers) are preferentially handled in a detection mode wherein simple detection of a pattern that belongs to a certain feature category is performed.

The priority levels for fixation positions are determined in advance, and fixation positions are controlled on the basis of the results of the preset priority levels. This arrangement permits extremely prompt search control in fixation regions.

The permissible ranges of the priority levels for fixation positions are changed according to the number of searches for fixation positions. Hence, if the search for an object to be recognized is repeatedly performed practically at the same position, then the permissible range of priority levels can be changed so as to change the substantial search range.

Based on the distribution of priority levels, the fixation positions are set in a descending order of the priority levels. The size of a fixation region is controlled by the processing channel to which the feature selected on the basis of the priority levels belongs. This arrangement makes it possible to automatically set the fixation region for the size of an object even if the size of the object to be recognized or detected is not known beforehand.

Fixation regions are handled as active receptive fields of the feature detection elements that belong to a low-order feature detection layer in controlling the setting of the fixation regions. This enables fixation regions to be set without the need for providing any special gating elements for setting fixation regions.

A plurality of features are extracted for each of a plurality of resolutions or scale levels, thereby permitting highly efficient search for objects of any sizes.

The priority is given to the feedback inputs from upper layers when searching for an object, while the priority is given to the feedback inputs from intermediate layers when recognizing the above object. Thus, search can be performed on the basis of high-order features or general feature of a pattern when only the detection of an object that belongs to a predetermined category is performed. Detailed processing based on medium-features, including the information regarding a pattern constituting a part of an entire object or the information regarding a dispositional relationship of features, can be performed when an object is to be distinguished or recognized among similar objects.

If a predetermined degree of attention is high, the temporal variation of the position of the center of a fixation region is decreased. Hence, the fluctuation of a fixation position during visual search is made variable so as to realize higher efficiency of search based on the degree of gaze, and a shortened search time.

The sizes of fixation regions are set on the basis of detected scale levels of patterns that belong to the category of an object to be recognized. With this arrangement, even if the size of an object is not known beforehand, a size associated in advance by a processing channel can be used as a presumed size, thus permitting highly efficient setting of a fixation region size.

A degree of attention is defined as a monotonic increase function of the magnitude of a feedback signal from an upper layer. Thus, a higher detection level of a high-order feature is regarded as a higher degree of attention, and automatic processing based on the high-order feature can be performed.

Conducting operation control based on the output signals from the aforesaid pattern detecting apparatus allows the input of an image of a particular subject to be promptly accomplished at an arbitrary distance to the subject, with reduced power consumption. Such image input equipment include a photographing apparatus for still images, animated images, three-dimensional images, etc., a copying machine, a facsimile, a printer, and other types of equipment that incorporates an image input unit.

An object to be photographed can be searched for with high efficiency, and optimal automatic photographing for the detected object can be implemented by setting a fixation region that meets a predetermined requirement and by carrying out control for optimizing photographing conditions centering around the set fixation region.

Updating or setting a fixation region on the basis of the assisting information, such as a detected visual axis, from a user allows the setting of a fixation region to be controlled promptly and reliably so as to quickly detect a predetermined pattern.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A pattern detecting apparatus comprising:
input unit configured to input a pattern; and
pattern detection unit that comprises a plurality of signal processing elements and performs detection related to a plurality of predetermined features on a pattern input by the input unit so as to detect a predetermined pattern included in the input pattern,
wherein each of the plurality of signal processing elements outputs a pulse signal to another signal processing element or outside in response to an input from the input unit or another signal processing element, and
each of predetermined ones among the plurality of signal processing elements a pulse signal with an output value corresponding to an arrival time pattern of a plurality of pulse signals input in a predetermined order and respective intervals through a single line from a plurality of signal processing elements within a predetermined time range.

2. A pattern detecting apparatus according to claim 1, wherein the plurality of signal processing elements comprises:
a feature detection element that belongs to a feature detection layer for extracting a predetermined feature, and a feature integration element that belongs to a feature integration layer that integrates outputs from the feature detection layer according to a predetermined method and outputs a result of the integration, and
the predetermined ones among the plurality of signal processing elements are the feature detection elements that receive inputs from a plurality of the feature integration elements.

3. A pattern detecting apparatus according to claim 2, wherein the feature detection element outputs a pulse signal at an output level based on the degree of salience or disposition of the features.

4. A pattern detecting apparatus according to claim 2, wherein the feature integration element outputs, in a predetermined time range, a pulse signal at an output level based on a total sum of inputs from the plurality of feature detection elements that are associated with an identical feature.

5. A pattern detecting apparatus according to claim 2, wherein a plurality of the feature detection layers and the feature integration layers are alternately connected in a cascade.

6. A pattern detecting apparatus according to claim 5, wherein each of the feature integration elements of the feature integration layers has a local receptive field structure for receiving the signals from a plurality of feature detection elements which exist in a local range in a feature detection layer of a preceding stage and which individually detect an identical feature.

7. A pattern detecting apparatus according to claim 5, wherein feature detection elements of the feature detection layer receive signals from feature integration elements associated with different features in a feature integration layer in the preceding stage to detect a higher-order feature.

8. A pattern detecting apparatus according to claim 2, wherein at least some of the feature detection layers comprise a plurality of filters for performing a local spatial frequency analysis related to a component in a predetermined direction.

9. A pattern detecting apparatus according to claim 2, wherein the plurality of feature detection elements existing in the same receptive field of the feature integration elements output pulses in phase-synchronization with each other for a predetermined pattern.

10. A pattern detecting apparatus according to claim 2, wherein the feature detection elements detect the presence of a predetermined associated feature according as whether a pulse is present in a predetermined time window range intrinsic to the pulse in an arrival time pattern of the plurality of pulse signals.

11. A pattern detecting apparatus according to claim 2, wherein the feature detection layer comprises timing elements appendant to the feature detection elements in the layer, and the timing elements output pulses at predetermined pulse intervals to issue signals of the phase synchronization for feature detection calculating elements on the basis of the output from the feature integration elements on the same receptive field of a layer in the preceding stage.

12. A pattern detecting apparatus according to claim 11, wherein the timing elements output predetermined timing pulses to some feature detection elements in the feature detection layer comprising the timing elements, and to feature integration elements in the feature integration layer in the preceding stage that exists in the same receptive field of the feature detection element.

13. A pattern detecting apparatus according to claim 2, wherein each feature detection element in the feature detection layer outputs a pulse signal with a phase based on a feature to be detected thereby.

14. A pattern detecting apparatus according to claim 2, comprising a plurality of the feature detection layers and the feature integration layers, wherein a signal processing element of the last layer issues a signal representing a result of the detection of the predetermined pattern.

15. A pattern detecting apparatus according to claim 2, further comprising a feature position detection layer that receives an output from the feature integration layer and outputs information regarding the position where a predetermined feature or pattern exists.

16. A pattern detecting apparatus according to claim 15, wherein the number of the feature position detection layers is smaller than that of the feature integration layers, and the feature position detection layers are respectively connected to predetermined portions of the feature integration layers.

17. A pattern detecting apparatus according to claim 2, wherein the feature detection layer detects a plurality of features for a plurality of resolutions or scale levels for a pattern received from the input unit.

18. A pattern detecting apparatus according to claim 17, wherein the feature integration element comprises an element for sub-sampling feature data in a local receptive field region, and a population coding element for integrating the outputs of the sub-sampling elements that extend over a plurality of resolutions or scale levels.

19. A pattern detecting apparatus according to claim 17, wherein the feature detection layer comprises:
a feature detection element that detects a plurality of features of different resolutions or scale levels only on low-order features, and coverts the outputs of the detection pulse signals associated with the features on the basis of the resolutions or scale levels so that the outputs are provided with phases different in the direction of a time base; and
a scale conversion feature extracting element that converts the phases of the output signals from the element thereby to obtain feature detection signals that remain invariant against resolutions or scale levels.

20. A pattern detecting apparatus according to claim 2, further comprising:
feedback connecting means for transmitting signals from an upper layer to a lower layer in a hierarchical network structure combining the feature detection layers and the feature integration layers; and
fixation region setting control means that issues control signals related to a fixation region on the basis of a signal from the feedback connecting means and the salience level of a feature,
wherein the feature detection layer extracts a plurality of features for each of a plurality of resolutions or scale levels, and
the feature detection layer or the feature integration layer comprises a salience detecting element for detecting the salience of a feature.

21. A pattern detecting apparatus according to claim 20, wherein the fixation region setting control means sets the size of a fixation region on the basis of a detected scale level associated with the pattern that belongs to a category to be recognized.

22. A pattern detecting apparatus according to claim 1, wherein the plurality of signal processing elements are connected through the intermediary of connecting means, and the connecting means carries out predetermined modulation on an output pulse signal of one of the signal processing elements and transmits the modulated output pulse signal to the other of the signal processing elements.

23. A pattern detecting apparatus according to claim 22, wherein the modulation is implemented to delay a pulse phase.

24. A pattern detecting apparatus according to claim 23, wherein the connecting means decreases the delay amount of the pulse phase as the number of events with input pulses representing patterns of the same category increases.

25. A pattern detecting apparatus according to claim 23, wherein the delay amount of the pulse phase remains substantially constant regardless of the type of a feature.

26. A pattern detecting apparatus according to claim 22, wherein the modulation is pulse width modulation or frequency modulation.

27. A pattern detecting apparatus according to claim 1, wherein the predetermined ones among the plurality of signal processing elements output pulse signals at output levels based on the weighted sum obtained by multiplying a plurality of pulse signals received within the predetermined time range by predetermined weighting coefficient values, which temporally change, and adding the results.

28. A pattern detecting apparatus according to claim 1, wherein the output level is based on the phase, frequency, amplitude, or pulse width of the pulse signal.

29. An image processing apparatus adapted to control an operation for processing an image to be processed, on the basis of a result of the detection of a predetermined pattern from among patterns of the image to be processed, the result of the detection being obtained by the pattern detecting apparatus according to claim 1.

30. A pattern detecting apparatus according to claim 1, wherein the pattern detection unit has a plurality of processing layers composed of a plurality of neuron elements arranged in parallel as the signal processing elements, the neuron elements receiving a plurality of signals and outputting pulse signals,
the pulse signals output from a plurality of neuron elements of another layer to at least one of the neuron elements of a predetermined one of the processing layers are input through the intermediary of a bus line common to synaptic connection means provided for each of the plurality of neuron elements, and to the plurality of neuron elements, and
the synaptic connection means imparts a specific pulse phase shift amount to the pulse signals output from the plurality of neuron elements.

31. A pattern detecting apparatus according to claim 1, wherein the pattern detection unit comprises:
a plurality of processing means for implementing processing for different resolutions or scale levels on patterns received from the input means; and
multiplex processing means for coupling the outputs of the plurality of processing means,
wherein each of the plurality of processing means comprises a plurality of feature detection elements, as the signal processing elements, that detect and output a plurality of features associated with individual points, obtained by sampling the input data according to a predetermined method, and
the multiplex processing means couples the outputs of the plurality of feature detection elements.

32. A pattern detecting apparatus according to claim 31, wherein the plurality of processing means make up a hierarchical network structure, and
the multiplex processing means selects a resolution or scale level, or makes setting for coupling processed outputs of a plurality of resolutions or scale levels on the basis of a predetermined plurality of outputs among the outputs of the feature detection elements that correspond to the processing results in respective intermediate hierarchies of the processing means for a plurality of resolutions or scale levels.

33. A pattern detecting apparatus according to claim 32, wherein the multiplex processing means selects a resolution or scale level that indicates a maximum response output among the processing results obtained at a predetermined intermediate hierarchy of the plurality of processing means for different resolutions or scale levels.

34. A pattern detecting apparatus according to claim 32, wherein the multiplex processing means selects a resolution or a scale level by coupling a predetermined plurality of results among the processing results obtained at the intermediate hierarchies of the plurality of processing means for different resolutions or scale levels.

35. A pattern detecting apparatus according to claim 31, wherein each of the plurality of processing means comprises a plurality of hierarchical processing layers, and the multiplex processing means refers to intermediate processing results at processing layers of different hierarchical levels thereby to select a resolution or scale level.

36. A pattern detecting apparatus according to claim 34, wherein each of the plurality of processing means comprises a plurality of hierarchical processing layers, and the coupling processing refers to different resolutions or scale levels for the values obtained by coupling the processing results of different computing elements at the same hierarchical level of the processing means, and provides an output related to a predetermined resolution or scale level.

37. A pattern detecting apparatus according to claim 31, wherein the plurality of processing means have feature detection layers for detecting features at different resolutions or scale levels on each of a predetermined plurality of feature categories.

38. A pattern detecting apparatus according to claim 37, wherein the multiplex processing means is provided for each feature detection element of the feature detection layer.

39. A pattern detecting apparatus according to claim 37, wherein the feature detection layer locally performs spatial filtering for different spatial frequencies.

40. A pattern detecting apparatus according to claim 37, wherein each feature detection element of the feature detection layer detects a plurality of features at different resolutions or scale levels in a local, identical region of input data.

41. A pattern detecting apparatus according to claim 37, wherein the individual feature detection elements of the feature detection layer have selectivity on a plurality of different resolutions or scale levels on the same geometric feature category, the selectivity thereof overlapping each other.

42. A pattern detecting apparatus according to claim 37, wherein the feature detection layer includes a plurality of computing elements having sensitivity features approximated by a basis function that has locally different directional selectivities at different resolutions or scale levels for a feature category to be detected.

43. A pattern detecting apparatus according to claim 31, wherein the processing means comprises:
a plurality of feature detection elements for detecting a plurality of features at individual points obtained by sampling the input data according to a predetermined method, and
control means that integrates the plurality of the outputs of the feature detection elements of the plurality of processing means at different resolutions or scale levels so as to carry out, control related to resolutions or scale levels.

44. A pattern detecting apparatus according to claim 43, wherein the control means controls the setting of a predetermined resolution or scale level.

45. A pattern detecting apparatus according to claim 43, wherein the control means controls the activation degree of the feature detection element on the basis of a resolution or a scale level.

46. A pattern detecting apparatus according to claim 43, wherein the control means converts or copies a signal of a predetermined resolution or scale into a signal of another resolution or scale level according to a predetermined method, and distributes the resulting signal in a learning mode.

47. A pattern detecting apparatus according to claim 31, wherein the plurality of processing means comprises a plurality of channels that individually implement processing at different scale levels or resolutions by employing groups of neurons having hierarchical structures, and the multiplexing means comprises a group of population coding neurons that integrate outputs of a plurality of channels.

48. A pattern detecting apparatus according to claim 47, wherein an optimal scale level or resolution is set on the basis of the processing results of the group of population coding neurons.

49. A pattern detecting apparatus according to claim 47, wherein the groups of neurons having the hierarchical structures comprise groups of sub-sampling neurons that perform sub-sampling for each category.

50. A pattern detecting apparatus according to claim 1, wherein the pattern detection unit comprises:
a plurality of feature detection elements in a plurality of hierarchies for detecting a plurality of features in correspondence with points obtained by sampling the patterns received from the input unit according to a predetermined method, and
fixation region setting control means for controlling the setting of a fixation region associated with an output of a lower layer of the plurality of hierarchies on the basis of the distributions of feedback signals from an upper layer of the plurality of hierarchies.

51. A pattern detecting apparatus according to claim 50, wherein the fixation region setting control means updates a set position or size of a fixation region.

52. An imaging apparatus comprising:
fixation region setting means for setting a fixation region;
determining means for determining photographing conditions on the basis of a fixation region set by the fixation region setting means; and
memory means for storing model data regarding an object to be photographed, wherein the fixation region setting means sequentially updates a fixation region to search for a fixation region that meets a predetermined requirement regarding the model data thereby to set the fixation region, under the control by the fixation region setting control means of the pattern detecting apparatus according to claim 51.

53. An imaging apparatus according to claim 52, further comprising initializing means for initializing a fixation region in a photographing standby state.

54. An imaging apparatus according to claim 52, further comprising displaying means for displaying an object to be photographed that is associated with a fixation region set by the fixation region setting means.

55. An imaging apparatus comprising according to claim 52, further comprising detecting means for detecting a shutter drive signal, wherein the fixation region setting means resumes a search for a fixation region if no shutter drive signal is detected by the detecting means within a predetermined time after a fixation region is set.

56. An imaging apparatus comprising:
fixation region setting means for setting a fixation region;
determining means for determining photographing conditions on the basis of a fixation region set by the fixation region setting means; and
fixation position detecting means for detecting a fixation position on the basis of a user's visual axis,
wherein the fixation region setting means searches for and sets a fixation region on the basis of the fixation position under the control by the fixation region setting control means of the pattern detecting apparatus according to claim 51.

57. An imaging apparatus according to claim 56, wherein the fixation region setting means explores a neighborhood of the fixation position.

58. A pattern detecting apparatus according to claim 50, wherein the pattern detection unit comprises salience level detecting elements for detecting the salience of features, and a coupling means for coupling the elements and transmitting signals, and forms a plurality of element layers for low-order to high-order features,
the connecting means comprises feedback connecting means for transmitting signals from an element layer for a high-order feature to an element layer for a feature of a lower order, and
the fixation region setting control means controls the setting of a fixation region for low-order feature data or input data on the basis of the feature salience level and a signal transmission amount obtained by the feedback connecting means.

59. A pattern detecting apparatus according to claim 58, wherein the fixation region setting control means comprises:
priority level calculating means for determining the priority level of a fixation position at sampling points of each piece of input data on the basis of a signal transmission amount received from the feedback connecting means and the salience level of a low-order feature; and
fixation position setting means for setting fixation positions in a descending order of priority levels on the basis of a distribution of priority levels.

60. A pattern detecting apparatus according to claim 59, wherein the fixation region setting control means comprises:
counting means for counting the number of searches for fixation positions; and
control means for controlling a permissible range of priority levels wherein fixation positions can be set by the fixation position setting means on the basis of the number of searches for fixation positions.

61. A pattern detecting apparatus according to claim 59, wherein the detection unit detecting-means comprises a plurality of processing channels associated with a plurality of scale levels or resolutions, and the fixation region setting control means controls the size of a fixation region on the basis of the processing channel to which a feature selected based on the priority level belongs.

62. A pattern detecting apparatus according to claim 58, wherein the fixation region setting control means controls the setting of a fixation region as an active receptive field of a feature detection element that belongs to a low-order feature detection layer.

63. A pattern detecting apparatus according to claim 58, wherein the fixation region setting control means receives a feedback connection from an upper layer that outputs information regarding the position of an object that belongs to the category to be recognized and regarding a probability of existence, and a feedback connection from an intermediate layer that outputs information regarding the position of a medium-order feature of an object of a category to be recognized and regarding a probability of existence, and gives priority to a feedback input from the upper layer when searching for the object, or to a feedback input from the intermediate layer when recognizing the object.

64. A pattern detecting apparatus according to claim 58, wherein the fixation region setting control means reduces a temporal change in the central position of a fixation region when a predetermined degree of gaze is high.

65. A pattern detecting apparatus according to claim 63, wherein the degree of attention takes a monotone increase function value of a feedback signal level from the upper layer.

66. A computer-implemented pattern detecting method comprising the steps of:
receiving a pattern from an input section; and
subjecting the received pattern to detection on a predetermined plurality of features thereby to detect a predetermined pattern included in the pattern by employing a plurality of signal processing elements,
wherein the step of subjecting the received pattern to detection includes the steps of:
outputting a pulse signal to another signal processing element or outside from each of the plurality of signal processing elements in response to an input from the input section or another signal processing element; and
outputting a pulse signal, from each of predetermined ones among the plurality of signal processing elements, with an output value corresponding to an arrival time pattern of a plurality of pulse-signals input in a predetermined order and respective intervals through a single line from a plurality of signal processing elements within a predetermined time range.

* * * * *

UNITED STATES PATENT AND TRADEMARK OFFICE
CERTIFICATE OF CORRECTION

| | |
|---|---|
| PATENT NO. | : 7,054,850 B2 |
| APPLICATION NO. | : 09/878296 |
| DATED | : May 30, 2006 |
| INVENTOR(S) | : Matsugu |

It is certified that error appears in the above-identified patent and that said Letters Patent is hereby corrected as shown below:

(56) REFERENCES CITED:
Foreign Patent Documents, Page 2, "JP   10269345 A    *       10/1998" should read
-- JP   10-269345A    *       10/1998 --. and
Other Publications, Page 2, After "Le Cun, Y. and Bengio,": "Images Speech," should read -- Images, Speech, --.

(57) ABSTRACT:
Line 10, "a" should read -- an --.

COLUMN 2:
Line 11, "pp1 93-204;" should read -- pp. 193 - 204; --; and
Line 21, "an" should be deleted.

COLUMN 6:
Line 25, "to" should read -- to as --.

COLUMN 7:
Line 44, "wiring" should read -- wirings --.

COLUMN 10:
Line 22, "Images" should read -- Images, --.

COLUMN 15:
Line 33, "component" should read -- components --; and
Line 42, "wavelet" should read -- wavelets --.

COLUMN 16:
Line 64, "Features" should read -- Features) --.

COLUMN 23:
Line 8, "conditions" should read -- condition --.

COLUMN 32:
Line 11, "a" (second occurrence) should be deleted.

COLUMN 35:
Line 58, "In" should read -- in --.

UNITED STATES PATENT AND TRADEMARK OFFICE
CERTIFICATE OF CORRECTION

| | |
|---|---|
| PATENT NO. | : 7,054,850 B2 |
| APPLICATION NO. | : 09/878296 |
| DATED | : May 30, 2006 |
| INVENTOR(S) | : Matsugu |

It is certified that error appears in the above-identified patent and that said Letters Patent is hereby corrected as shown below:

COLUMN 39:
Line 48, close up right margin;
Line 49, close up left margin;
Line 56, "larger" should read -- larger --; and
Line 61, "carries" should read -- carry --.

COLUMN 40:
Line 2, "applied" should read -- applies --.

COLUMN 41:
Line 40, "a" should read -- the --.

COLUMN 42:
Line 47, "T" should read -- $\tau$ --.

COLUMN 44:
Line 39, "a" should be deleted; and
Line 58, "applied" should read -- applies --.

COLUMN 45:
Line 12, "a" should be deleted.; and
Line 57, "values" should read -- value --.

COLUMN 49:
Line 31, "mainly" should read -- mainly by --.

COLUMN 50:
Line 54, "configurations" should read -- configuration --.

COLUMN 51:
Line 34, "a" should be deleted.

COLUMN 55:
Line 17, "share" should read -- shares --; and
Line 38, "performs" should read -- perform --.

UNITED STATES PATENT AND TRADEMARK OFFICE
CERTIFICATE OF CORRECTION

PATENT NO. : 7,054,850 B2
APPLICATION NO. : 09/878296
DATED : May 30, 2006
INVENTOR(S) : Matsugu It is certified that error appears in the above-identified patent and that said Letters Patent is hereby corrected as shown below:

<u>COLUMN 65</u>:
Line 22, "incorporates" should read -- incorporate --.

Signed and Sealed this

Thirteenth Day of November, 2007

JON W. DUDAS
*Director of the United States Patent and Trademark Office*